US012076725B2

(12) United States Patent
Donovan

(10) Patent No.: US 12,076,725 B2
(45) Date of Patent: Sep. 3, 2024

(54) FLUIDIC DEVICE AND METHOD FOR PREPARING A SAMPLE SUBSTRATE

(71) Applicant: Illumina, Inc., San Diego, CA (US)

(72) Inventor: Darryl Donovan, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 401 days.

(21) Appl. No.: 17/244,199

(22) Filed: Apr. 29, 2021

(65) Prior Publication Data

US 2021/0316311 A1    Oct. 14, 2021

Related U.S. Application Data

(62) Division of application No. 15/576,405, filed as application No. PCT/US2016/034380 on May 26, 2016, now Pat. No. 11,014,089.

(Continued)

(51) Int. Cl.
*B01L 9/00* (2006.01)
*B01L 3/00* (2006.01)
(Continued)

(52) U.S. Cl.
CPC ........... *B01L 9/52* (2013.01); *B01L 3/502715* (2013.01); *G01N 15/1433* (2024.01);
(Continued)

(58) Field of Classification Search
CPC ........ B01L 9/52; B01L 3/502715; B01L 7/00; B01L 2200/025; B01L 2200/0647;
(Continued)

(56) References Cited

U.S. PATENT DOCUMENTS 4,673,657 A    6/1987  Christian
5,695,942 A   12/1997  Farmilo et al.
(Continued)

FOREIGN PATENT DOCUMENTS

DE    20207612    8/2002
EP     1260265    2/2005
(Continued)

OTHER PUBLICATIONS

Extended European Search Report for corresponding EP Application No. 22160877.1 dated Nov. 11, 2022 (17 pages).
(Continued)

*Primary Examiner* — Jill A Warden
*Assistant Examiner* — Jacqueline Brazin
(74) *Attorney, Agent, or Firm* — Jason P. Gross; The Small Patent LAw Group LLC

(57) ABSTRACT

Fluidic device includes a manifold body having first and second body sides. The first body side has receiving ports forming a port array that defines a reaction region. The second body side has open-sided recesses forming reaction chambers when the fluidic device is mounted onto a sample substrate. The reaction chambers form a chamber array that defines a fluid-delivery region. The reaction region is greater than the fluid-delivery region. The manifold body also includes vent openings that open to an exterior. The fluidic device also includes upstream channels extending through the manifold body. Each of the upstream channels fluidly couples a corresponding receiving port of the port array to a corresponding reaction chamber of the chamber array. The fluidic device also includes venting channels extending through the manifold body. Each of the venting channels fluidly couples a corresponding reaction chamber of the chamber array to a corresponding vent opening.

16 Claims, 40 Drawing Sheets

Related U.S. Application Data

(60) Provisional application No. 62/168,531, filed on May 29, 2015, provisional application No. 62/213,670, filed on Sep. 3, 2015.

(51) Int. Cl.

| | |
|---|---|
| *B01L 7/00* | (2006.01) |
| *G01N 15/10* | (2024.01) |
| *G01N 15/14* | (2024.01) |
| *G01N 15/1433* | (2024.01) |
| *G01N 21/03* | (2006.01) |
| *G01N 21/64* | (2006.01) |

(52) U.S. Cl.
CPC ..... *G01N 15/1484* (2013.01); *G01N 21/0332* (2013.01); *G01N 21/6428* (2013.01); *B01L 7/00* (2013.01); *B01L 2200/025* (2013.01); *B01L 2200/0647* (2013.01); *B01L 2200/0684* (2013.01); *B01L 2200/0689* (2013.01); *B01L 2200/147* (2013.01); *B01L 2300/023* (2013.01); *B01L 2300/043* (2013.01); *B01L 2300/0636* (2013.01); *B01L 2300/0809* (2013.01); *B01L 2300/0822* (2013.01); *B01L 2300/0877* (2013.01); *B01L 2300/0887* (2013.01); *B01L 2300/1844* (2013.01); *B01L 2300/185* (2013.01); *B01L 2400/0406* (2013.01); *B01L 2400/0457* (2013.01); *G01N 2015/1006* (2013.01); *G01N 2021/6441* (2013.01)

(58) Field of Classification Search
CPC ..... B01L 2200/0684; B01L 2200/0689; B01L 2200/147; B01L 2300/023; B01L 2300/043; B01L 2300/0636; B01L 2300/0809; B01L 2300/0822; B01L 2300/0877; B01L 2300/0887; B01L 2300/1844; B01L 2300/185; B01L 2400/0406; B01L 2400/0457; B01L 2200/021; B01L 3/50; B01L 2200/04; B01L 2300/06; B01L 2300/0816; B01L 2300/0848; B01L 2300/0861; B01L 2300/18; B01L 3/00; B01L 9/00; G01N 15/1463; G01N 15/1484; G01N 21/0332; G01N 21/6428; G01N 2015/1006; G01N 2021/6441
USPC ....................................................... 422/561
See application file for complete search history.

(56) References Cited

U.S. PATENT DOCUMENTS

| | | | |
|---|---|---|---|
| 5,958,760 A | 9/1999 | Freeman | |
| 6,238,910 B1 | 5/2001 | Custance et al. | |
| 6,623,701 B1 | 9/2003 | Eichele et al. | |
| 6,673,620 B1 | 1/2004 | Loeffler et al. | |
| 6,703,247 B1 | 3/2004 | Chu | |
| 7,481,980 B2 | 1/2009 | Gausepohl | |
| 7,704,735 B2 * | 4/2010 | Facer | B01L 3/50273 435/303.1 |
| 8,877,485 B2 | 11/2014 | Larsen et al. | |
| 8,883,509 B2 | 11/2014 | Lemme et al. | |
| 2002/0166582 A1 * | 11/2002 | O'Connor | F16K 99/0057 137/15.18 |
| 2003/0013184 A1 | 1/2003 | Streit et al. | |
| 2004/0029258 A1 | 2/2004 | Heaney | |
| 2004/0037739 A1 * | 2/2004 | McNeely | B01L 3/5085 422/417 |
| 2004/0115832 A1 | 6/2004 | Shareef et al. | |
| 2005/0186114 A1 | 8/2005 | Reinhardt et al. | |
| 2006/0003440 A1 | 1/2006 | Streit | |
| 2006/0166371 A1 | 7/2006 | Testa et al. | |
| 2008/0212643 A1 | 9/2008 | McGahhey | |
| 2010/0166612 A1 * | 7/2010 | Lehto | B01L 9/527 422/400 |
| 2010/0167943 A1 | 7/2010 | Adey | |
| 2012/0003631 A1 | 1/2012 | Yu et al. | |
| 2012/0149020 A1 | 6/2012 | Alvino et al. | |
| 2012/0279954 A1 | 11/2012 | Ceremony et al. | |
| 2012/0295249 A1 | 11/2012 | Cherubini et al. | |
| 2014/0329270 A1 | 11/2014 | Favaloro et al. | |
| 2014/0342358 A1 | 11/2014 | Dockrill et al. | |
| 2014/0356935 A1 | 12/2014 | Feingold et al. | |
| 2015/0044664 A1 | 2/2015 | Sullivan et al. | |
| 2017/0327867 A1 | 11/2017 | Dohale et al. | |

FOREIGN PATENT DOCUMENTS

| | | |
|---|---|---|
| EP | 1614466 A2 | 1/2006 |
| JP | 2003057237 | 2/2003 |
| JP | 2006308575 | 11/2006 |
| JP | 2007528485 | 10/2007 |
| WO | 0201181 | 1/2002 |
| WO | 2002058850 | 8/2002 |
| WO | 02074439 A1 | 9/2002 |
| WO | 2005024385 | 3/2005 |
| WO | 2009105609 A1 | 8/2009 |
| WO | 2011008415 A2 | 1/2011 |
| WO | 2013134583 | 9/2013 |
| WO | 2014205447 | 12/2014 |

OTHER PUBLICATIONS

International Search Report and Written Opinion for Corresponding PCT Application No. PCT/US2016/034380 dated Nov. 23, 2016 (16 pages).
Gunderson et al. "Whole-Genome Genotyping of Happlotype Tag Single Nucleotide Polymorphisms" Future Medicine, Ltd; 2006 (8 pages).
Hantke; "The DIG System—Nonradioactive Automated High-Throughput in Situ Hybridization: A Powerful Tool for Functional Genomics Research" Biochemica; No. 1, 2004 (3 pages).
Depalma; Painting Genes in Parallel; The Scientist; 2003 (1 page).
Tecan "Fully Automated in Situ Hybridization" Tecan; 2003 (7 pages).
Written Opinion for Corresponding Singapore Application No. 11201709745W dated Jun. 14, 2018 (11 pages).
Extended European Search Report for corresponding EP Application No. 16804070.7 dated Jan. 3, 2019 (11 pages).
Office Action for corresponding JP Application No. 2017-561714 dated Feb. 5, 2019 (12 pages).

* cited by examiner

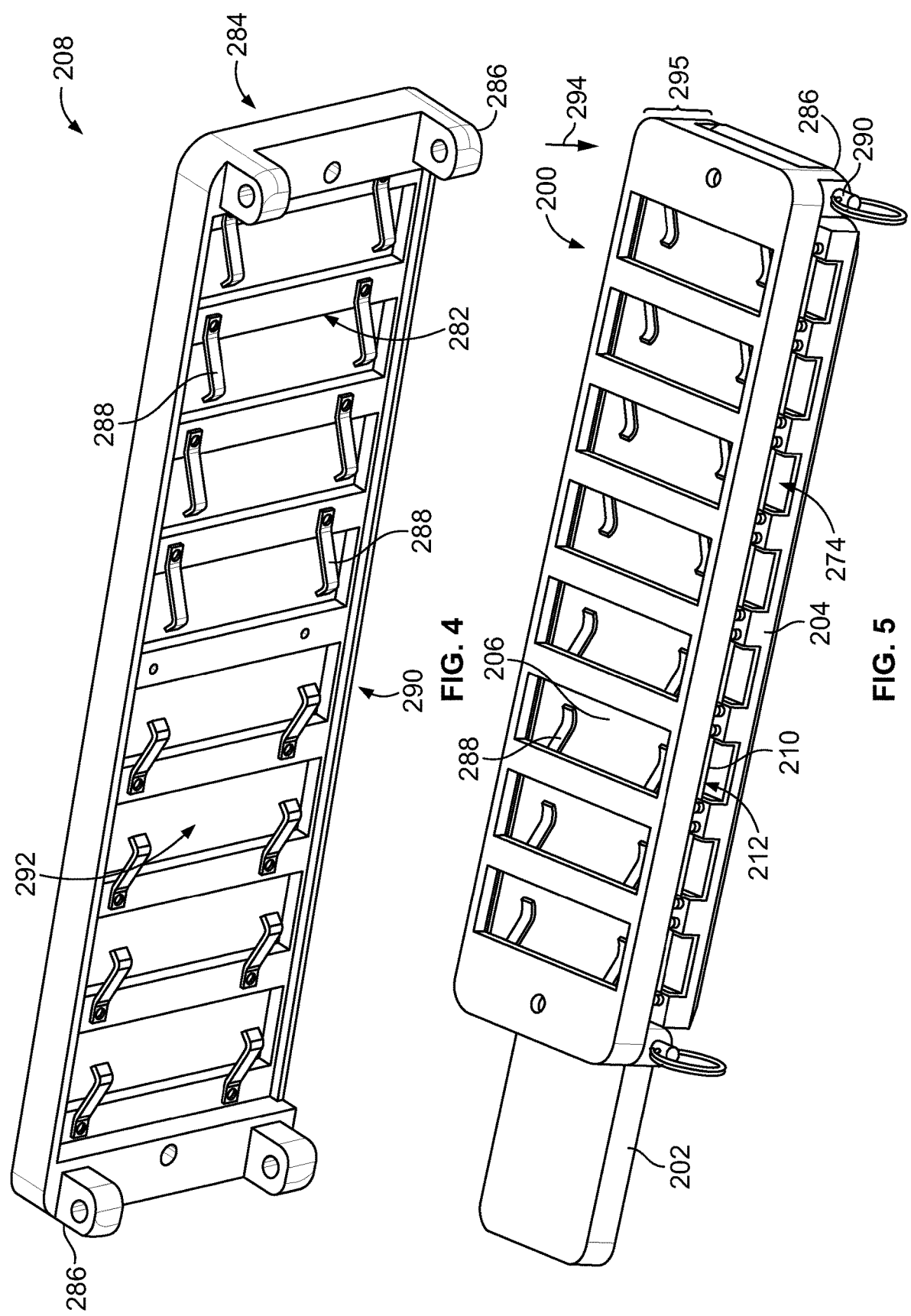

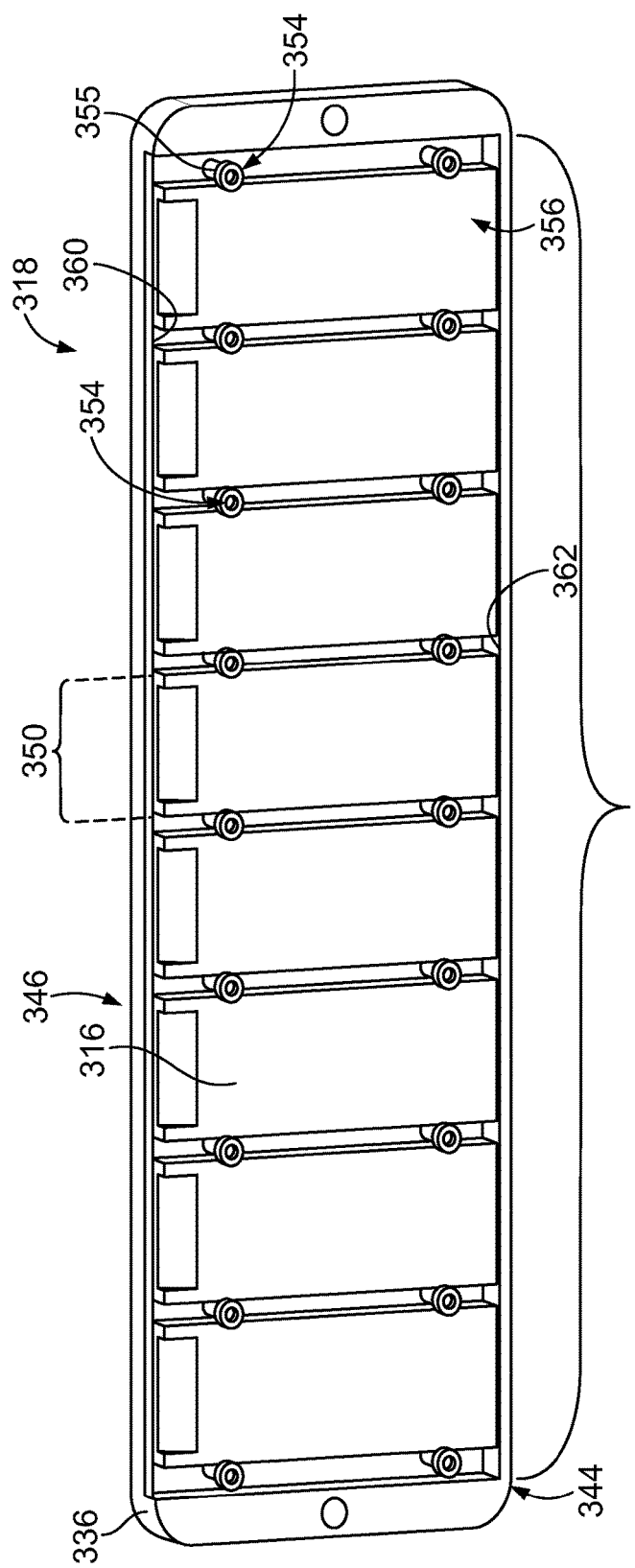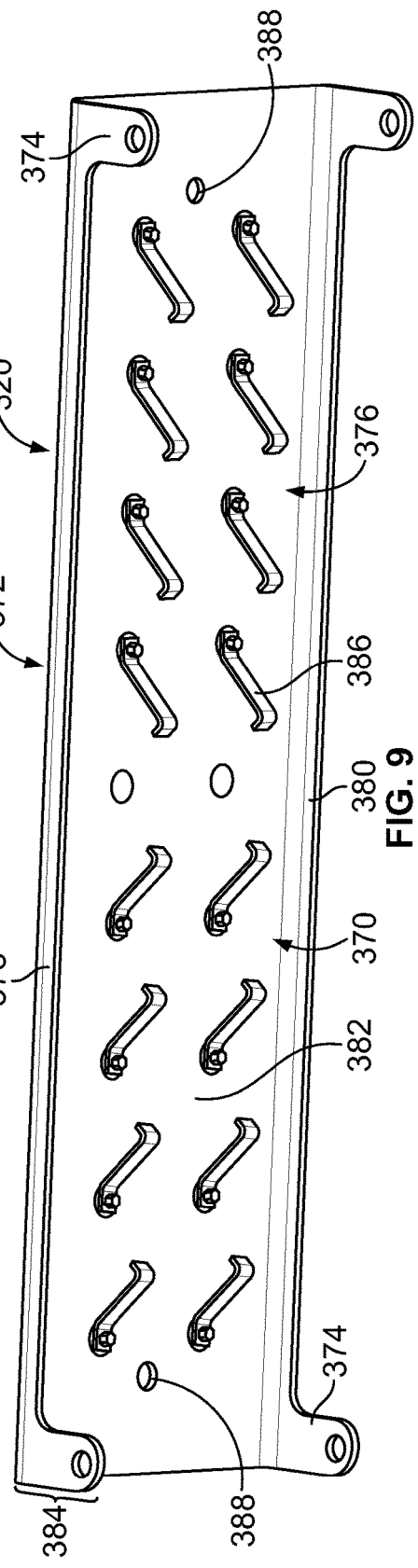

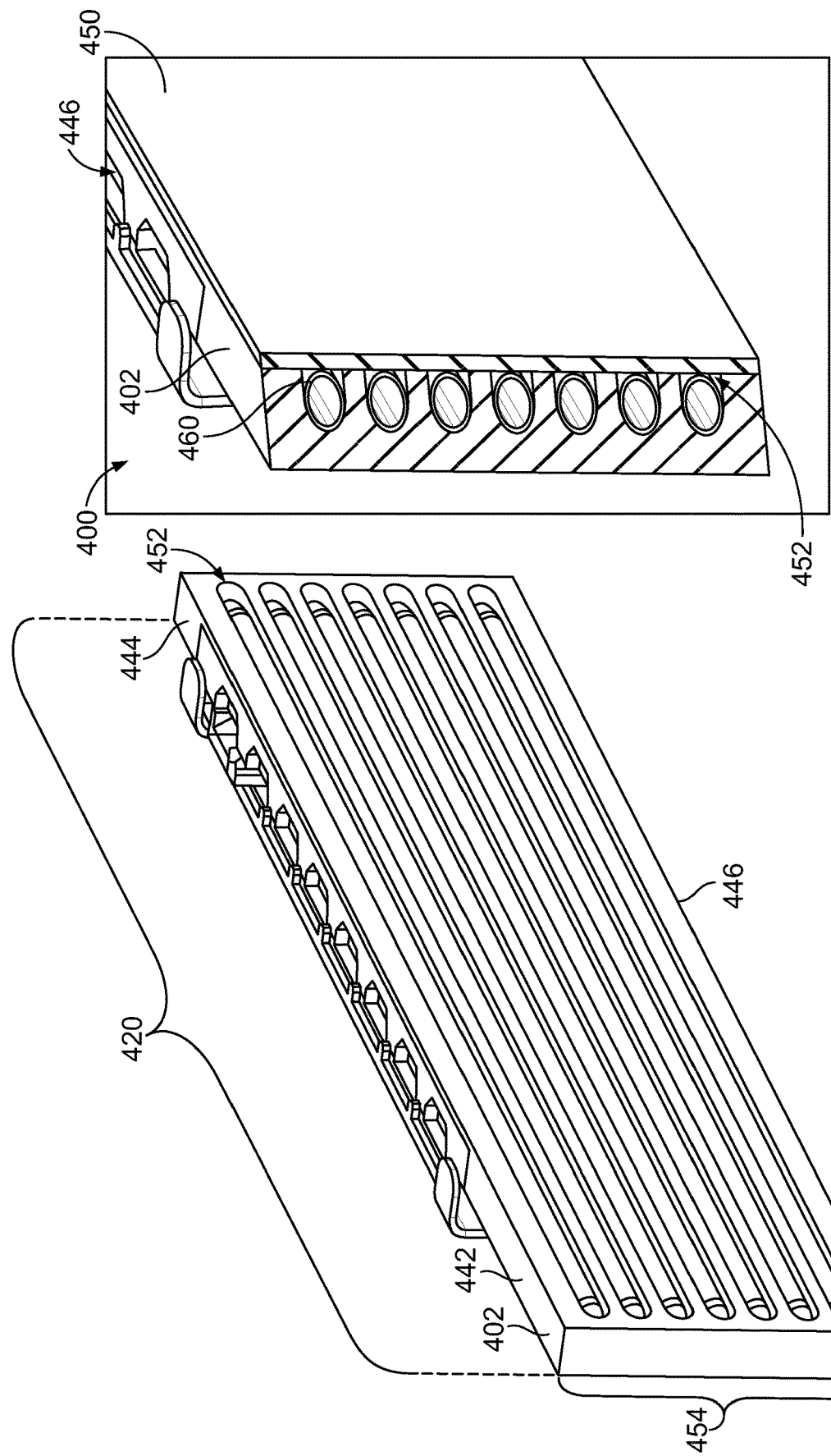

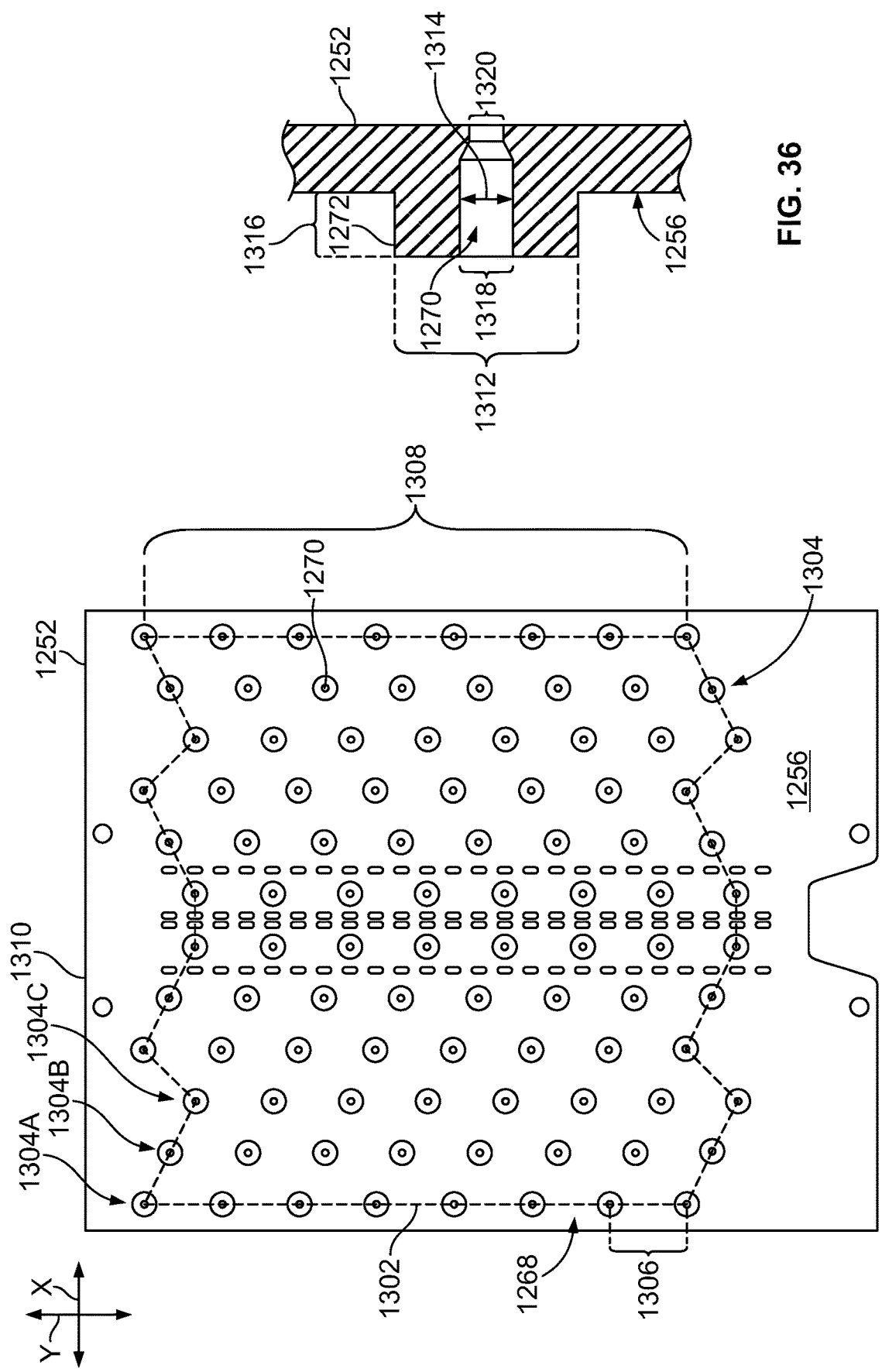

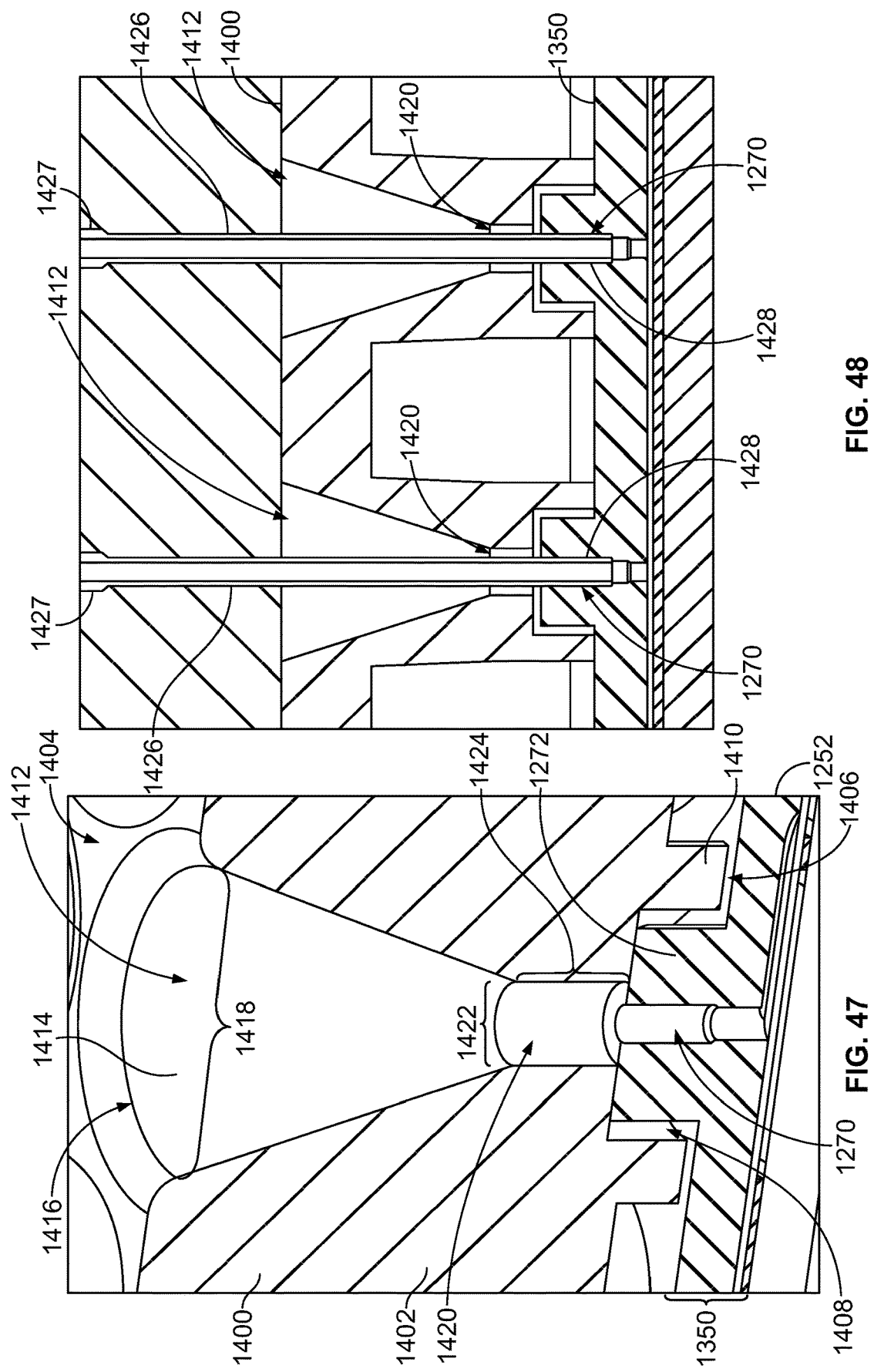

FLUIDIC DEVICE AND METHOD FOR PREPARING A SAMPLE SUBSTRATE

CROSS-REFERENCE TO RELATED APPLICATION

The present application is a divisional of U.S. application Ser. No. 15/576,405, filed on Nov. 22, 2017, which is a National Stage Entry of PCT/US2016/034380, filed on May 26, 2016, which claims the benefit of U.S. Provisional Application No. 62/168,531, filed on May 29, 2015, and 62/213,670, filed on Sep. 3, 2015. Each of the above applications is incorporated herein by reference in its entirety.

BACKGROUND

Embodiments of the present application relate generally to systems and method for preparing and/or analyzing substrates with biological or chemical samples thereon, and, more particularly, to systems and methods in which fluids are directed over the substrates to prepare and/or analyze the samples.

Various assay protocols used for biological or chemical research are concerned with performing a large number of controlled reactions. In some cases, the controlled reactions are performed on multiple discrete substrates, such as chips or slides. The designated reactions may then be observed and analyzed to help identify properties or characteristics of the chemicals involved in the designated reaction. For example, in some protocols, a sample is immobilized to a substrate and exposed to a number of solutions, such as reagent solutions, wash solutions, and staining solutions. After several steps in which a solution flows across the sample, the sample may have, among other things, one or more fluorescent labels selectively bound to chemical moieties (e.g., nucleic acids, antigens, etc.) of the sample. The sample may then be analyzed by exciting the fluorescent labels with radiation and detecting light emissions from the fluorescent labels. Examples of the above protocol include in-situ hybridization (ISH), fluorescent ISH (FISH), and immuno-histochemistry (IHC).

Protocols like the one above may be carried out tens, hundreds, or thousands of times by automated systems. For example, one known system uses a robotic arm to provide solutions to flow-thru devices that include substrates having samples thereon. The flow-thru devices, however, must be separately assembled. More specifically, each of the flow-thru devices includes a chamber cell, a spacer, and a holder. The cell spacer and substrate are positioned within the holder and the chamber cell is positioned over the cell spacer and substrate. When coupled to one another, a microfluidic gap is formed between an interior surface of the chamber cell and a surface of the substrate. The microfluidic gap has an inlet at one end of the flow-thru device and an outlet at an opposite end of the flow-thru device. The flow-thru device also includes a clamp assembly that secures the separate components together.

After each of the flow-thru devices is assembled, the flow-thru devices are positioned along a heating block. In particular, an outer surface of each of the holders is positioned against the heating block. The heating block is positioned within water. The temperature of the water is controlled, which consequently controls the temperature of the heating block. In this manner, a temperature within the microfluidic gap may be controlled in accordance with the predetermined protocol.

In the above system, the flow-thru devices must be assembled individually which may consume a substantial period of time. Moreover, each assembly requires placing small components at certain positions. This process can be frustrating and cause strain for the user. For instance, users may develop conditions that are similar to carpal tunnel syndrome or arthritis. In addition to the above, it can be challenging and/or time-consuming to control the heating block. For example, it may take a substantial amount of time to increase the temperature of the heating block and/or decrease the temperature of the heating block. Accordingly, a need exists for systems that decrease the amount of time to conduct a designated protocol and/or are more user-friendly than known systems.

Another known protocol uses a robotic arm to provide genomic samples to a flow-thru device that is mounted onto a substrate. The substrate has multiple discrete microarrays that each includes a population of different probe molecules that are immobilized to the substrate surface. The different probe molecules can be differentiated from each other according to relative location. The flow-thru device has ports for receiving corresponding pipette tips from a multi-pipetting loading system. Each port is in flow communication with a channel that extends across the substrate or, more specifically, across a corresponding microarray. When a sample solution is loaded into the corresponding port, the sample solution flows through the channel by capillary force (e.g., wicking) at which point the nucleic acids may react with the probe molecules.

Although protocols such as the one above may be effective in delivering fluids to designated reaction sites (e.g., microarrays) along a substrate, it may have certain limitations or drawbacks. For example, the protocol may have a limited throughput that is caused by the density of the reaction sites. The density of the reaction sites may be determined by (a) the locations of the pipette tips relative to one another, (b) dimensions of the ports and channels, or (c) configurations of the paths of the ports and channels to impede cross-contamination. Even if it were possible to increase the density of the reaction sites, it would be challenging to deliver the fluids to the reaction sites in a robust and reliable manner.

BRIEF DESCRIPTION

In an embodiment, a sample carrier is provided that includes an elongated thermal-control block having an active surface and an outer surface that face in opposite directions. The thermal-control block includes first and second block ends in which a length of the thermal-control block extends therebetween. The active surface has a series of mounting areas that are distributed along the length of the thermal-control block. The sample carrier also includes chamber cells that are configured to be disposed over respective mounting areas of the series of mounting areas. The sample carrier also includes a removable cover body that is configured to be coupled to the thermal-control block with the chamber cells therebetween. The thermal-control block and the chamber cells are shaped to form corresponding reaction chambers therebetween. The removable cover body and the thermal-control block are in fixed positions with respect to each other to form a unitary structure that is configured to be positioned within an assay system. The reaction chambers have corresponding inlets that open in a common direction to an exterior of the sample carrier.

In an embodiment, a system rack is provided that includes a rack body having a loading side and a plurality of elongated carrier slots that open along the loading side. The carrier slots are configured to receive corresponding sample carriers. The system rack also includes thermal modules that are coupled to the rack body. Each of the thermal modules has an outer surface that is exposed to a corresponding carrier slot of the plurality of carrier slots. Each of the thermal modules includes a heater that is in thermal communication with the outer surface. The system rack also includes temperature sensors having sensor surfaces that are exposed to corresponding carrier slots of the plurality of carrier slots. Each of the temperature sensors are configured to detect data regarding a temperature of the sample carrier within the corresponding carrier slot.

In an embodiment, an assay system is provided that includes a system rack having a rack body having a loading side and a plurality of elongated carrier slots that open along the loading side. The carrier slots are configured to receive corresponding sample carriers. The system rack also includes thermal modules coupled to the rack body. Each of the thermal modules has an outer surface that is exposed to a corresponding carrier slot of the plurality of carrier slots. Each of the thermal modules includes a heater that is in thermal communication with the outer surface. The assay system also includes a fluidic control system having a robotic arm with a plurality of syringes for delivering liquids to the sample carriers. The assay system also includes a controller configured to control operation of the thermal modules and the robotic arm to conduct designated reactions within chamber cells of the sample carrier.

In an embodiment, a method of assembling a sample carrier is provided. The method includes providing an elongated thermal-control block having an active surface and an outer surface that face in opposite directions. The thermal-control block includes first and second block ends in which a length of the thermal-control block extends therebetween. The active surface has a series of mounting areas that are distributed along the length of the thermal-control block. The method also includes positioning chamber cells over respective mounting areas of the series of mounting areas. The method also includes coupling a removable cover body to the thermal-control block with the chamber cells therebetween. The thermal-control block and the chamber cells are shaped to form corresponding reaction chambers therebetween. The removable cover body and the thermal-control block are in fixed positions with respect to each other to form a unitary structure that is configured to be positioned within an assay system. The reaction chambers have corresponding inlets that open in a common direction to an exterior of the sample carrier.

In an embodiment, an assay system is provided that includes a thermal-control block having an active surface with a series of mounting areas distributed therealong. Each of the mounting areas is configured to have a corresponding sample substrate positioned thereon. The assay system also includes a system sub-assembly having a plurality of chamber cells. Each of the chamber cells is configured to be disposed over a respective mounting area of the series of mounting areas with the corresponding sample substrate between the mounting area and the chamber cell. The system sub-assembly includes a removable cover body that is configured to be coupled to the thermal-control block with the chamber cells therebetween. The thermal-control block and the chamber cells being shaped to form corresponding reaction chambers between the chamber cells and the sample substrates. The assay system also includes a fluidic network having at least one input line and at least one output line that are configured to be in flow communication with the reaction chambers.

In an embodiment, a fluidic device is provided that includes a manifold body having first and second body sides that face in opposite directions. The first body side has receiving ports that form a port array. The port array defines a reaction region along the first body side. The second body side has open-sided recesses that form reaction chambers when the fluidic device is mounted onto a sample substrate. The reaction chambers form a chamber array that defines a fluid-delivery region. The reaction region is greater than the fluid-delivery region. The manifold body also includes vent openings that open to an exterior of the manifold body. The fluidic device has upstream channels that extend through the manifold body. Each of the upstream channels fluidly couples a corresponding receiving port of the port array to a corresponding reaction chamber of the chamber array. The fluidic device has venting channels that extend through the manifold body. Each of the venting channels fluidly couples a corresponding reaction chamber of the chamber array to a corresponding vent opening.

In an embodiment, a method of preparing a sample substrate is providing. The method includes providing a sample substrate having a substrate surface and a site array of reaction sites. The method also includes mounting a fluidic device onto the sample substrate. The fluidic device includes a manifold body having first and second body sides that face in opposite directions. The first body side has receiving ports that form a port array. The second body side has open-sided recesses that form reaction chambers when the second body side is mounted onto the sample substrate. The manifold body has vent openings that open to an exterior of the manifold body. The manifold body includes upstream channels and venting channels extending therethrough. Each of the upstream channels fluidly couples a corresponding receiving port of the port array to a corresponding reaction chamber of the chamber array. Each of the venting channels fluidly couples a corresponding reaction chamber of the chamber array to a corresponding vent opening. The method also includes flowing fluid through the receiving ports and into the corresponding reaction chambers. The site array has a perimeter that is smaller than a perimeter of the port array such that the fluid converges toward the site array. The venting channels receive at least one of displaced gas from the reaction chambers or the fluid from the reaction chambers.

In an embodiment, a fluidic device is provided that includes an input layer having an outer side and an opposite inner side and a port array of receiving ports disposed along the outer side. The input layer includes channel segments that extend along the inner side. The input layer also including vent ports along the outer side. The fluidic device also includes a union layer having thru-holes therethrough and a chamber layer having reaction passages. The input layer, the union layer, and the chamber layer are stacked side-by-side to form a manifold body. The union layer is positioned between the input and chamber layers. The manifold body includes a plurality of flow channels. Each of the flow channels includes a receiving port, a channel segment, an open-sided recess, a thru-hole, and a vent port that are in flow communication with one another. Optionally, each of the flow channels has a substantially common volume.

In an embodiment, a fluidic device is provided that includes a manifold body having first and second body sides that face in opposite directions. The first body side has receiving ports that form a port array. The port array defines a reaction region along the first body side. The second body side has open-sided recesses that form reaction chambers when the fluidic device is mounted onto a sample substrate. The reaction chambers form a chamber array that defines a fluid-delivery region. The reaction region is greater than the fluid-delivery region. The manifold body also includes output openings that open to an exterior of the manifold body. The fluidic device has upstream channels that extend through the manifold body. Each of the upstream channels fluidly couples a corresponding receiving port of the port array to a corresponding reaction chamber of the chamber array. The fluidic device has downstream channels that extend through the manifold body. Each of the downstream channels fluidly couples a corresponding reaction chamber of the chamber array to a corresponding output opening.

In an embodiment, a fluidic device is provided that includes a manifold body having first and second body sides that face in opposite directions and a body edge that extends between and joins the first and second body sides. The body edge has receiving ports that form a port array. The second body side has open-sided recesses that form reaction chambers when the fluidic device is mounted onto a sample substrate, wherein an area of the chamber array is less than an area of the port array. The manifold body also includes vent openings that open to an exterior of the manifold body. The fluidic device also includes upstream channels extending through the manifold body. Each of the upstream channels fluidly couples a corresponding receiving port of the port array to a corresponding reaction chamber of the chamber array. The fluidic device also includes venting channels that extend through the manifold body. Each of the venting channels fluidly couples a corresponding reaction chamber of the chamber array to a corresponding vent opening.

BRIEF DESCRIPTION OF THE DRAWINGS

FIG. 4 is a perspective view of an interior side of a removable cover body that may be used by the sample carrier of FIG. 2.

FIG. 5 is a perspective view of the sample carrier of FIG. 2 when fully assembled.

FIG. 8 is an underside view of a nest assembly that may be used with the sample carrier of FIG. 7.

FIG. 9 is a removable cover body that may be used with the sample carrier of FIG. 7.

FIG. 14 is a bottom perspective view of the sample carrier of FIG. 11 with a base plate removed to expose channels within a thermal-control block.

FIG. 15 is a cross-section of the sample carrier of FIG. 11 illustrating heat pipes within the channels.

FIG. 35 is a plan view of an outer side of an input layer of the manifold body of FIG. 33.

FIG. 36 is a cross-section of a portion of the input layer of FIG. 35.

FIG. 47 illustrates a cross-section of a guide layer mounted onto the manifold body of FIG. 33.

FIG. 48 illustrates a cross-section of the guide layer of FIG. 47 mounted onto the manifold body of FIG. 33 with tips sealingly engaged to the manifold body.

DETAILED DESCRIPTION

Figure 1A:
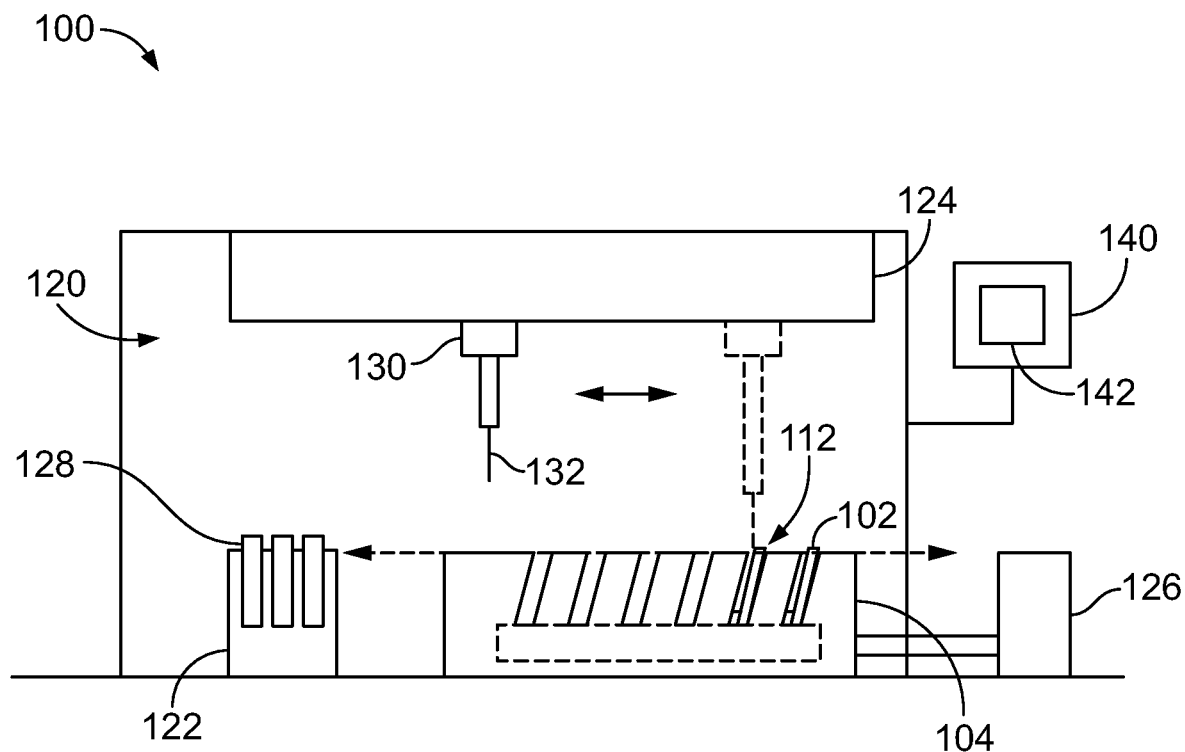
FIG. 1A is a schematic diagram of an assay system formed in accordance with an embodiment.

Embodiments set forth herein include sample carriers and assays systems that are used to conduct designated reactions. In particular embodiments, the sample carriers or the assay systems hold sample substrates having surfaces in which one or more biological or chemical samples are disposed thereon. The sample carriers and assay systems hold the substrates as one or more fluids (e.g., liquids or gases) flows along the surfaces of the substrates. Embodiments may also include apparatuses that interact with the sample carriers, such as system racks or other assay systems. Embodiments may also include methods of assembling and using the sample carriers. Embodiments may decrease the amount of time that is used to conduct predetermined assay protocols and/or may be more user-friendly than known apparatuses, systems, and methods.

As used herein, the term "sample carrier" includes a device or apparatus that is capable of holding one or more samples within one or more reaction chambers during a designated assay protocol. In particular embodiments, the sample carrier may includes multiple separate reaction chambers. The sample carrier may include a thermal-control block that enables controlling a temperature experienced within the reaction chamber(s). For example, the thermal-control block may include a designated area that is proximate to or defines a portion of a reaction chamber. The thermal-control block may be capable of transferring heat to and/or from the reaction chamber through the designated area. As such, the thermal-control block comprises a thermally-conductive material that is suitable for controlling the temperature within the reaction chamber. In some embodiments, the thermal-control block may include channels. Optionally, the channels may include heat pipes for transferring the thermal energy.

The sample carrier may also include one or more chamber cells to form the reaction chambers. As used herein, the term "chamber cell" includes an object that either includes a reaction chamber or is configured to form a reaction chamber when assembled with other components. Non-limiting examples include slides, chips, flow cells, cuvettes, and the like. In some embodiments, the primary function of the chamber cell is to define (in whole or part) the reaction chamber. The chamber cell may be fabricated from one or more materials that are suitable for conducting the designated reactions. For instance, the chamber cell may be a glass or plastic cell having a designated shape that facilitates forming the reaction chamber. The material(s) may be inert with respect to the designated reactions. In some cases, the chamber cell is fabricated from essentially only one material (e.g., glass or plastic). Optionally, the chamber cell may be have surfaces that are chemically modified. For example, a surface of the chamber cell may be functionalized to facilitate immobilizing a sample to the chamber cell. Optionally, the chamber cell comprise an optically-transparent material that allows optical signals to be emitted therethrough for detection.

The chamber cells may be discrete components (relative to the thermal-control block) that are separable or removable from thermal-control block. In some embodiments, a single chamber cell is configured to form a single reaction chamber. In other embodiments, a single chamber cell may form a plurality of reaction chambers. The thermal-control block and chamber cells may be configured for multiple uses. In other embodiment, the thermal-control block and chamber cells may be single-use components (e.g., disposable components). In some embodiments, the sample carrier has a plurality of discrete components that are assembled together in a unitary structure. More specifically, the sample carrier may be carried as a unit and positioned within an assay system.

As used herein, a "reaction chamber" includes a space or void where a sample may be located and liquids may flow therethrough for conducting the designated reactions. Reaction chambers typically include at least one port. In particular embodiments, the reaction chambers include at least one inlet and at least one outlet. In the illustrated embodiments, each reaction chamber includes a single inlet and a single outlet. In other embodiments, however, the reaction chamber may include a single inlet with multiple outlets. Alternatively, the reaction chamber may include multiple inlets with a single outlet. Yet in alternative embodiments, a reaction chamber may have a single port through which the fluid enters and exits. In some embodiments, the reaction chamber is a simple flow channel having uniform dimensions throughout. For example, a reaction chamber may be defined between two planar surfaces that extend parallel to each other. In other embodiments, the dimensions may vary. For example, the reaction chamber may be defined by one planar surface and another surface that has wells, pits, or grooves.

As used herein, the term "assay protocol" includes a sequence of operations for conducting designated reactions, detecting designated reactions, and/or analyzing designated reactions. The operations of an assay protocol may include fluidic operations, thermal-control operations, detection operations, and/or mechanical operations. A fluidic operation includes controlling the flow of fluid (e.g., liquid or gas) through the sample carrier or the assay system. For example, a fluidic operation may include controlling a pump to induce flow of the biological sample or a reaction component into a reaction chamber. A thermal-control operation may include controlling a temperature of a designated portion the sample carrier or assay system. By way of example, a thermal-control operation may include raising or lowering a temperature of the reaction chamber in order to conduct or facilitate certain reactions. A detection operation may include controlling activation of a detector or monitoring activity of the detector to detect predetermined properties, qualities, or characteristics of the sample. As one example, the detection operation may include capturing images of a designated area that includes the biological sample to detect fluorescent emissions from the designated area. The detection operation may include controlling a light source to illuminate the biological sample. A mechanical operation may include controlling a movement or position of a designated component. For example, a mechanical operation may include controlling a motor to move a robotic arm of an assay system. In some cases, a combination of different operations may occur concurrently.

Examples of protocols that may be carried out by embodiments set forth herein include multiplex array-based assays. In some multiplex array-based assay protocols, populations of different probe molecules are immobilized to a substrate surface. The probes may be differentiated based on each probe's address on the substrate surface. For example, each population of probe molecules may have a known location (e.g., coordinates on a grid) on the substrate surface. The probe molecules are exposed to target analytes under controlled conditions such that a detectable change occurs at one or more addresses due to a specific interaction between a target analyte and the probe. The target analytes may include, or be subsequently exposed to, one or more fluorescent labels that selectively bind to the target analytes. The target analytes may then be analyzed by exciting the fluorescent labels and detecting light emissions therefrom. A target analyte that binds to a specific probe can be identified based on recruitment of the fluorescent label to the address of the probe. The addresses on the array can be determined by an assay system to identify which populations reacted with the analytes. By knowing the chemical structure of the probe molecules that reacted with the analytes, properties of the analyte may be determined.

As used herein, the term "sample" includes any substance that is capable of being modified (e.g., through a controlled reaction) or observed in a reaction chamber, such as those described herein. In particular embodiments, samples may include biological or chemical substances of interests. As used herein, the term "biological or chemical sample" or "biological or chemical substances" may include a variety of biological samples or chemical samples that are suitable for being observed (e.g., imaged) or examined. For example, biological or chemical samples include biomolecules, nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, cell lysates, tissues, organs, organisms, bodily fluids. The terms "biological or chemical sample" may include biologically active chemical compound(s), such as analogs or mimetics of aforementioned species. The term "biological sample," as used herein, may include samples such as cell lysates, intact cells, organisms, organs, tissues and bodily fluids. "Bodily fluids" may include, but are not limited to, blood, dried blood, clotted blood, serum, plasma, saliva, cerebral spinal fluid, pleural fluid, tears, lactal duct fluid, lymph, sputum, urine, amniotic fluid, and semen. A sample may include a bodily fluid that is "acellular." An "acellular bodily fluid" includes less than about 1% (w/w) whole cellular material. Plasma or serum are examples of acellular bodily fluids. A sample may include a specimen of natural or synthetic origin (i.e., a cellular sample made to be acellular). In some embodiments, the biological sample can be from a human or from a non-human origin. In some embodiments, the biological sample can be from a human patient. In some embodiments, the biological sample can be from a newborn human.

In particular embodiments, samples can be attached to one or more surfaces of a substrate or support structure. For example, open-face substrates (such as some microarrays and chips) have biological or chemical substances immobilized to an exterior surface of the open-face substrate. Chamber cells may define reaction chambers or flow channels where, for example, biological or chemical substances are immobilized. The biological or chemical substances may be immobilized to surfaces of the chamber cells and/or to surfaces of the sample substrates disposed within the reaction chambers. Sample substrates may include one or more slides, open-face substrates, planar chips (such as those used in microarrays), or microparticles. In such cases where the optical substrate includes a plurality of microparticles that support the biological or chemical substances, the microparticles may be held by another optical substrate, such as a slide, array of pits, or grooved plate.

In particular embodiments, the sample substrates include a microarray. A microarray may include a population of different probe molecules that are immobilized to a surface of a substrate such that the different probe molecules can be differentiated from each other according to relative location. A microarray can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a BeadChip Array available from Illumina Inc. (San Diego, Calif.) or others including beads in wells such as those described in U.S. Pat. Nos. 6,266,459, 6,355,431, 6,770,441, 6,859,570, and 7,622,294; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

Any of a variety of microarrays known in the art may be used. A typical microarray contains reaction sites, sometimes referred to as features, each having a population of probes. The population of probes at each reaction site is typically homogenous having a single species of probe, but in some embodiments the populations can each be heterogeneous. Reaction sites or features of an array are typically discrete, being separated with spaces between each other. The size of the probe sites and/or spacing between the reaction sites can vary such that arrays can be high density, medium density or lower density. High density arrays are characterized as having reaction sites separated by less than about 15 μm. Medium density arrays have reaction sites separated by about 15 to 30 μm, while low density arrays have reaction sites separated by greater than 30 μm. An array useful in the invention can have reaction sites that are separated by less than 100 μm, 50 μm, 10 μm, 5 μm, 1 μm, or 0.5 μm. An apparatus or method of an embodiment of the invention can be used to image an array at a resolution sufficient to distinguish sites at the above densities or density ranges.

Further examples of commercially available microarrays that can be used include, for example, an Affymetrix® GeneChip® microarray or other microarray synthesized in accordance with techniques sometimes referred to as VLSIPS. (Very Large Scale Immobilized Polymer Synthesis) technologies as described, for example, in U.S. Pat. Nos. 5,324,633; 5,744,305; 5,451,683; 5,482,867; 5,491,074; 5,624,711; 5,795,716; 5,831,070; 5,856,101; 5,858,659; 5,874,219; 5,968,740; 5,974,164; 5,981,185; 5,981,956; 6,025,601; 6,033,860; 6,090,555; 6,136,269; 6,022,963; 6,083,697; 6,291,183; 6,309,831; 6,416,949; 6,428,752 and 6,482,591, each of which is hereby incorporated by reference. A spotted microarray can also be used in a method according to an embodiment of the invention. An exemplary spotted microarray is a CodeLink™ Array available from Amersham Biosciences. Another microarray that is useful is one that is manufactured using inkjet printing methods such as SurePrint™ Technology available from Agilent Technologies. Any one of several assays can be used to identify or characterize targets using a microarray as described, for example, in U.S. Patent Application Publication Nos. 2003/0108867; 2003/0108900; 2003/0170684; 2003/0207295; or 2005/0181394, each of which is hereby incorporated by reference.

In some embodiments, embodiments described herein may be used for sequencing nucleic acids. For example, sequencing-by-synthesis (SBS) protocols are particularly applicable. In SBS, a plurality of fluorescently labeled modified nucleotides are used to sequence dense clusters of amplified DNA (possibly millions of clusters) present on the surface of an optical substrate (e.g., a surface that at least partially defines a channel in a chamber cell). The chamber cells may contain nucleic acid samples for sequencing where the chamber cells are placed within the appropriate chamber cell holders. The samples for sequencing can take the form of single nucleic acid molecules that are separated from each other so as to be individually resolvable, amplified populations of nucleic acid molecules in the form of clusters or other features, or beads that are attached to one or more molecules of nucleic acid. The nucleic acids can be prepared such that they comprise an oligonucleotide primer adjacent to an unknown target sequence. To initiate the first SBS sequencing cycle, one or more differently labeled nucleotides, and DNA polymerase, etc., can be flowed into/through the chamber cell by a fluid flow subsystem (not shown). Either a single type of nucleotide can be added at a time, or the nucleotides used in the sequencing procedure can be specially designed to possess a reversible termination property, thus allowing each cycle of the sequencing reaction to occur simultaneously in the presence of several types of labeled nucleotides (e.g. A, C, T, G). The nucleotides can include detectable label moieties such as fluorophores. Where the four nucleotides are mixed together, the polymerase is able to select the correct base to incorporate and each sequence is extended by a single base. Nonincorporated nucleotides can be washed away by flowing a wash solution through the chamber cell. One or more lasers may excite the nucleic acids and induce fluorescence. The fluorescence emitted from the nucleic acids is based upon the fluorophores of the incorporated base, and different fluorophores may emit different wavelengths of emission light. A deblocking reagent can be added to the chamber cell to remove reversible terminator groups from the DNA strands that were extended and detected. The deblocking reagent can then be washed away by flowing a wash solution through the chamber cell. The chamber cell is then ready for a further cycle of sequencing starting with introduction of a labeled nucleotide as set forth above. The fluidic and detection steps can be repeated several times to complete a sequencing run. Exemplary sequencing methods are described, for example, in Bentley et al., Nature 456:53-59 (2008), WO 04/018497; U.S. Pat. No. 7,057,026; WO 91/06678; WO 07/123,744; U.S. Pat. Nos. 7,329,492; 7,211,414; 7,315,019; 7,405,281, and US 2008/0108082, each of which is incorporated herein by reference.

In some embodiments, nucleic acids can be attached to a surface and amplified prior to or during sequencing. For example, amplification can be carried out using bridge amplification. Useful bridge amplification methods are described, for example, in U.S. Pat. No. 5,641,658; U.S. Patent Publ. No. 2002/0055100; U.S. Pat. No. 7,115,400; U.S. Patent Publ. No. 2004/0096853; U.S. Patent Publ. No. 2004/0002090; U.S. Patent Publ. No. 2007/0128624; and U.S. Patent Publ. No. 2008/0009420. Another useful method for amplifying nucleic acids on a surface is rolling circle amplification (RCA), for example, as described in Lizardi et al., Nat. Genet. 19:225-232 (1998) and US 2007/0099208 A1, each of which is incorporated herein by reference. Emulsion PCR on beads can also be used, for example as described in Dressman et al., Proc. Natl. Acad. Sci. USA 100:8817-8822 (2003), which is incorporated herein by reference.

Different elements and components may be removably coupled. As used herein, when two or more elements or components are "removably coupled" (or "removably engaged") the elements are readily separable without destroying the coupled components. Elements are readily separable when the elements may be separated from each other without undue effort or a significant amount of time spent in separating the components. For example, in some embodiments, a sample carrier may be removably coupled to a system rack numerous times during the lifetime of the sample carrier. When removably coupled, the sample carrier and the system rack may operate together in a suitable manner for carrying out one or more protocols. In particular embodiments, the elements are automatically removably coupled by a machine or system. Furthermore, in some embodiments, the removably coupled elements are directly attached to one another such that some contact is made between the coupled elements. In other embodiments, the removably coupled elements have intervening elements that facilitate removably coupling. Exemplary modes for removably coupling components include, but are not limited to, interactions mediated by frictional engagement (e.g., interference fit, snap-fit), magnetism, vacuum, charge, mild adhesives, mechanical clamping, or the like.

In other embodiments, different elements and components may not be readily separable. For example, a thermal module may not be readily separable from the thermal-control block that the thermal module is secured to. In some embodiments, components of the sample carrier may be discrete components that are secured to each other in a manner such that the components form a unitary structure. In other embodiments, one or more of the components may not be readily separable from other components. Thus, as used herein, the phrase "[Element A] coupled to [Element B]" may include Elements A and B being discrete components that are removably coupled to each other, discrete components that are secured to each other and not readily separable, or portions of the same structure.

As used herein, phrases such as "a plurality of [elements]" and "an array of [elements]" and the like, when used in the detailed description and claims, do not necessarily include each and every element that a component may have. The component may have other elements that are similar to the plurality of elements. For example, the phrase "a plurality of chamber cells [being/having a recited feature]" does not necessarily mean that each and every chamber cell of the component has the recited feature. Other chamber cells may not include the recited feature. Accordingly, unless explicitly stated otherwise (e.g., "each and every chamber cell [being/having a recited feature]"), embodiments may include similar elements that do not have the recited features.

Figure 1B:
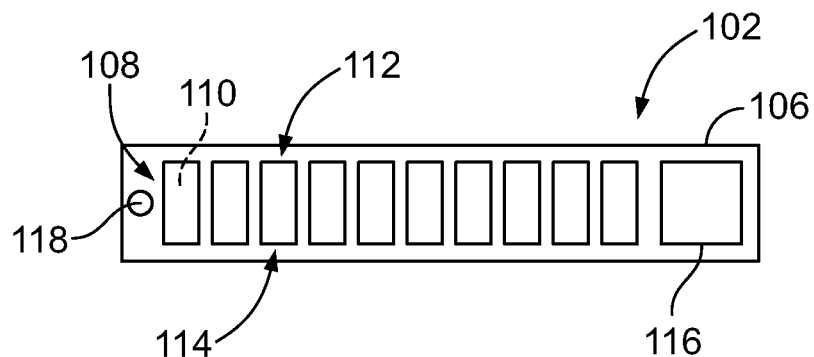
FIG. 1B is a schematic front or plan view of a sample carrier that may be used by the assay system of FIG. 1A.

FIG. 1A is schematic illustration of an assay system 100 in accordance with an embodiment, and FIG. 1B is a schematic front or plan view of a sample carrier 102 that may be used by the assay system 100. The assay system 100 includes a system rack 104 that is configured to hold a plurality of the sample carriers 102 during an assay protocol. During the assay protocol, biological or chemical samples disposed along sample substrates (not shown) may be prepared and/or analyzed by flowing one or more fluids (e.g., liquid or gas) through a reaction chamber and along the biological or chemical sample. By way of example, the assay protocol may include in-situ hybridization (ISH), fluorescent ISH (FISH), or immuno-histochemistry (IHC). It should be understood, however, that various assay protocols may be performed by the assay system 100. In the illustrated embodiment, liquids are drained through the reaction chambers using gravity alone. In other embodiments, however, such as the assay system 700 (shown in FIG. 27), a pneumatic system may force fluids through the reaction chambers.

With respect to FIG. 1B, each of the sample carriers 102 includes a thermal-control block 106 and one or more chamber cells 108. Each of the chamber cells 108 defines a reaction chamber 110 within the chamber cell 108 or between the chamber cell 108 and another component, such as the thermal-control block 106 or a sample substrate (not shown) that the chamber cell 108 is mounted upon. The reaction chamber 110 extends between an inlet 112 and an outlet 114. Optionally, the sample carrier 102 may include at least one of a thermal module 116 or a temperature sensor 118 secured to the thermal-control block 106. The thermal module 116 may control a temperature that is experienced by the sample substrates within the reaction chambers. The temperature sensor 118 may detect temperature data that may be used to control the thermal module 116. In other embodiments, the system rack 104 may include at least one of the temperature sensor 118 or the thermal module 116.

The assay system 100 may also include a fluidic-control system 120 that is capable of providing fluids to the sample carriers 102. The fluidic-control system 120 may have a storage assembly 122, a delivery sub-system 124, and a waste reservoir 126. The storage assembly 122 may include one or more sources 128 of reagents, wash solutions, buffers, and the like that are necessary for carrying out the designated assay protocol. In the illustrated embodiment, the delivery sub-system 124 includes a robotic arm 130 having one or more pneumatically-controlled conduits 132 (e.g., syringes). The conduits 132 are capable of drawing fluids from the sources 128. The robotic arm 130 is configured to move the drawn fluids from the storage assembly 122 to the sample carriers 102, wherein the fluids are provided to the inlets 112. In an exemplary embodiment, the inlets 112 are trough-shaped. As liquids are provided to the inlets 112, the liquids may pool within the inlets 112. In an exemplary embodiment, the reaction chambers are configured to permit the liquids to flow therethrough based on gravity alone. In other embodiments, one or more of the liquids may be actively pumped through the reaction chambers.

Operation of the different components of the assay system 100 may be controlled by a computing system 140 having a system controller 142. The system controller 142 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The functions may be executed within a commercially reasonable time period. The above examples are exemplary only, and are thus not necessarily intended to limit in any way the definition and/or meaning of the term system controller. In the exemplary embodiment, the system controller 142 executes a set of instructions that are stored in one or more storage elements, memories, or modules in order to at least one of obtain and analyze detection data. Storage elements may be in the form of information sources or physical memory elements within the assay system 100. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The set of instructions may include various commands that instruct the assay system 100 to perform specific operations, such as the methods and processes for carrying out an assay protocol. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RANI (NVRAM) memory. The above memory types are exemplary only, and are thus not limiting as to the types of memory usable for storage of a computer program.

The system controller 142 may be connected to the other components or sub-systems of the assay system 100 via communication links (indicated by dashed lines). The system controller 142 may also be communicatively connected to off-site systems or servers. The communication links may be hardwired or wireless. The system controller 142 may receive user inputs or commands, from a user interface of the computing system 140. Such user input devices may include a keyboard, mouse, a touch-screen panel, and/or a voice recognition system, and the like. In particular embodiments, the system controller 142 is communicatively coupled to the thermal modules 116 (FIG. 1A) and the temperature sensors 118 (FIG. 1A).

FIGS. 2-26 describe various embodiments, such as sample carriers and system racks. Although certain features may be described with respect to a particular embodiment, it should be understood that those features may be incorporated into other embodiments. For example, the sample carrier 310 (shown in FIG. 7) includes a removable cover body 320. Although the sample carriers 670 (shown in FIG. 25) are not shown as having removable cover bodies, it should be understood that the sample carriers 670 may be modified to include removable cover bodies. As another example, the thermal-control block 532 (shown in FIG. 18) has an active surface 542 (shown in FIG. 20) with shaped features (e.g., molded features). It should be understood that other thermal-control blocks may include similarly or identically shaped features. Yet as another example, the thermal-control block 402 (shown in FIG. 14) includes channels 452 (shown in FIG. 14) therethrough for transferring thermal energy. It should be understood that other thermal-control blocks may include such channels.

Figure 2:
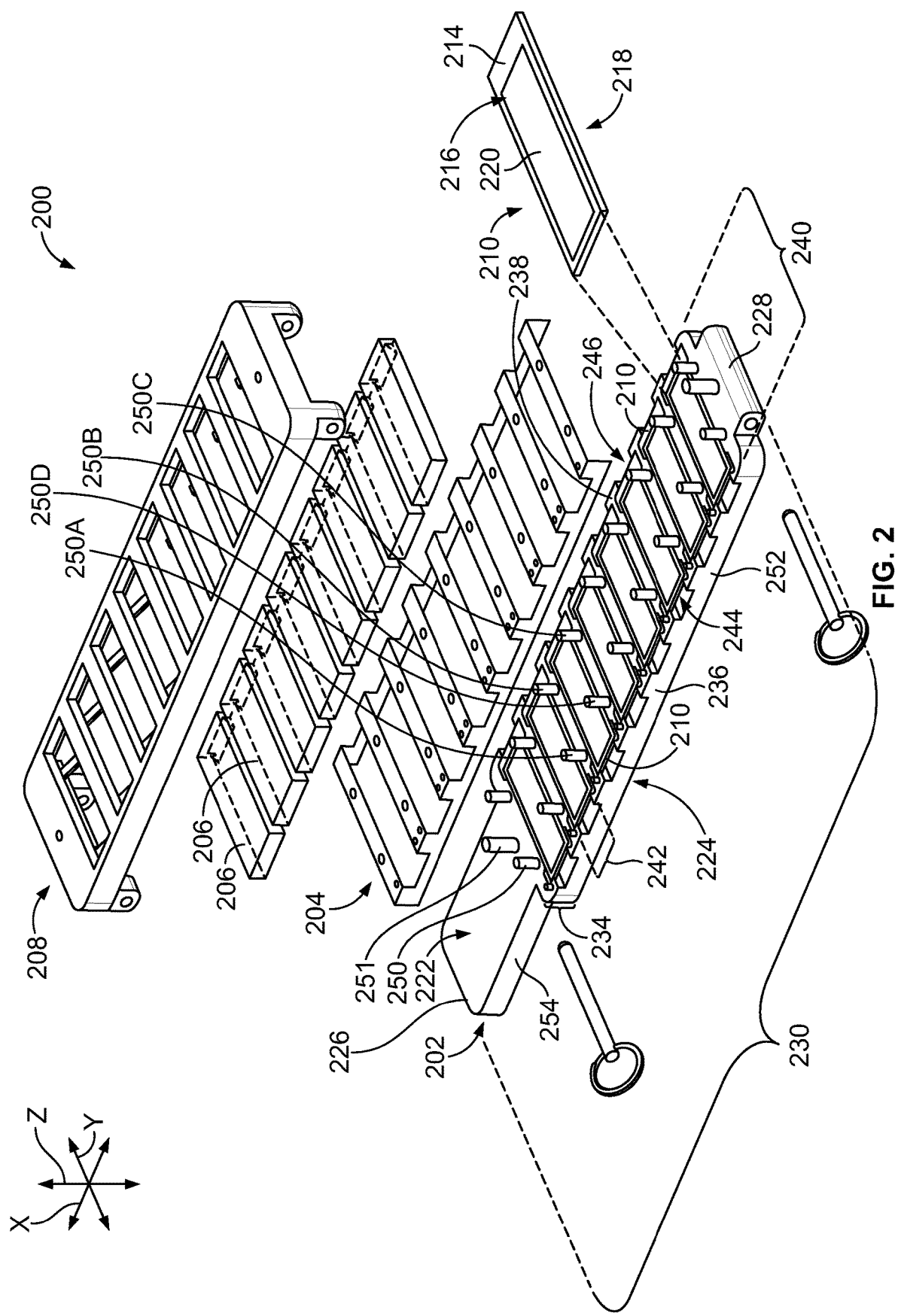
FIG. 2 is an exploded view of a sample carrier formed in accordance with an embodiment that may be used with the assay system of FIG. 1A.

FIG. 2 is an exploded view of a sample carrier 200 formed in accordance with an embodiment. The sample carrier 200 may replace the sample carriers 102 (FIG. 1) and be configured for operation with the assay system 100 (FIG. 1). The sample carrier 200 has a plurality of carrier components, including an elongated thermal-control block 202, an optional cell spacer 204, a plurality of chamber cells 206, and a removable cover body 208. Each of the carrier components is configured to be stacked with respect to one another along a Z-axis. For example, the cell spacer 204 may be positioned onto the thermal-control block 202. In other embodiments, the sample carrier 200 may not include a cell spacer. In such embodiments, the features of the cell spacer may be incorporated by the thermal-control block 202 and/or the chamber cells 206.

Figure 3:
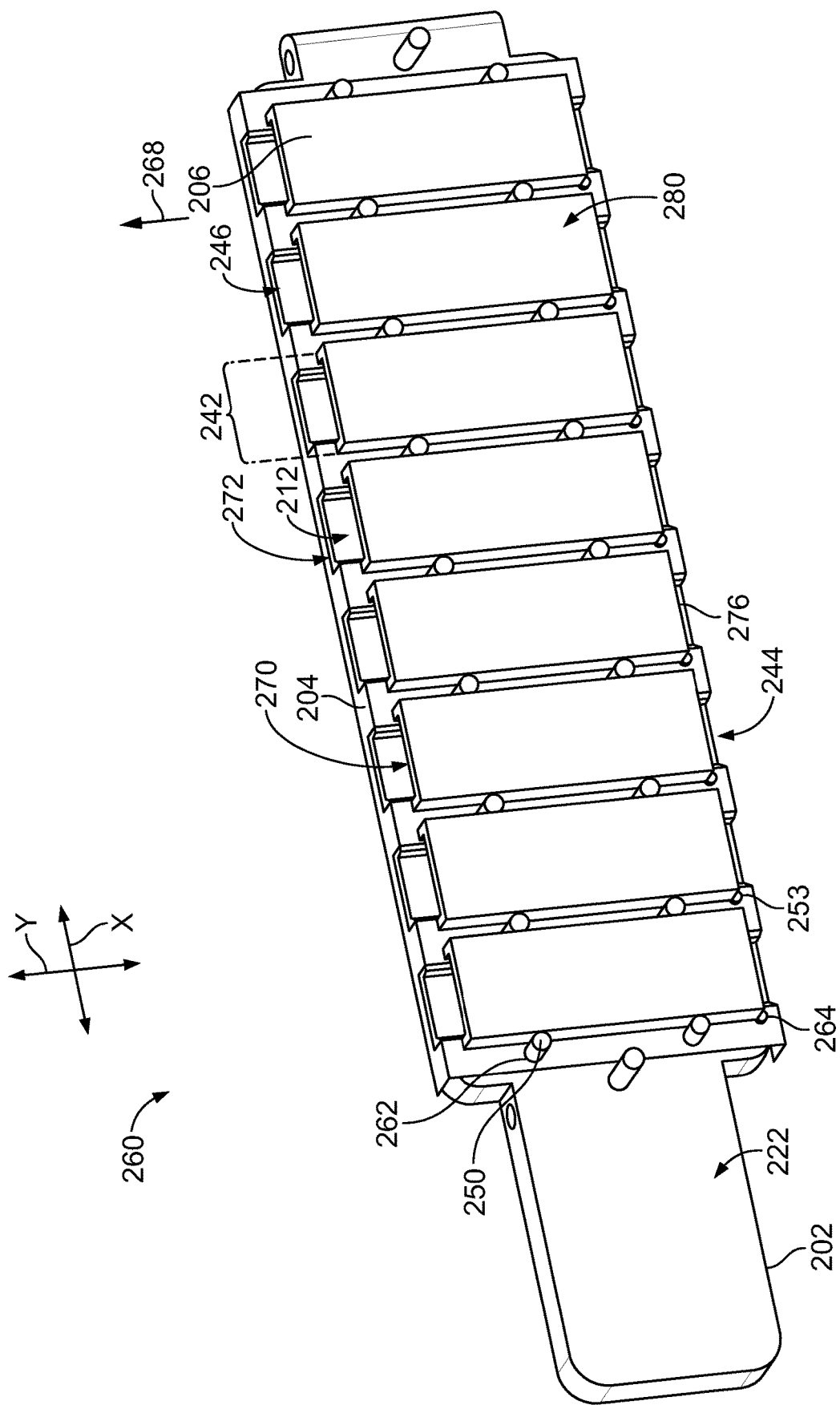
FIG. 3 is a perspective view of a portion of the sample carrier of FIG. 2 showing chamber cells in designated positions relative to a thermal-control block.
Figure 6:
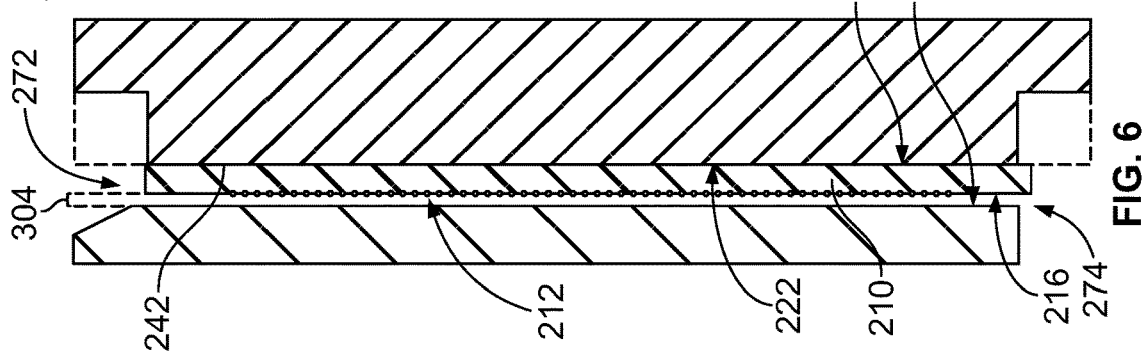
FIG. 6 is a cross-section of a reaction chamber alongside a sample substrate in accordance with an embodiment.

The chamber cells 206 may be positioned onto the cell spacer 204 and/or the thermal-control block 202 to define corresponding reaction chambers 212 (shown in FIGS. 3 and 6). The removable cover body 208 may be positioned onto the chamber cells 206, the cell spacer 204, and/or the thermal-control block 202. The removable cover body 208 may be secured to the thermal-control block 202 to hold the chamber cells 206 at designated positions between the removable cover body 208 and the thermal-control block 202. When fully assembled, as shown in FIG. 5, the sample carrier 200 provides a device where multiple sample substrates 210 may be positioned within corresponding reaction chambers 212 (FIGS. 3 and 6) to undergo one or more designated reactions.

Each of the sample substrates 210 has a substrate body 214 having opposite first and second body surfaces 216, 218. When the sample carrier 200 is fully assembled, the first body surface 216 may define a portion of the reaction chamber 212 and include a designated sample 220 thereon. As used herein, the term "sample" may include a single biological or chemical sample (e.g., tissue) or a plurality of biological or chemical samples (e.g., nucleic acids). In an exemplary embodiment, the sample substrate 210 includes a microarray, such as BeadChip Array available from Illumina Inc. However, a variety of other biological or chemical samples may be used in other embodiments.

The thermal-control block 202 has an active surface (or first block surface) 222 and an outer surface (or second block surface) 224 that face in opposite directions along the Z-axis. A thickness 234 of the thermal-control block 202 is defined between the active and outer surfaces 222, 224. In some embodiments, the thickness is less than 4.0 centimeters (cm). In particular embodiments, the thickness is less than or equal to about 3.0 cm, less than or equal to about 2.0 cm, less than or equal to about 1.5 cm, less than or equal to about 1.0 cm, or less than or equal to about 0.75 cm. The thermal-control block 202 also has first and second end edges 226, 228 in which a length 230 of the thermal-control block 202 extends therebetween. The thermal-control block 202 also includes a first side edge 236 and a second side edge 238. A width 240 of the thermal-control block 202 may be defined between the first and second side edges 236, 238.

The active surface 222 includes a series of mounting areas 242 that are distributed along the length 230 of the thermal-control block 202. In the illustrated embodiment, the mounting areas 242 are evenly distributed along the length 230. In other embodiments, however, the mounting areas 242 may have any suitable location. The mounting areas 242 represent areas of the active surface 222 that will receive one of the sample substrates 210 thereon. The mounting areas 242 may be designated or determined by physical features of the active surface 222 and/or other components of the sample carrier 200. In other embodiments, the mounting areas 242 are not readily identifiable. In such embodiments, the mounting areas may only be identified after the chamber cells 206 and/or sample substrates 210 have been positioned along the active surface 222. As shown, the active surface 222 includes eight mounting areas 242. However, it should be understood that alternative embodiments may include a different number of mounting areas. In the illustrated embodiment, each mounting area 242 may include a portion of the active surface 222 that is configured to interface with the second body surface 218 of each of the sample substrates 210.

Optionally, the thermal-control block 202 may include a plurality of downstream recesses 244 that are distributed along the first side edge 236 of the thermal-control block 202. Optionally, the thermal-control block 202 may include a plurality of upstream recesses 246 that are distributed along the second side edge 238 of the thermal-control block 202. In some embodiments, the downstream and upstream recesses 244, 246 may form, at least in part, corresponding ports for flowing a liquid through the reaction chamber 212. In some embodiments, the downstream and upstream recesses 244, 246 may facilitate positioning of the sample substrate 210 at the designated mounting areas 242 along the active surface 222.

As shown, the thermal-control block 202 may include a plurality of alignment projections 250, 251 that extend away from the active surface 222. The alignment projections 250, 251 may be any physical feature that is capable of engaging other components of the sample carrier 200 for aligning the components relative to the thermal-control block 202. For example, the alignment projections 250, 251 may be set screws or molded features of the thermal-control block 202.

The alignment projections 250 may be configured to engage at least one of the cell spacer 204, the chamber cells 206, and/or the removable cover body 208 for aligning the respective component relative to the thermal-control block 202. As shown, four alignment projections 250A, 250B, 250C, 250C designate or define an associated mounting area 242 such that a sample substrate 210 is configured to be positioned between the alignment projections 250A, 250D and between alignment projections 250B, 250C. The alignment projections 250 may engage corresponding edges of the sample substrate 210. The alignment projections 251 are configured to engage the removable cover body 208. The thermal-control block 202 may also include alignment projections 253. The alignment projections 253 may engage the cell spacer 204 and, optionally, the sample substrates 210. The alignment projections 250 may block movement of the sample substrates 210 in either direction along the X-axis, and the alignment projections 253 may prevent movement of the sample substrates 210 in one direction along the Y-axis. In such embodiments, the alignment projections 250, 253 may cooperate in aligning corresponding sample substrates 210 prior to the chamber cells 206 being positioned onto the thermal-control block 202 and/or the cell spacer 204.

In the illustrated embodiment, the thermal-control block 202 includes a main section 252 and a body extension 254. The main section 252 includes the plurality of mounting areas 242. In some embodiments, the body extension 254 is configured to engage a thermal module along the active surface 222 and/or the outer surface 224. In some embodiments, the body extension 254 may represent a handle that is configured to be gripped by, for example, a technician for positioning the sample carrier 200 within the assay system. In the illustrated embodiment, the thermal-control block 202 includes only one body extension. In other embodiments, the thermal-control block 202 may include a body extension that is positioned on an opposite end of the main section 252.

FIG. 3 is a perspective view of a carrier sub-assembly 260 of the sample carrier 200 (FIG. 2). The carrier sub-assembly 260 includes the thermal-control block 202, the cell spacer 204, and the chamber cells 206. The carrier sub-assembly 260 may represent the portion of the sample carrier 200 prior to the removable cover body 208 being mounted onto the sub-assembly 260.

As shown, the cell spacer 204 has been positioned along the active surface 222 of the thermal-control block 202. The cell spacer 204 includes openings 262, 264 that receive corresponding alignment projections 250, 253 from the thermal-control block 202. The alignment projections 250 and 253 may cooperate in locating the cell spacer 204 at a designated position along the active surface 222. After the cell spacer 204 has been positioned onto the thermal-control block 202, the individual chamber cells 206 may be positioned along the mounting areas 242 of the active surface 222. As shown, the chamber cells 206 directly engage the cell spacer 204 and are positioned over the mounting areas 242. The cell spacer 204 may function to form a flow section of the reaction chamber 212 between the chamber cell 206 and the first body surface 216 of the sample substrate 210 (FIG. 2).

The chamber cells 206 are disposed at designated positions over respective mounting areas 242. The chamber cells 206 have respective receiving sides or ends 270 that face in a common direction 268 along the Y-axis when mounted to the thermal-control block 202 at the designated positions. The reaction chambers 212 have corresponding ports 272 (hereinafter referred to as inlets) at the respective receiving sides 270 that open in the common direction 268. Each inlet 272 may be formed by the corresponding chamber cell 206 and/or the thermal-control block 202. In the illustrated embodiment, each inlet 272 is formed by the corresponding chamber cell 206 and the upstream recesses 246 of the thermal-control block 202. The inlets 272 are configured to receive fluids, such as reagent and wash solutions, from an assay system (not shown). The reaction chambers 212 also have corresponding ports 274 (shown in FIG. 5 and hereinafter referred to as outlets) at respective output sides or ends 276 of the chamber cells 206. The outlets 274 are configured to permit the fluid to exit the corresponding reaction chambers 212. Each outlet 274 may be formed by the corresponding chamber cell 206 and/or the thermal-control block 202. In the illustrated embodiment, each outlet 274 is formed by the corresponding chamber cell 206 and the downstream recesses 244 of the thermal-control block 202.

In the illustrated embodiment of FIG. 3, the chamber cells 206 are positioned individually within confined regions or spaces 280. Each confined region 280 represents a space defined by the corresponding alignment projections 250 and 253. Optionally, the confined region 280 is sized relative to the corresponding chamber cell 206 such that the chamber cell 206 is permitted to float or move relative to the alignment projections 250, 253 that define the corresponding confined region 280. In some embodiments, the chamber cells 206 may be simultaneously positioned within the respective confined regions 280. Such embodiments are described in greater detail below.

FIG. 4 is an isolated perspective view of the removable cover body 208. The removable cover body 208 is configured to be secured to the thermal-control block 202 (FIG. 2) with a plurality of the chamber cells 206 (FIG. 2) therebetween to hold the chamber cells 206 at the designated positions. The removable cover body 208 includes an underside 282 and an outer side 284. The underside 282 is configured to engage or interface with the chamber cells 206. The removable cover body 208 includes a plurality of coupling elements 286 that project away from the underside 282. The coupling elements 286 are configured to directly engage the thermal-control block 202. The coupling elements 286 may form hinge elements that, when coupled to the thermal-control block 202, permit the removable cover body 208 to rotate between open and closed positions.

The underside 282 forms a receiving space 290 that generally receives the plurality of chamber cells 206 (FIG. 2). The removable cover body 208 also includes a plurality of biasing elements 288. The biasing elements 288 extend into the receiving space 290. The biasing elements 288 are configured to engage the chamber cells 206 and provide a biasing force that presses the chamber cells 206 against the cell spacer 204 and/or the thermal-control block 202 (FIG. 2). In the illustrated embodiment, the biasing elements 288 are spring fingers stamped-and-formed from sheet metal. It should be understood, however, that the biasing elements 288 may have other structures. For example, the biasing elements 288 may be fingers formed from the removable cover body 208 or coil springs that extend from the underside 282 into the receiving space 290. The removable cover body 208 may include windows 292 that are configured to align with respective chamber cells 206. The windows 292 may allowed biasing elements 288 to be deflected into the windows 292. In some embodiments, the windows 292 may also allow visual inspection of the reaction chambers 212. For example, the windows 292 may permit an imaging detector to detect light signals emitted from the reaction chamber 212.

FIG. 5 is a perspective view of the fully assembled sample carrier 200. As shown, each of the chamber cells 206 is held at a substantially fixed position over the corresponding sample substrate 210 to define the corresponding reaction chamber 212 therebetween. FIG. 5 shows the outlets 274 of the reaction chambers 212 along the corresponding output sides 276 (FIG. 3). The biasing elements 288 are shown in deflected positions. In the deflected positions, the biasing elements 288 provide a biasing force 294 that presses the chamber cells 206 against the cell spacer 204 and/or the thermal-control block 202.

The thermal-control block 202 may be coupled to the removable cover body 208 using a variety of methods. For example, in the illustrated embodiment, the sample carrier 200 includes locking pins 296 that are inserted through thru-holes 298 of the coupling elements 286. The locking pins 296 may also be received within bores 299 (FIG. 2) of the thermal-control block 202. Accordingly, the locking pins 296 may hold the removable cover body 208 at a fixed position relative to the thermal-control block 202.

The removable cover body 208 and the thermal-control block 202 may form a unitary structure 295 that is configured to be positioned within an assay system, such as the assay system 100. When the sample carrier 200 is fully assembled in the unitary structure 295, the chamber cells 206 and the sample substrates 210 may have substantially fixed positions with respect to each other and other components of the sample carrier 200. As such, the unitary structure 295 may permit a technician to hold and carry the sample carrier 200 without concern that the chamber cells 206 and/or the sample substrates 210 may inadvertently move during transfer. Thus, all of the chamber cells 206 within the sample carrier 200 may be simultaneously moved and positioned for receiving liquids from the assay system.

FIG. 6 illustrates a cross-section of the sample carrier 200 and, in particular, a cross-section that includes one of the reaction chambers 212. The reaction chamber 212 is formed between an interior mounting surface 302 of the chamber cell 206 and the first body surface 216 of the sample substrate 210. The reaction chamber 212 extends between the corresponding inlet 272 and the corresponding outlet 274. In the illustrated embodiment, the inlet 272 is trough-shaped to facilitate receiving the liquid from the assay system.

A height 304 of the reaction chamber 212 is defined between the interior mounting surface 302 and the first body surface 216. The interior mounting surface 302 is planar in the illustrated embodiment. In such embodiments, the height 304 of the reaction chamber 212 is determined by a thickness of the cell spacer 204 (FIG. 2). In other embodiments, however, the interior mounting surface 302 may be shaped to include a recess that becomes, at least in part, the reaction chamber 212 when the chamber cell 206 is mounted onto the mounting area. Yet in other embodiments, the thermal-control block may be shaped to include a recess or runway that becomes, at least in part, the reaction chamber 212 when the chamber cell 206 is mounted thereon. As such, the cell spacer 204 may be optional.

During an assay protocol, liquids are provided to the inlet 272 and permitted to flow through the reaction chamber 212 to the outlet 274. In some embodiments, the flow of the liquid is driven by gravity. In other embodiments, however, a pneumatic system may drive a flow of the liquid through the reaction chamber 212. In the illustrated embodiment, the portion of the reaction chamber 212 that has a uniform height 304 may be referred to as a flow section of the reaction chamber 212. The flow section extends between the inlet 272 and the outlet 274. However, it should be understood that the flow section is not required to have uniform dimensions.

The flow of the liquid may be based, in part, on the dimensions of the flow section. In some embodiments, the height 304 along the flow section is at most 500 µm or 400 µm. In some embodiments, the height 304 along the flow section is at most 300 µm or 200 µm. In some embodiments, the height 304 along the flow section is at most 150 µm or 100 µm. In certain embodiments, the height 304 is at most 80 µm or at most 70 µm. In particular embodiments, the height 304 is at most 60 µm or at most 50 µm. Yet in more particular embodiments, the height 304 is at most 40 µm. However, it should be understood that embodiments are not limited to the examples provided above and that the height 304 may be greater than 500 µm.

Also shown in FIG. 6, the second body surface 218 of the sample substrate 210 is in intimate contact with the active surface 222 of the thermal-control block 202 at the corresponding mounting area 242. As described in greater detail below, the thermal-control block 202 is configured to permit thermal energy to transfer therethrough for providing the thermal energy to the reaction chamber 212 and removing the thermal energy from the reaction chamber 212.

Figure 7:
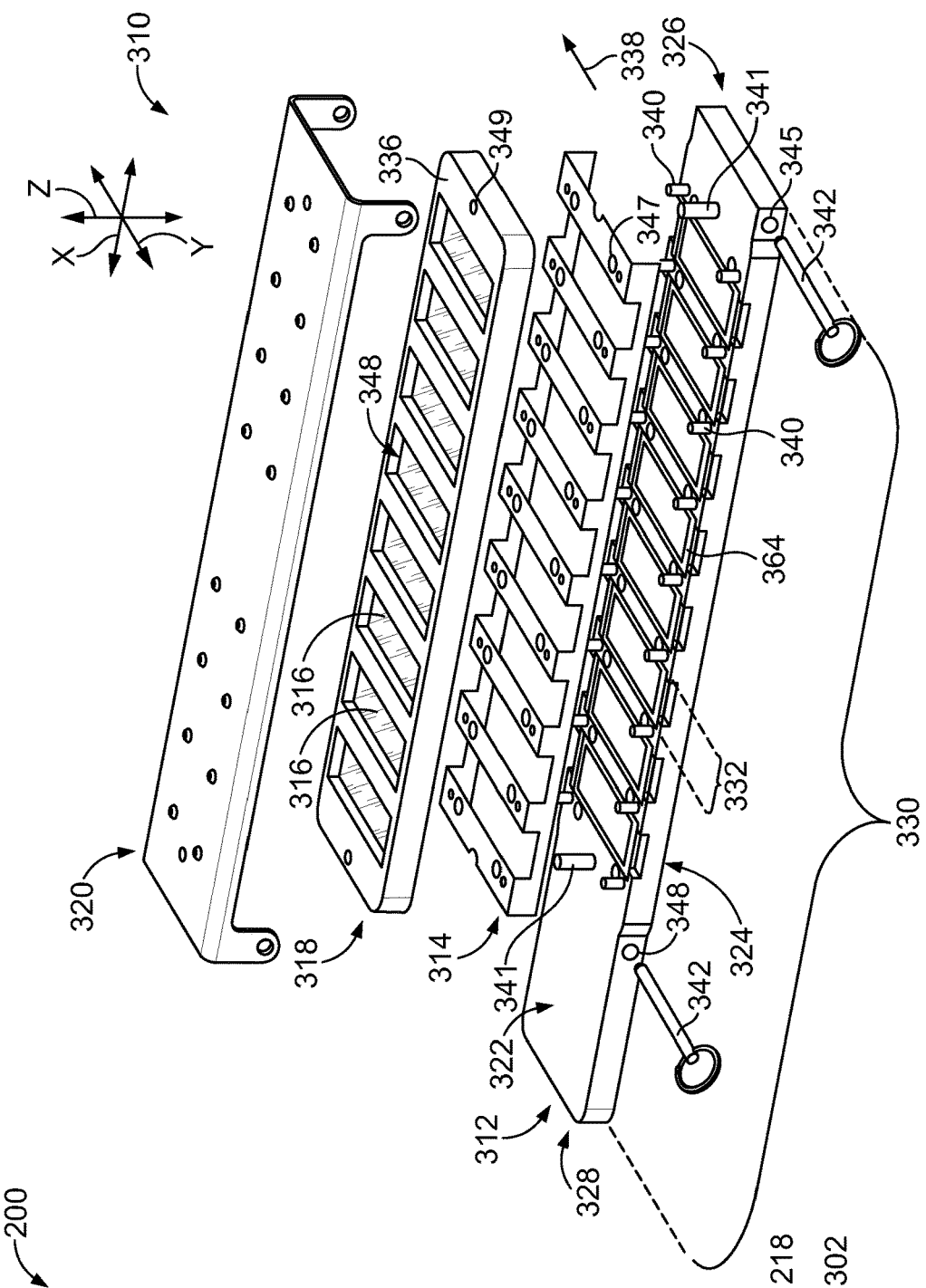
FIG. 7 is an exploded view of a sample carrier formed in accordance with an embodiment.

FIG. 7 is an exploded view of a sample carrier 310 formed in accordance with an embodiment. The sample carrier 310 may replace the sample carriers 102 (FIG. 1) and may include components that are similar or identical to the components of the sample carrier 200 (FIG. 2). For example, the sample carrier 310 includes an elongated thermal-control block 312, an optional cell spacer 314, a plurality of chamber cells 316, a nest assembly 318 that includes the chamber cells 316, and a removable cover body 320. Each of the carrier components is configured to be stacked with respect to one another along a Z-axis in a similar manner as described above with respect to the sample carrier 200.

The thermal-control block 312 has an active surface 322 and an outer surface 324 that face in opposite directions. The thermal-control block 312 includes first and second block ends 326, 328 in which a length 330 of the thermal-control block 312 extends therebetween. The active surface 322 has a series of mounting areas 332 that are distributed along the length 330 of the thermal-control block 312. The chamber cells 316 are configured to be disposed over respective mounting areas 332.

The removable cover body 320 is configured to be coupled to the thermal-control block 312 with the chamber cells 316 (or nest assembly 318) therebetween. The thermal-control block 312 and the chamber cells 316 are shaped to form corresponding reaction chambers 334 (shown in FIG. 10) therebetween. The reaction chambers 334 may be similar or identical to the reaction chambers 212 (FIG. 3). For example, the reaction chambers 334 may have corresponding inlets (not shown) that open in a common direction 338 along the Y-axis to an exterior of the sample carrier.

Unlike the sample carrier 200 (FIG. 2), the sample carrier 310 includes the nest assembly 318. The nest assembly 318 may enable simultaneously positioning the chamber cells 316 at the respective mounting areas 332 when the sample carrier 310 is assembled. To this end, the nest assembly 318 includes a nest frame 336 that is configured to hold the chamber cells 316. The nest frame 336 may floatably hold the chamber cells 316 such that the chamber cells 316 are permitted to move (e.g., shift) relative to the nest frame 336 as the nest assembly 318 is mounted to the thermal-control block 312 and/or the cell spacer 314. For example, the chamber cells 316 may engage alignment projections 340 of the thermal-control block 312. As the nest assembly 318 is positioned over the thermal-control block 312 and/or the cell spacer 314, the chamber cells 316 may be moved relative to the nest frame 336 and the thermal-control block 312 by the alignment projections 340.

The removable cover body 320 may be similar to the removable cover body 208 (FIG. 2). For example, the removable cover body 320 may be positioned onto the nest assembly 318 and engage the chamber cells 316 to press the chamber cells 316 against the cell spacer 314 and/or the thermal-control block 312. The removable cover body 320 may be secured to the thermal-control block 312 to hold the chamber cells 316 at designated positions between the removable cover body 320 and the thermal-control block 312. In the illustrated embodiment, the removable cover body 320 may be secured to the thermal-control block 312 using locking pins 342.

FIG. 8 is a perspective view of the nest assembly 318. The nest frame 336 has an interior side 344 (shown in FIG. 8) and an outer side 346. The interior side 344 and the outer side 346 face in opposite directions along the Z-axis. The interior side 344 is configured to face the active surface 322 (FIG. 7) when the nest assembly 318 is positioned over the thermal-control block 312 (FIG. 7). The nest frame 336 may be plate- or block-shaped and define a plurality of cell windows 348 (shown in FIG. 7). Each of the cell windows 348 is aligned with a corresponding chamber cell 316. The cell windows 348 may allow the removable cover body 320 (FIG. 7) to engage the chamber cells 316.

The interior side 344 may include a receiving space 352 where the chamber cells 316 are located. The nest assembly 318 is configured to hold each of the chamber cells 316 within a confined space 350 relative to the nest frame 336. Each of the confined spaces 350 represent a three-dimensional volume of space in which the chamber cell 316 may be located. The confined spaces 350 may be larger than the space occupied by the chamber cells 316 such that each of the chamber cells 316 is permitted to shift within the corresponding confined space 350. In such embodiments, the chamber cells 316 may be permitted to align with the mounting area 332 (FIG. 7) as the nest assembly 318 is coupled to the thermal-control block 312 (FIG. 7).

Optionally, the nest assembly 318 may include retaining projections 354 that are configured to hold the chamber cells 316 within the respective confined spaces 350. In the illustrated embodiment, the retaining projections 354 are set screws having a distal end that is shaped to engage an interior mounting surface 356 of the chamber cell 316. The interior mounting surface 356 of the chamber cell 316 is configured to interface with the sample substrate 364 and/or the thermal-control block 312. More specifically, the retaining projections 354 may include support surfaces 355 that face the interior side 344 or the interior surface 356 of a corresponding chamber cell 316. The support surfaces 355 are configured to engage the corresponding chamber cells 316 to prevent the chamber cells 316 from falling away from the nest frame 336. For example, when the interior side 344 faces in a direction along the force of gravity, the support surfaces 355 may engage the chamber cells 316 and hold the chamber cells 316 within the confined spaces 350. Each confined space 350 may be defined as the space that exists between opposing retaining projections 354 and inner edge surfaces 360, 362 of the interior side 344 that oppose each other.

FIG. 9 is an isolated perspective view of the removable cover body 320. The removable cover body 320 is configured to be secured to the thermal-control block 312 (FIG. 7) with the nest assembly 318 (FIG. 7). The removable cover body 320 includes an underside 370 and an outer side 372. The underside 370 is configured to engage or interface with the nest assembly 318. The underside 370 may form a receiving space 376 that generally receives the plurality of chamber cells 316 (FIG. 7). The receiving space 376 may be defined by sidewalls 378, 380 that extend along a length of the removable cover body 320 and oppose each other with the receiving space 376 therebetween. In the illustrated embodiment, the sidewalls 378, 380 are portions of the removable cover body 320 that are folded over with respect to a main section 382. The sidewalls 378, 380 extend away from the main section 382. However, the sidewalls 378, 380 may be formed in other manners. For example, the sidewalls 378, 380 and the main section 382 may be discrete components in other embodiments that are coupled to each other to form the removable cover body 320.

The removable cover body 320 includes a plurality of coupling elements 374 that project away from the underside 370. In some embodiments, the main section 382 may include one or more alignment holes 388 that are sized and shaped to receive corresponding alignment projections 341 (shown in FIG. 7) of the thermal-control block 312. The coupling elements 374 may also be characterized as coupling arms or legs. The coupling elements 374 form portions of the sidewalls 378, 380. The coupling elements 374 are configured to directly engage the thermal-control block 312. The coupling elements 374 may extend a height 384 away from the main section 382. The receiving space 376 may be sized and shaped to accommodate the thermal-control block 312 and the nest assembly 318.

Also shown, the removable cover body 320 also includes a plurality of biasing elements 386. The biasing elements 386 are coupled to and extend away from the main section 382 into the receiving space 376. The biasing elements 386 are configured to engage the chamber cells 316 (FIG. 7) and provide a biasing force that presses the chamber cells 316 against the cell spacer 314 (FIG. 7) and/or the thermal-control block 312 (FIG. 7). In an exemplary embodiment, each of the chamber cells 316 is configured to be engaged by two biasing elements 386. In the illustrated embodiment, the biasing elements 386 are spring fingers stamped-and-formed from sheet metal that are then attached to the main section 382. It should be understood, however, that the biasing elements 386 may have other structures. For example, in an alternative embodiment, the spring fingers may be stamped and formed from the sheet metal that forms the main section 382 and the coupling elements 374.

Figure 10:
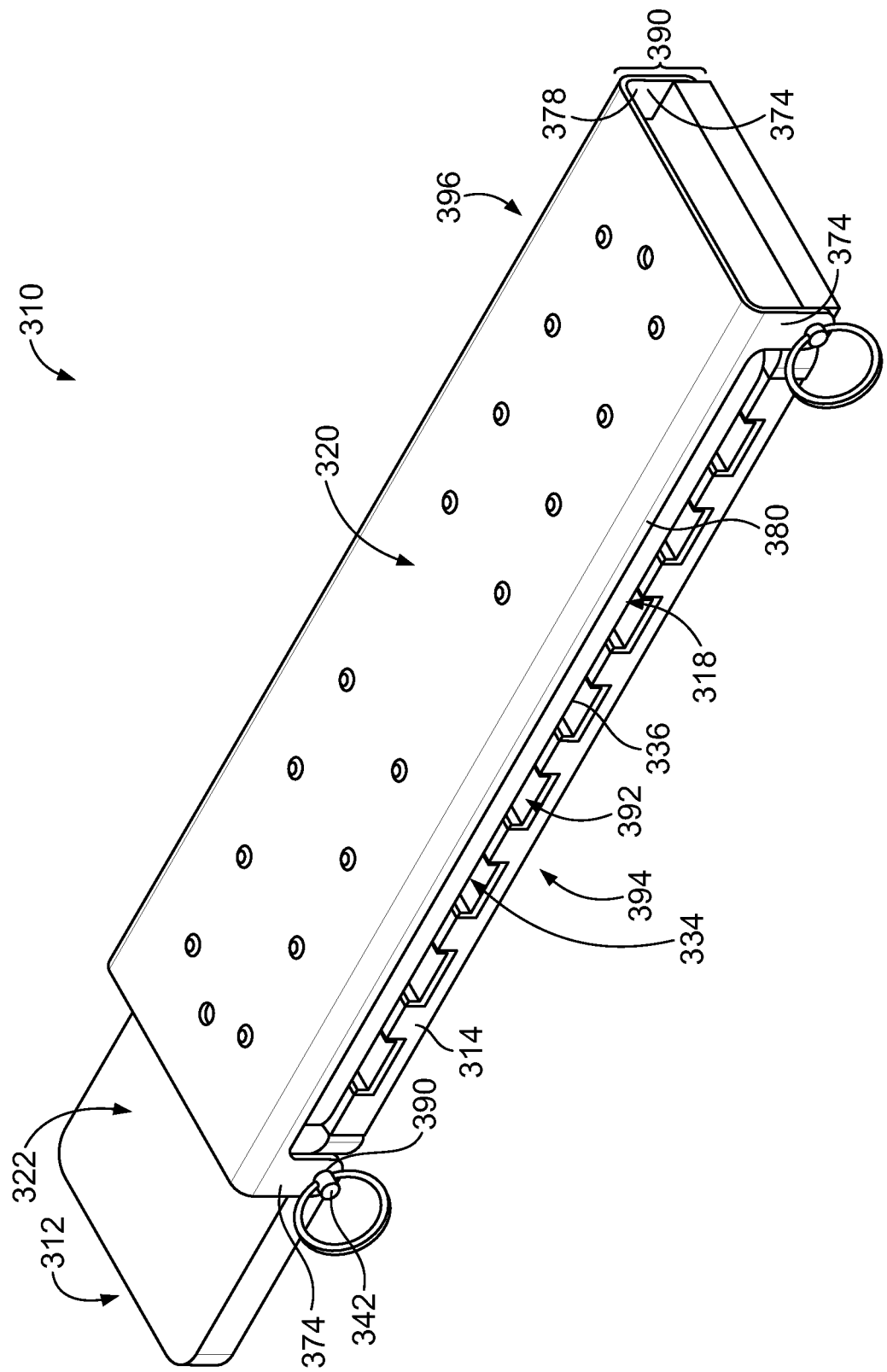
FIG. 10 is a perspective view of the sample carrier of FIG. 7 when fully assembled.

FIG. 10 is a perspective view of the sample carrier 310 when fully assembled. The following is described with reference to FIGS. 7 and 10. During the assembly process, the thermal-control block 312 is provided. Sample substrates 364 (FIG. 7) are positioned along the active surface 322 at corresponding mounting areas 332 (FIG. 7). The alignment projections 340 (FIG. 7) may facilitate positioning the sample substrates 364 over the designated mounting areas 332. For those embodiments that utilize a cell spacer, the cell spacer 314 may be positioned onto the active surface 322 of the thermal-control block 312 and, in some embodiments, over portions of the sample substrates 364. As the cell spacer 314 is positioned onto the thermal-control block 312, the alignment projections 340, 341 (FIG. 7) may be received through corresponding thru-holes or openings 347, 349 (FIG. 7) of the cell spacer 314. The alignment projections 340, 341 may facilitate locating the cell spacer 314 at a desired position relative to the thermal-control block 312 and the sample substrates 364.

The nest assembly 318 may then be positioned over the cell spacer 314 and/or the thermal-control block 312. Because the chamber cells 316 (FIG. 7) are held by the nest frame 336, the chamber cells 316 (FIG. 7) are simultaneously positioned onto the respective sample substrates 364 when the nest assembly 318 is mounted onto the cell spacer 314 and/or the thermal-control block 312. As described herein, the chamber cells 316 may be permitted to move within the corresponding confined spaces 350 (FIG. 8) relative to the nest frame 336. As the nest assembly 318 is mounted, the alignment projections 341 may be received by the corresponding alignment holes 349 (FIG. 7) of the nest frame 336 and engage the nest frame 336 to locate the nest assembly at the desired position.

The removable cover body 320 may then be positioned over the nest assembly 318. As the removable cover body 320 is positioned over the nest assembly 318, the biasing elements 386 (FIG. 9) may engage corresponding chamber cells 316 and press the corresponding chamber cells 316 against the cell spacer 314 and/or the thermal-control block 312. The removable cover body 320 may then be secured to the thermal-control block 312 using the locking pins 342. For example, the coupling elements 374 have thru-holes 390 that receive the locking pins 342. The locking pins 342 are inserted into corresponding bores 345 (shown in FIG. 7) of the thermal-control block 312. When fully assembled as shown in FIG. 10, the removable cover body 320 and the thermal-control block 312 have fixed positions with respect to each other to form a unitary structure 390 that is capable of being carried and positioned, as a single unit, within an assay system. The sample carrier 310 may have a sandwich-like structure with multiple carrier components stacked relative to one another.

As shown in FIG. 10, the reaction chambers 334 have outlets 392 that open along a common carrier side 394. The outlets 392 are coplanar. The reaction chambers 334 may also have inlets (not shown) that open along a common carrier side 396. The inlets are also coplanar. Each of the common carrier sides 394, 396 may be collectively formed from the thermal-control block 312, the nest frame 336, and the removable cover body 320. In particular, the carrier side 394 includes the sidewall 380, and the carrier side 396 includes the sidewall 378. The sidewalls 378, 380 are sized and shaped to permit access to the inlets and outlets of the reaction chambers 334. In other embodiments, only the inlets may be accessible for delivering the liquids to the reaction chambers 334.

Figure 11:
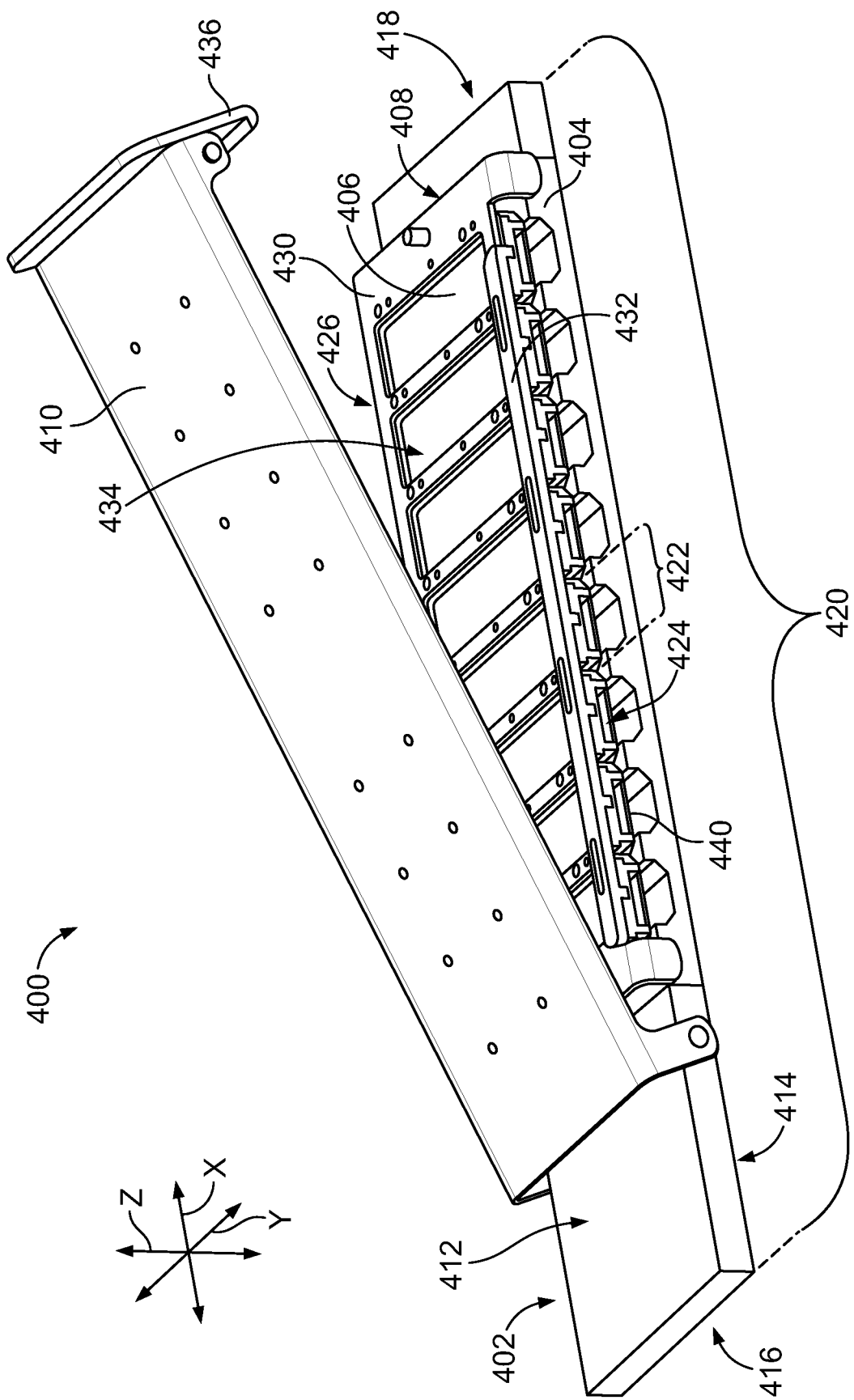
FIG. 11 is a perspective view of a sample carrier formed in accordance with an embodiment having a removable cover body shown in an open position.

FIG. 11 is a perspective view of a sample carrier 400 formed in accordance with an embodiment. The sample carrier 400 may replace the sample carriers 102 (FIG. 1) and may include components that are similar or identical to the components of the sample carrier 200 (FIG. 2) or the sample carrier 310 (FIG. 7). For example, the sample carrier 400 includes an elongated thermal-control block 402, an optional cell spacer 404, a plurality of chamber cells 406, a nest assembly 408 that includes the chamber cells 406, and a removable cover body 410. Each of the carrier components is configured to be stacked with respect to one another along a Z-axis in a similar manner as described above with respect to the sample carrier 200 and the sample carrier 310.

The thermal-control block 402 has an active surface 412 and an outer surface 414 that face in opposite directions. The thermal-control block 402 includes first and second block ends 416, 418 in which a length 420 of the thermal-control block 402 extends therebetween. The active surface 412 has a series of mounting areas 422 that are distributed along the length 420 of the thermal-control block 402. The chamber cells 406 are configured to be disposed over respective mounting areas 422.

The removable cover body 410 is configured to be rotatably coupled to the thermal-control block 402. In FIG. 11, the removable cover body 410 is shown in an open position relative to the remainder (or the thermal-control block 402) of the sample carrier 400. When in a closed position, the chamber cells 406 or the nest assembly 408 may be held between the removable cover body 410 and the thermal-control block 402. The thermal-control block 402 and the chamber cells 406 are shaped to form corresponding reaction chambers 424 therebetween. The reaction chambers 424 may be similar or identical to the reaction chambers described above. For example, the reaction chambers 424 may have corresponding inlets 440 and outlets (not shown) that open in opposite directions along the Y-axis to an exterior of the sample carrier 400.

The nest assembly 408 includes a nest frame 426 that is configured to hold the chamber cells 406. The nest frame 426 may floatably hold the chamber cells 406 such that the chamber cells 406 are permitted to move (e.g., shift) relative to the nest frame 426 as the nest assembly 408 is mounted to the thermal-control block 402 and/or the cell spacer 404. To this end, the nest frame 426 may include a frame body 430 and a cell guide 432 that is coupled to the frame body 430. Optionally, the frame body 430 may be stamped-and-formed from sheet metal and the cell guide 432 may be molded from plastic. The frame body 430 forms windows 434 that provide access to the chamber cells 406. For example, biasing elements (not shown) of the removable cover body 410 may engage the chamber cells 406 through the windows 434. The cell guide 432 is configured to hold the chamber cells 406 such that the chamber cells 406 are positioned between the cell guide 432 and the frame body 430. To this end, the cell guide 432 may include a frame (not shown) that is positioned below the frame body 430. More specifically, the frame may include sidewalls and projections having support surfaces (not shown) that form, with the frame body 430, confined spaces for the respective chamber cells 406. The confined spaces may be similar to the confined spaces 350 (FIG. 8).

The removable cover body 410 may be positioned onto the nest assembly 408 and engage the chamber cells 406 to press the chamber cells 406 against the cell spacer 404 and/or the thermal-control block 402. The removable cover body 410 may be secured to the thermal-control block 402 using a latch assembly 436 when the removable cover body 410 is in the closed position. The removable cover body 410 may hold the chamber cells 406 at designated positions between the removable cover body 410 and the thermal-control block 402 when in the closed position.

Figure 12:
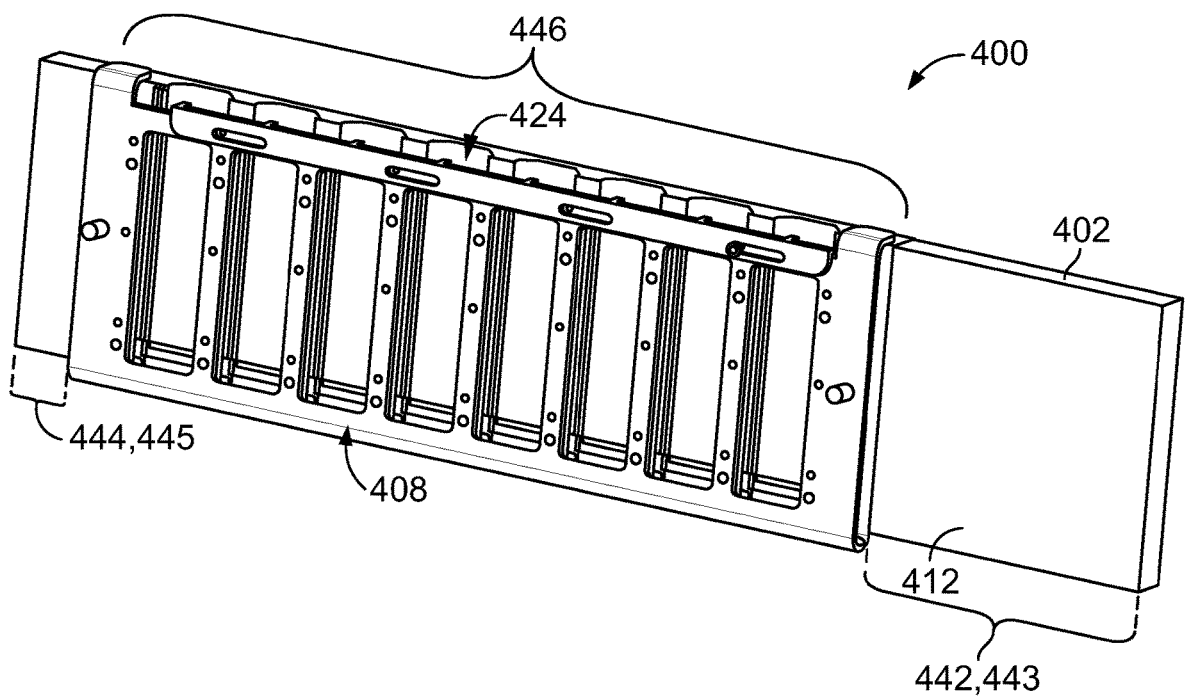
FIG. 12 is a top perspective view of the sample carrier of FIG. 11 with the removable cover body removed.

FIG. 12 is a top perspective view of the sample carrier 400. As shown, the thermal-control block 402 may include a first body extension 442 and a second body extension 444 having respective segment lengths 443, 445, respectively. The thermal-control block 402 may have a main section 446 extending between the first and second body extensions 442, 444. The main section 446 may include the mounting areas 422 (FIG. 11) and interface with the nest assembly 408.

In the illustrated embodiment, the segment length 443 is greater than the segment length 445. The first body extension 442 may represent a portion of the thermal-control block 402 that is configured to engage a thermal module (not shown), such as the thermal module 510 shown in FIG. 17. For example, the thermal module may be part of an assay system and may interface with the active surface 412 along the first body extension 442 when the sample carrier 400 is loaded into the assay system. Alternatively, the sample carrier 400 may include the thermal module coupled to the first body extension 442. In such embodiments, the thermal module may form part of the unitary structure of the sample carrier 400.

Figure 17:
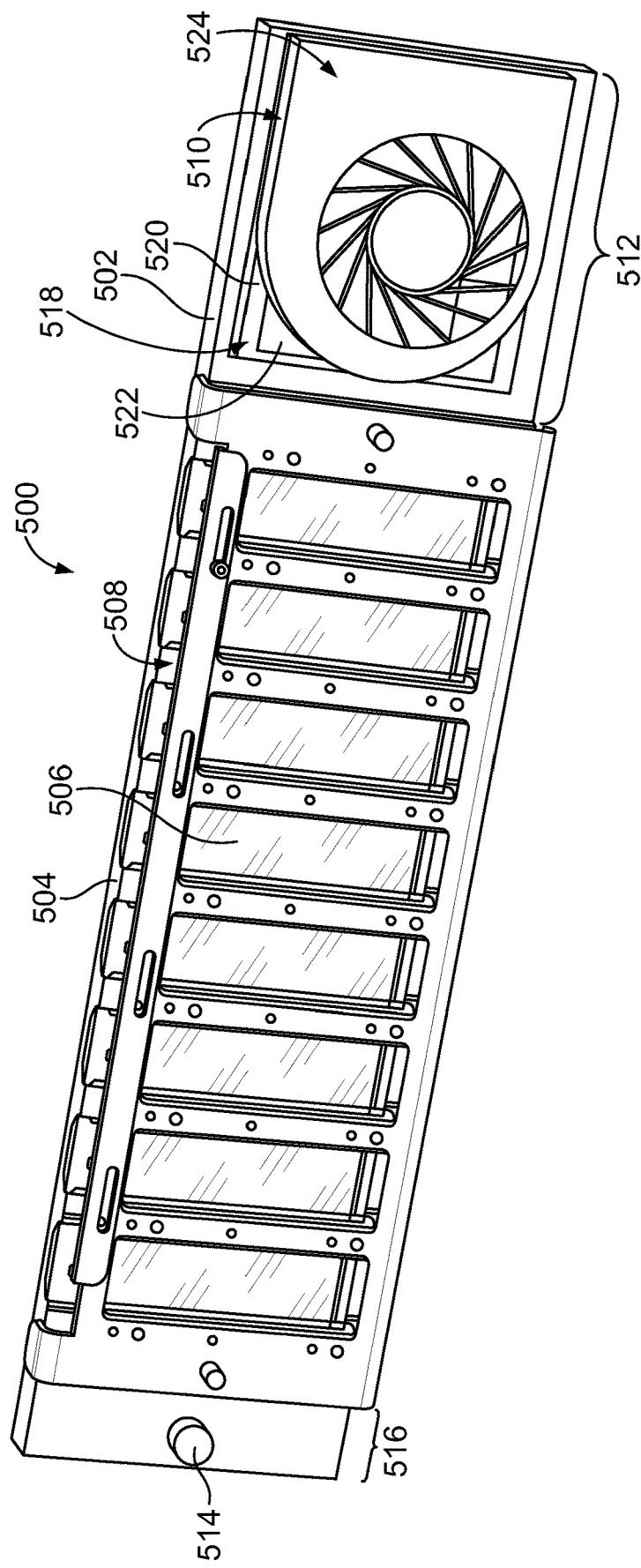
FIG. 17 is a perspective view of a sample carrier formed in accordance with an embodiment having a thermal module.

The second body extension 444 may be sized and shaped to engage a sensor surface of a temperature sensor (not shown), such as the temperature sensor 514 shown in FIG. 17. Similar to the thermal module, the temperature sensor may be part of an assay system and may interface with the active surface 412 along the second body extension 444 when the sample carrier 400 is loaded into the assay system. Alternatively, the sample carrier 400 may include the temperature sensor coupled to the second body extension 444. In such embodiments, the temperature sensor may form part of the unitary structure of the sample carrier 400. The temperature sensor is configured to determine a temperature of the thermal-control block 402 that is controlled by the thermal module. With the temperature of the thermal-control block 402 known, a temperature of the reaction chambers 424 may be estimated or extrapolated.

Figure 13:
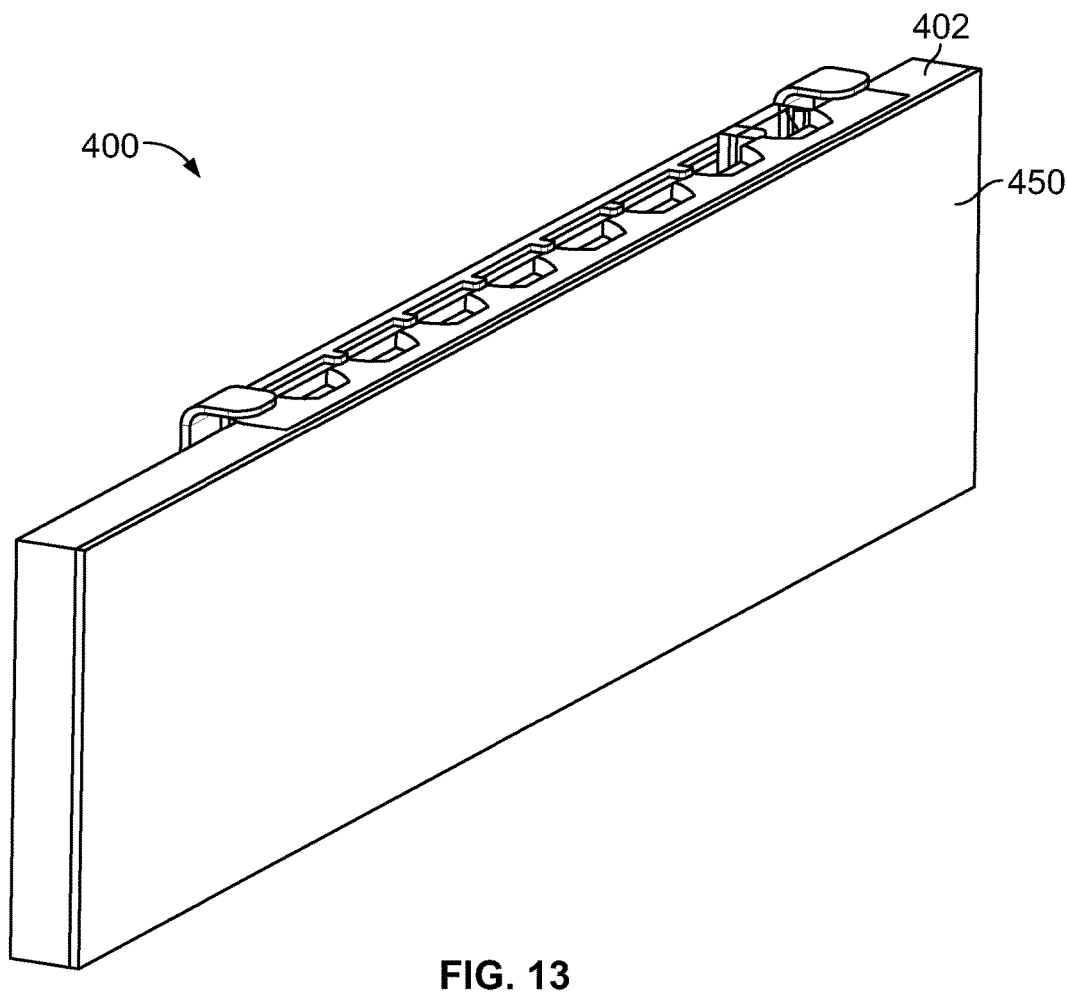
FIG. 13 is a bottom perspective view of the sample carrier of FIG. 11.

FIG. 13 is a bottom perspective view of the sample carrier 400 having a base plate 450 positioned along a bottom of the thermal-control block 402, and FIG. 14 is a bottom perspective view of the sample carrier 400 with the base plate 450 removed. The base plate 450 may operate as a protective cover that isolates channels 452 (FIG. 14) of the thermal-control block 402 from an exterior of the sample carrier 400. The base plate 450 may comprise an insulative material, such as foam, that impedes the transfer of thermal energy into the exterior.

As shown in FIG. 14, the channels 452 extend through the thermal-control block 402 along the length 420 of the thermal-control block 402. The channels 452 are configured to expedite transfer of thermal energy to or away from the mounting areas 422 (FIG. 11) and, in particular, the reaction chambers 424 (FIG. 11). More specifically, the channels 452 are configured to expedite transfer of thermal energy relative to a continuous block of material (e.g., heat block).

In the illustrated embodiment, the thermal-control block 402 includes seven (7) channels 452 that are distributed across a width 454 of the thermal-control block 402. In other embodiments, the thermal-control block 402 may include fewer channels 452 (e.g., such as one, two, three, four channels, etc.) or may include more channels 452. In the illustrated embodiment, the channels 452 extend substantial the entire length 420. The channels 452 may extend through the first and second body extensions 442, 444 and the main section 446. The channels 452 may extend less than substantially the entire length 420 in other embodiments.

FIG. 15 is a cross-section of the sample carrier 400. In the illustrated embodiment, the thermal-control block 402 includes heat pipes 460 that are disposed within corresponding channels 452. The heat pipes 460 may include a material that is used for heat conduction. The base plate 450 holds the heat pipes 460 within the channels 452. In some embodiments, a thermally-conductive adhesive (not shown) may be deposited into the channels 452 to facilitate securing the heat pipes 460 therein. The heat pipes 460 are configured to expedite transfer of thermal energy along the length 420 (FIG. 11) of the thermal-control block 402. In particular embodiments, the heat pipes 460 are configured to absorb thermal energy (e.g., heat) that is generated by a thermal module (not shown) along the first body extension 442 (FIG. 12) and transfer the thermal energy to the main section 446.

The thermal energy may then transfer to the mounting areas 422 (FIG. 11) and, consequently, the reaction chambers 424 (FIG. 11).

In a similar manner, the channels 452 and the heat pipes 460 may be used to transfer thermal energy away from the reaction chambers 424. For example, the thermal module may include a cooling apparatus, such as a heat sink and/or fan, that removes thermal energy from the first body extensions 442 into the exterior of the sample carrier 400. As the thermal energy in the first body extension 442 is removed into the exterior, the thermal energy within the reaction chambers 424 may be absorbed and transferred through the channels 452 and/or heat pipes 460 to the first body extension 442 where the thermal energy is then transferred into the exterior.

In an alternative embodiment, the openings to the channels 452 (or the heat pipes 460) shown in FIG. 15 may represent ports to the channels 452 (or the heat pipes 460). The channels 452 (or the heat pipes 460) may be configured to direct a working fluid into and out of the thermal-control block 402. For example, the thermal-control block 402 may have an inlet port that receives the working liquid from an external supply, such as from the assay system, and an outlet port that allows the working liquid to exit the thermal-control block. The assay system may circulate the working liquid through the channels 452 and/or heat pipes 460 for controlling the temperature of the reaction chambers. The inlet and outlet ports may open to an exterior of the sample carrier and be configured for fluidically coupling to nozzles or tubes of the assay system. In such embodiments, the working liquid may be pumped by the assay system through the thermal-control block 402. The temperature of the working liquid may be controlled by the assay system.

Figure 16:
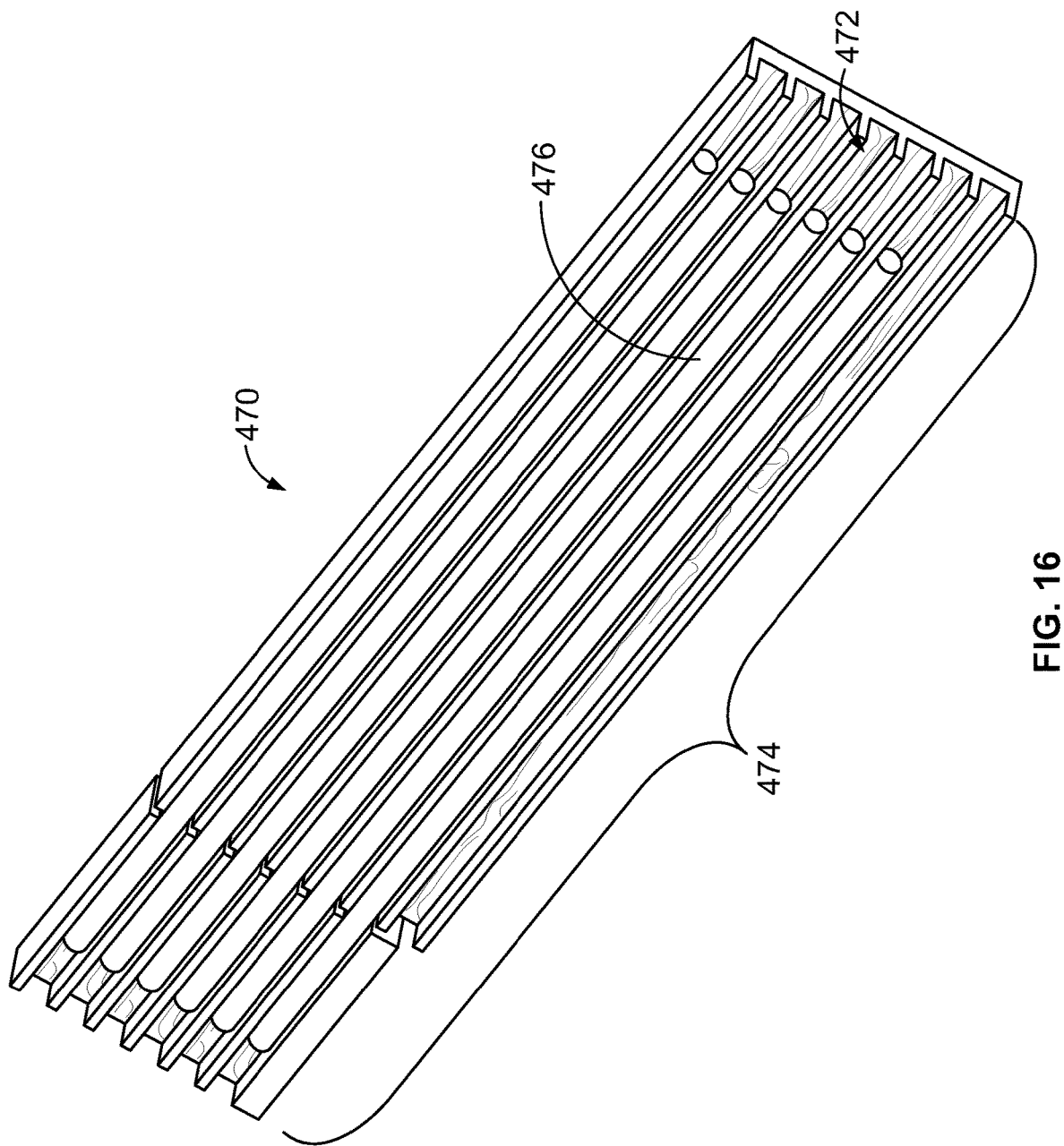
FIG. 16 is an illustration of a bottom of a thermal-control block that may be used with one or more sample carriers.

FIG. 16 is an illustration of a bottom of a thermal-control block 470 with the base plate removed. As shown, the thermal-control block 470 includes channels 472 that extend an entire length 474 of the thermal-control block 470. The channels 472 include heat pipes 476 disposed therein. The heat pipes 476 extend less than the length 474 of the thermal-control block 470.

FIG. 17 is a perspective view of a sample carrier 500 formed in accordance with an embodiment. The sample carrier 500 may be nearly identical to the sample carrier 400 (FIG. 11). For example, the sample carrier 500 includes an elongated thermal-control block 502, a cell spacer 504, a plurality of chamber cells 506, and a nest assembly 508 that includes the chamber cells 506. The nest assembly 508 is mounted onto the thermal-control block 502 in FIG. 17. Although the sample carrier 500 does not include a removable cover body in FIG. 17, the sample carrier 500 may include a removable cover body. Alternatively, the nest assembly 508 may also function as a removable cover body that holds the chamber cells 506 in designated positions.

The sample carrier 500 also includes a thermal module 510 that is coupled to the thermal-control block 502 at a first body extension 512 and a temperature sensor 514 that is coupled to the thermal-control block 502 at a second body extension 516. The thermal module 510 and the temperature sensor 514 may form part of the unitary structure of the sample carrier 500. For example, the thermal module 510 and the temperature sensor 514 may be directly coupled to and in fixed positions with respect to the thermal-control block 502.

As shown, the thermal module 510 includes a heater 518 and a cooling apparatus 524. In the illustrated embodiment, the heater 518 is a planar heater that includes a film 520 coupled to the thermal-control block 502 and a conductive foil 522 disposed within the film 520. The conductive foil 522 may generate thermal energy (i.e., heat) that is then absorbed by the thermal-control block 502 and transferred to the mounting areas. In the illustrated embodiment, the cooling apparatus 524 comprises a fan. Although the illustrated embodiment shows a planar heater and a fan as the heater 518 and the cooling apparatus 524, respectively, it is contemplated that other heaters and cooling apparatuses may be implemented in other embodiments.

Figure 18:
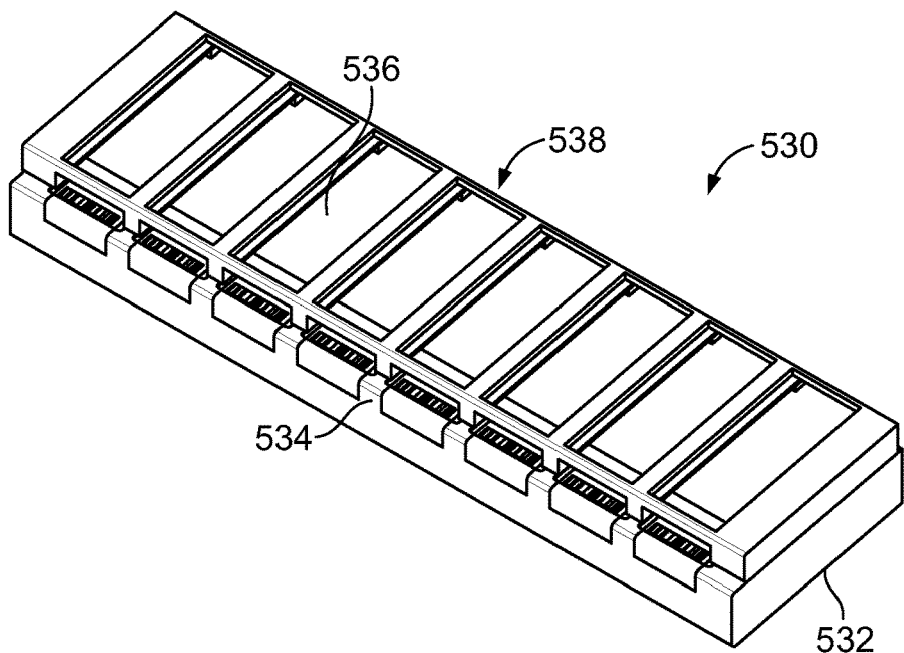
FIG. 18 is a perspective view of a sample carrier formed in accordance with an embodiment.
Figure 19:
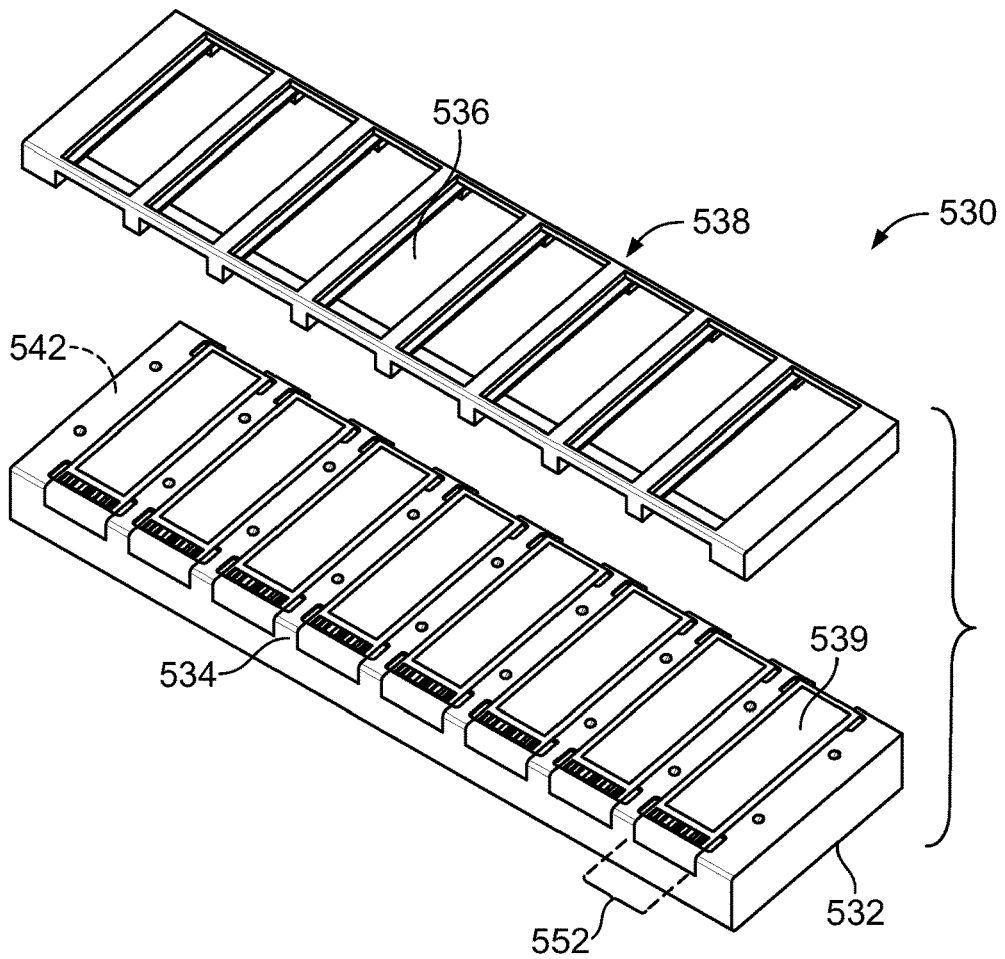
FIG. 19 is a perspective view of the sample carrier of FIG. 18 with a removable cover body positioned for mounting onto a sub-assembly of the sample carrier.

FIGS. 18 and 19 illustrate perspective views of a sample carrier 530 formed in accordance with an embodiment. The sample carrier 530 may be similar to other sample carriers set forth herein. For example, the sample carrier 530 includes an elongated thermal-control block 532, a cell spacer 534, a plurality of chamber cells 536, and a nest assembly 538 that includes the chamber cells 536. The nest assembly 538 is mounted onto the thermal-control block 532 in FIG. 18 and positioned away from the thermal-control block 532 in FIG. 19. As shown in FIG. 19, the sample carrier 530 includes sample substrates 539 that are positioned on respective mounting areas 552 along an active surface 542 of the thermal-control block 532.

In the illustrated embodiment, the nest assembly 538 functions as a removable cover body that holds the chamber cells 536 in designated positions. For example, the nest assembly 538 may be secured to the thermal-control block 532 when the sample carrier 530 is fully assembled. In alternative embodiments, a separate removable cover body may be used to secure the nest assembly 538 to the thermal-control block 532.

As shown, the sample carrier 500 does not include body extensions for engaging a thermal module and/or a temperature sensor. In such embodiments, the thermal module and the temperature sensor may be parts of an assay system that engage the thermal-control block 532 when the sample carrier 500 is loaded into the assay system. Alternatively, the sample carrier 500 may include the thermal module and/or the temperature sensor.

Figure 20:
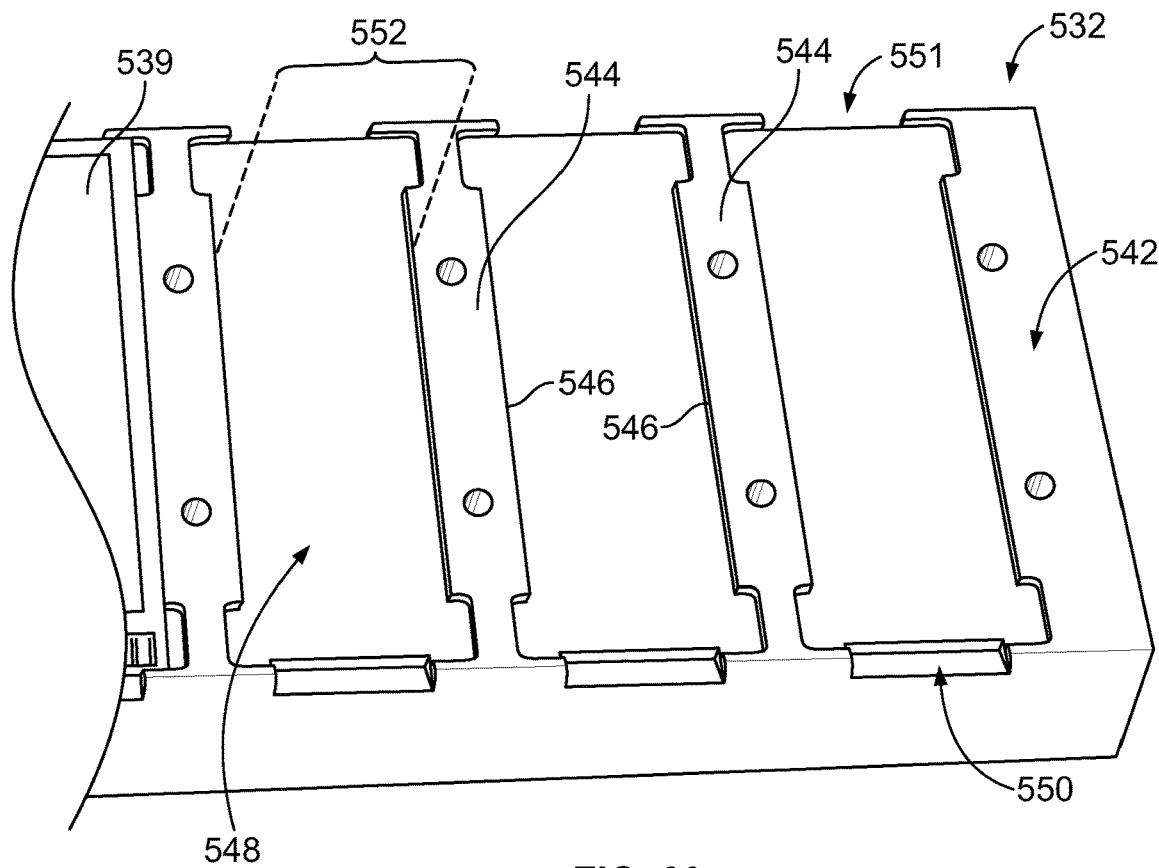
FIG. 20 is an enlarged view of a thermal-control block of the sample carrier of FIG. 18 illustrating mounting areas.
Figure 21:
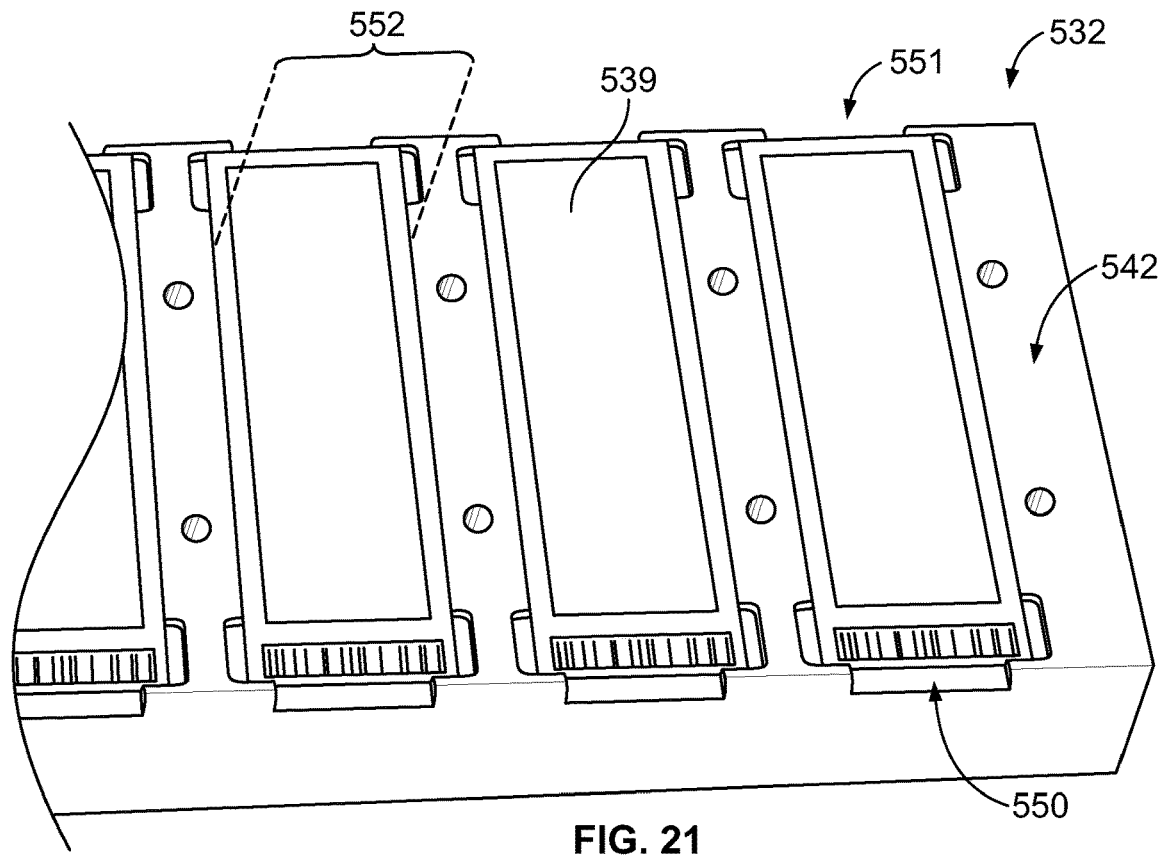
FIG. 21 is an enlarged view of the thermal-control block showing sample substrates positioned within corresponding mounting areas.

FIGS. 20 and 21 are enlarged views of a portion of the thermal-control block 532 with the cell spacer 534 (FIG. 19) removed. As shown, the mounting areas 552 may be defined by the active surface 542. More specifically, the active surface 542 may be shaped (e.g., molded, die cut, and the like) to include alignment features 544. In the illustrated embodiment, the alignment features 544 are ridges or plateaus that form feature walls 546. The feature walls 546 define runways (or recesses) 548 that are sized and shaped to receive the sample substrates 539. Similar to the other sample carriers described herein, the thermal-control block 532 may be shaped to include recesses 550, 551 along an edge of the thermal-control block 532. The recesses 550, 551 may partially define or be located proximate to inlets/outlets of the reaction chambers (not shown).

Figure 22:
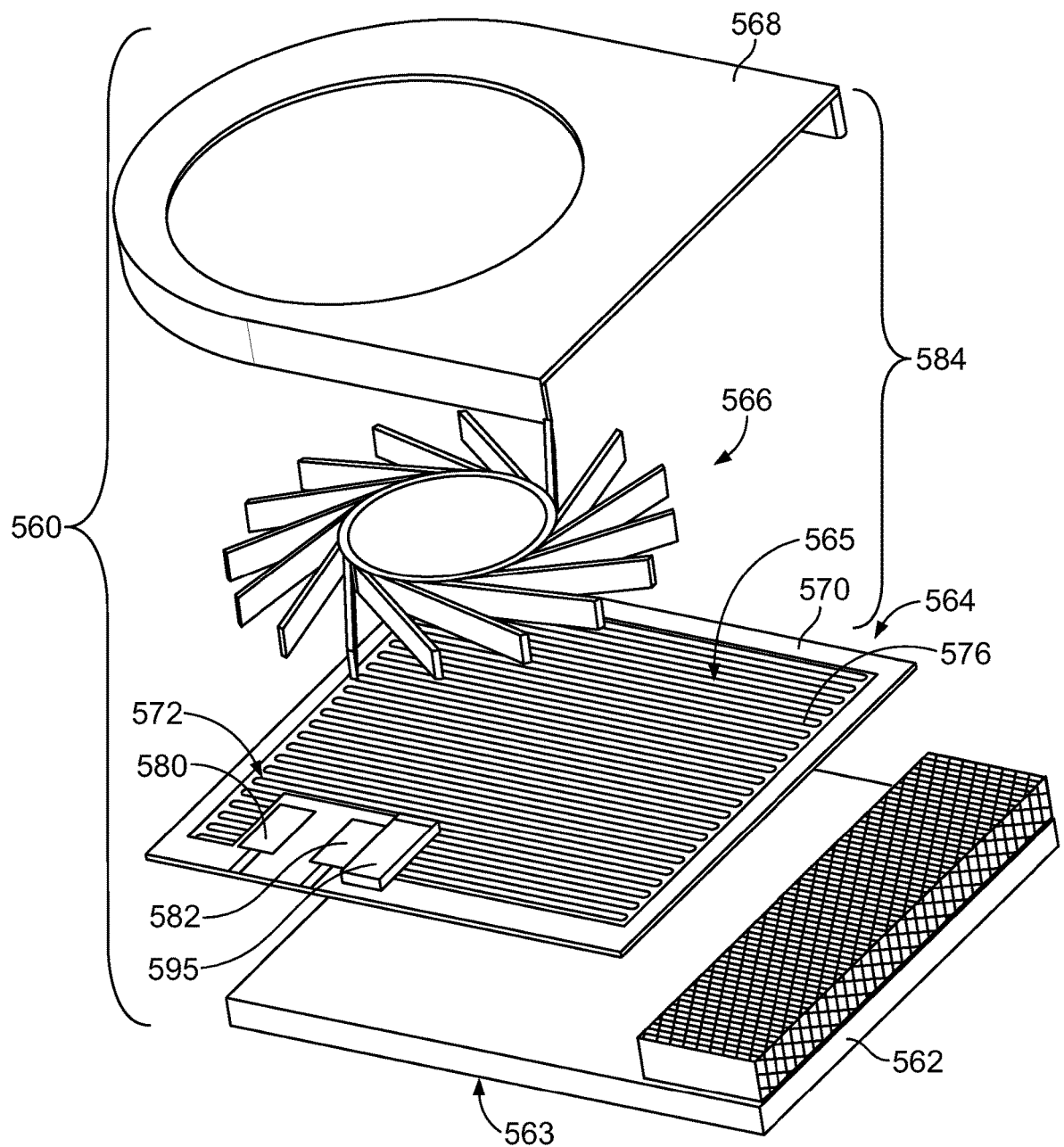
FIG. 22 is an exploded view of a thermal module formed in accordance with an embodiment that may be used with one or more sample carriers and/or assays systems.

FIG. 22 is an exploded view of a thermal module 560 formed in accordance with an embodiment that may be used with one or more sample carriers and/or assays systems. In the illustrated embodiment, the thermal module 560 includes a heat spreader 562, a planar heater 564, a cooling fan 566, and a cooling duct 568. The heat spreader 562 may be similar to a thermal-control block and comprise a continuous piece of material that is void of channels or, alternatively, includes channels extending therethrough. The heat spreader 562 is sized and shaped to interface with or engage a thermal-control block (not shown) of a sample carrier. For embodiments in which the thermal module is part of the sample carrier, the heat spreader 562 may be secured to the thermal-control block using, for example, a thermally-conductive adhesive. In alternative embodiments, the thermal module 560 does not include a heat spreader. Instead, the planar heater 564 may be directly coupled to the thermal-control block. For embodiments in which the thermal module forms part of the assay system, the heat spreader 562 has a thermal-transfer surface 563 that is configured to form a separable interface with a sample carrier. The thermal-transfer surface 563 may intimately engage the sample carrier for transferring thermal energy therebetween.

The planar heater 564 includes a film 570 that is configured to be coupled to the heat spreader 562 and a conductive foil 572 disposed within the film 570. In the illustrated embodiment, the conductive foil 572 includes one or more conductive traces 576 that extend along a tortuous path through the film 570. The conductive traces 576 are electrically coupled to electrical contacts 580, 582 (e.g., contact pads) of the planar heater 564. The electrical contacts 580, 582 may be exposed to an exterior and are configured to engage corresponding electrical contacts (not shown) of an assay system. The conductive foil 572 generates thermal energy (i.e., heat) that is then absorbed by the heat spreader 562 and transferred to a thermal-control block (not shown).

In the illustrated embodiment, the cooling fan 566 and the duct 568 form a cooling apparatus 584 that is configured to absorb thermal energy and dissipate the thermal energy into an exterior of the sample carrier or the assay system. For example, when the thermal module 560 is instructed to cool the sample carrier (or remove thermal energy from the sample carrier), the planar heater 564 may be deactivated and the cooling fan 566 may be activated to generate a vacuum and blow air away from a surface 565 of the planar heater 564. In such embodiments, thermal energy within the sample carrier may be transferred through the heat spreader 562 and through the deactivated planar heater 564 to remove thermal energy from the sample carrier.

In some embodiments, the thermal module 560 may include circuitry 595 for selectively operating the thermal module 560. The circuitry 595 may be operably coupled to the cooling fan 566 and operably coupled to the planar heater 564. For example, the circuitry 595 may include a controller (e.g., processor) and be configured to (e.g., programmed to) raise or lower the amount of thermal energy based on information from the temperature sensor. In other embodiments, the circuitry 595 is coupled to an antenna of thermal module 560 and receives instructions from a remote source (e.g., the assay system) for selectively raising or lowering the temperature within the reaction chambers. Yet in other embodiments, the thermal module 560 only operates at two separate states (e.g., an activated state and a deactivated state). The activated state may occur when electrical power is delivered to the thermal module 560. The deactivated state may occur when electrical power is not delivered to the thermal module 560. Electrical power may be delivered through the electrical contacts 580, 582. Alternatively, electrical power may be delivered wirelessly (e.g., through conductive coils).

Figure 23:
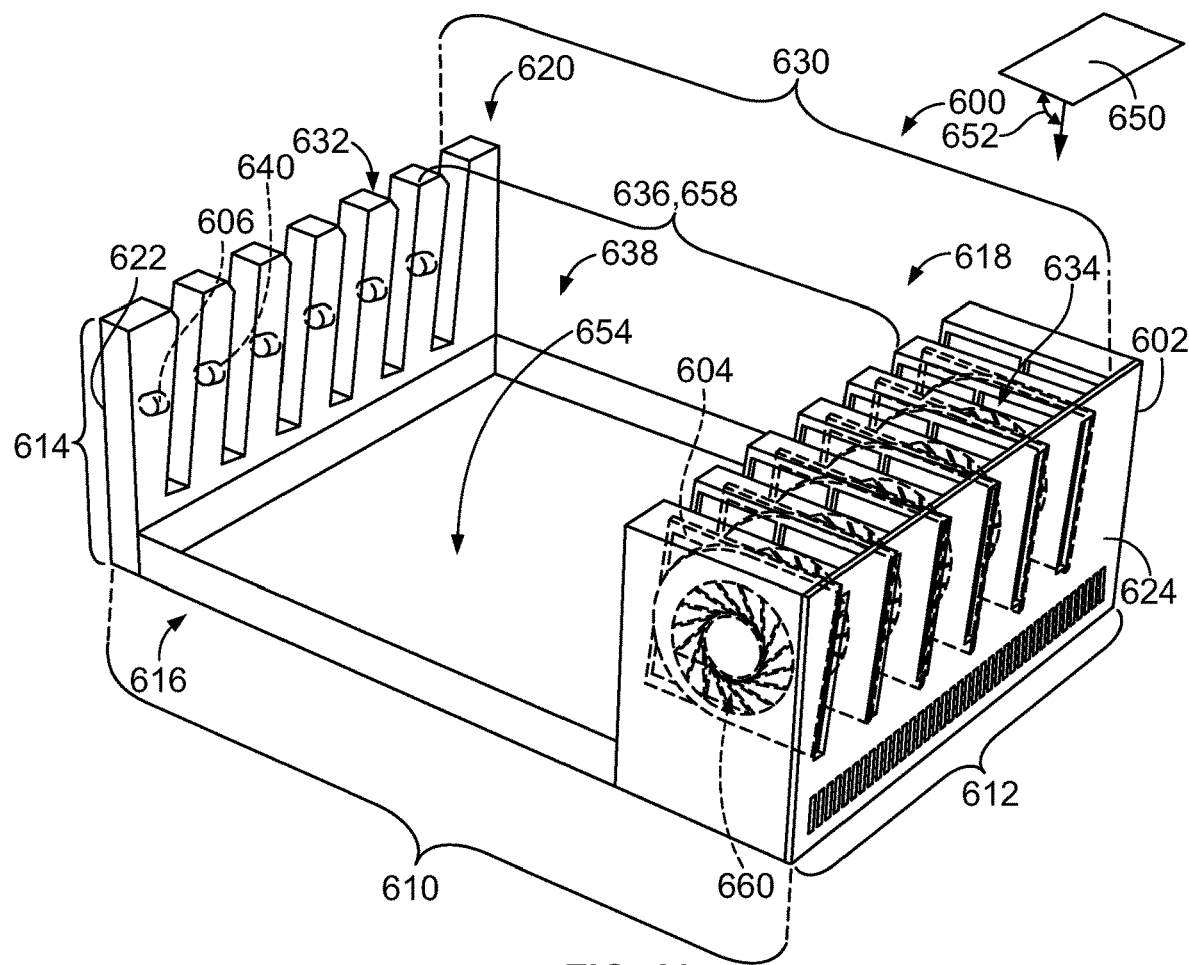
FIG. 23 is a perspective view of a system rack, which is shown partially in phantom, that may be used with the assay system of FIG. 1.
Figure 24:
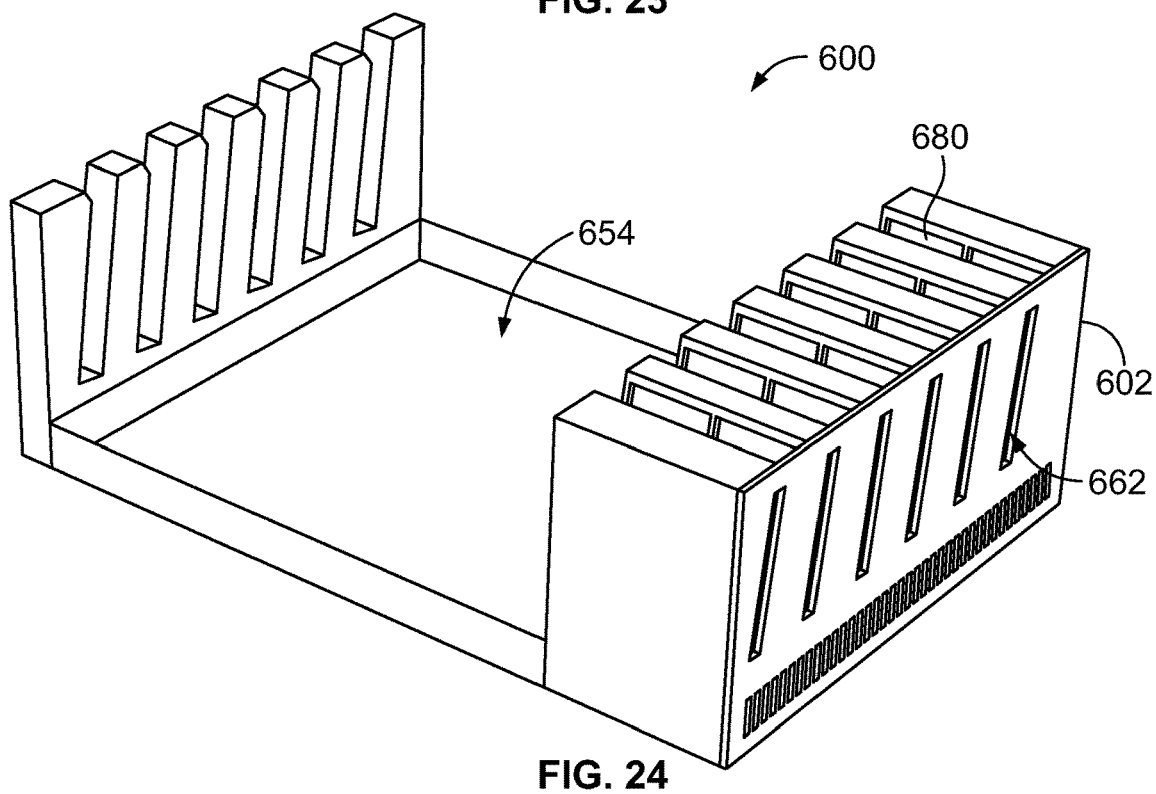
FIG. 24 is a perspective view of the system rack of FIG. 23.

FIGS. 23 and 24 are perspective views of a system rack 600. The system rack 600 includes a rack body 602, a plurality of thermal modules 604 (FIG. 23), and a plurality of temperature sensors 606 (FIG. 23). In FIG. 23, the rack body 602 is shown in phantom so that the thermal modules 604 and the temperature sensors 606 may be more clearly viewed.

With respect to FIG. 23, the rack body 602 has a length (or first dimension) 610, a width (or second dimension) 612, and a height (or third dimension) 614. The rack body 602 includes a first rack end or face 616 and an opposite second rack end or face 618. The rack body 602 also has a loading side 620 that extends between the first and second rack ends 616, 618. In the illustrated embodiment, the loading side 620 forms a top of the rack body 602. The rack body 602 also includes opposite body sides 622, 624. The first and second rack ends 616, 618 extend between the body sides 622, 624.

The rack body 602 is configured to receive sample carriers, such as the sample carriers described herein. For instance, the rack body 602 may include a plurality of elongated carrier slots 630 that extend between the body sides 622, 624. The carrier slots 630 may open along the loading side 620 such that the sample carriers are configured to be inserted into the corresponding carrier slots 630 through the loading side 620. The carrier slots 630 may be sized and shaped relative to the sample carriers so that the sample carriers are held in substantially fixed positions during an assay protocol.

In the illustrated embodiment, each of the carrier slots 630 includes a first slot region 632 and a second slot region 634. As shown, the first and second slot regions 632, 634 are separated by a slot gap 636. Collectively, the slot gaps 636 form an open space 638 of the rack body 602. The slot gap 636 is configured to receive a main section of the sample carrier (e.g., the portion that includes the chamber cells) and the first and second slot regions 632, 634 are configured to receive respective end portions of the sample carrier.

As shown in FIG. 23, the temperature sensors 606 are configured to operably interface with the corresponding sample carriers within the first slot regions 632. More specifically, the temperature sensors 606 may be coupled to the rack body 602 and positioned such that a sensor surface 640 engages the sample carrier when the sample carrier is positioned within the first slot region 632. The temperature sensor 606 may communicate with a controller (not shown) of the assay system either wirelessly or through conductive pathways (not shown).

Also shown in FIG. 23, the thermal modules 604 are configured to operably interface with the corresponding sample carriers within the second slot regions 634. For example, the rack body 602 may form a cavity that is configured to receive the thermal module 604. The thermal modules 604 are positioned such that a thermal-transfer surface engages the sample carrier when the sample carrier is positioned within the corresponding carrier slot 630. The thermal module 604 may communicate with a controller (not shown) of the assay system either wirelessly or through conductive pathways (not shown). As shown in FIG. 24, the rack body 602 may include vents 662 that are in flow communication with corresponding cooling fans 660 (FIG. 23) of the thermal modules 604. Air may exit the vents 662 to the exterior of the system rack 600.

In the illustrated embodiment, the system rack 600 includes a plurality of the temperature sensors 606 and a plurality of the thermal modules 604. The temperature sensors 606 and the thermal modules 604 may be in a one-to-one relationship such that each temperature sensor 606 is aligned or associated with only a single respective thermal module 604 and vice versa. In other embodiments, however, two or more temperature sensors 606 may be aligned or associated with a single thermal module 604. In other embodiments, two or more thermal modules 604 may be associated with a single temperature sensor 606. Yet in other embodiments, the system rack 600 does not include at least one of the temperature sensor 606 or the thermal module 604. In such embodiments, the sample carrier may include the temperature sensor and/or the thermal module.

Yet in alternative embodiments, the assay system, including the sample carrier, may not utilize a temperature sensor and/or a thermal module.

As shown, each temperature sensor 606 is separated from the associated thermal module by an operative distance 658. The operative distance 658 is sized to allow multiple reaction chambers of the corresponding sample carrier to exist between the thermal module 604 and the temperature sensor 606. More specifically, thermal energy is configured to transfer from the thermal module 604 to the associated temperature sensor 606 through the sample carrier and, consequently, proximate to the reaction chambers.

In some embodiments, the carrier slots 630 may be sized and shaped relative to the sample carriers to hold the sample carriers at designated orientations. For example, the loading side 620 coincides with a loading plane 650. The carrier slots 630 are configured to hold the sample carriers at a non-orthogonal angle 652 with respect to the loading plane 650. The non-orthogonal angle 652 may be based on a desired flow of the liquids through the chamber cells. The non-orthogonal angle 652 may be, for example, between 60° and 85°.

In the illustrated embodiment, the rack body 602 includes a reservoir 654 that is positioned below the open space 638. The reservoir 654 is configured to receive liquids that exit the sample carriers or, more specifically, that exit the chamber cells of the sample carriers. The reservoir 654 may be in flow communication with an outlet (not shown) that is in flow communication with a waste reservoir (not shown). The reservoir 654 is also shown in FIG. 24.

Figure 25:
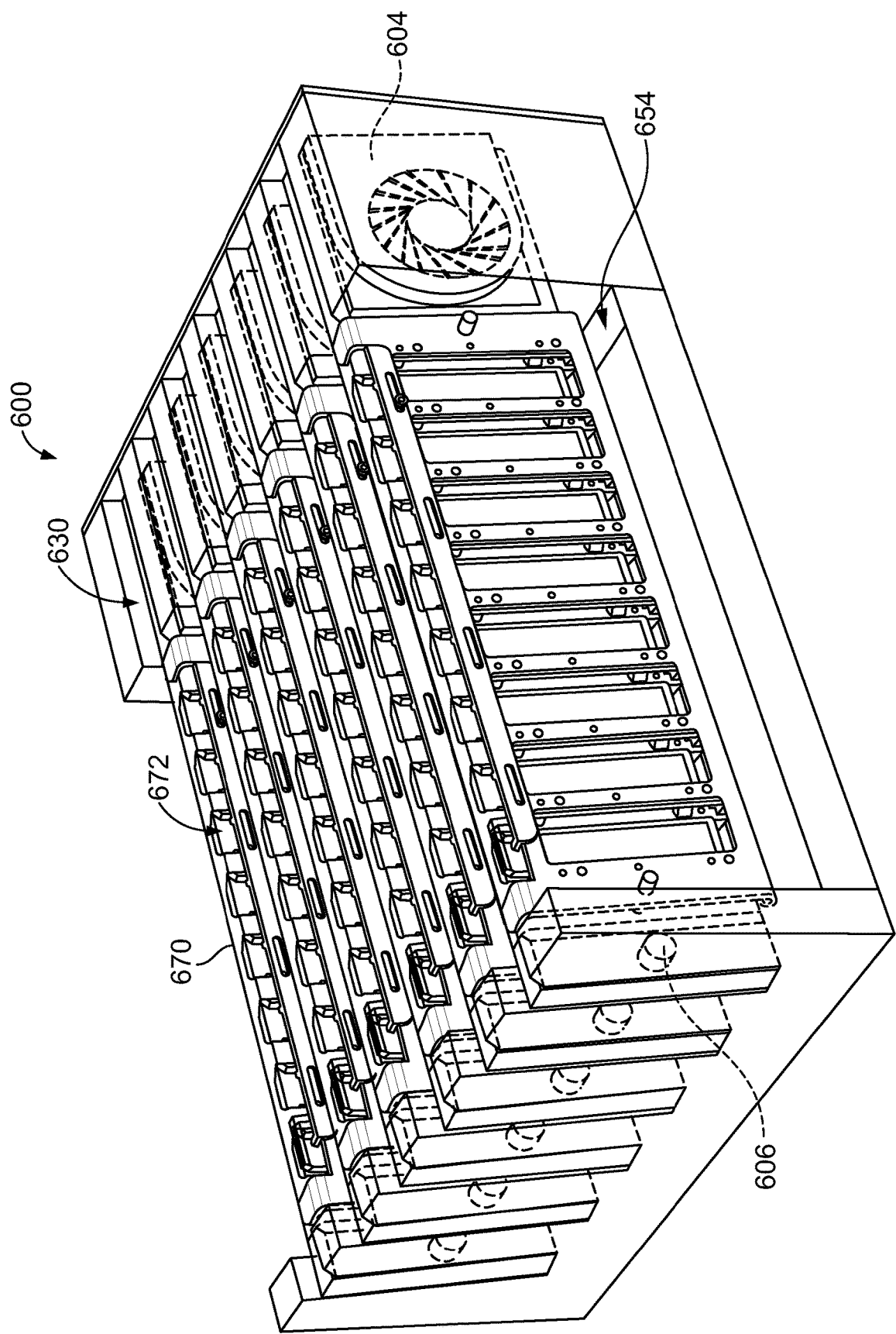
FIG. 25 is a perspective view of the system rack of FIG. 23 having sample carriers positioned within corresponding carrier slots of the system rack.

FIG. 25 is a perspective view of the system rack 600 having the sample carriers 670 positioned within corresponding carrier slots 630. As shown, each of the sample carriers 670 has a plurality of inlets 672 that are substantially coplanar with the inlets 672 of the other sample carriers 670. During an assay protocol, a robotic arm (not shown) of an assay system (not shown) may deliver liquids to each of the inlets 672. The liquids may be permitted to drain through the corresponding reaction chambers and be deposited into the reservoir 654. The temperature sensors 606 and the thermal modules 604 may communicate with a controller (not shown) of the assay system. The controller may instruct the thermal modules 604 or other components of the assay system (e.g., the robotic arm) to operate in accordance with certain instructions that are based on the temperature detected by the temperature sensors. The temperature detected by the temperature sensors may be indicative of the temperature experienced within the reaction chambers.

In some embodiments, the system rack 600 may include a power supply 680 (shown in FIG. 24) that is configured to provide electrical power to the sample carrier 670. For example, the power supply 680 may include electrical contacts that are exposed to corresponding carrier slots 630 and are configured to engage corresponding contacts of the sample carrier 670. More specifically, the thermal module 604 may include electrical contacts that are exposed to an exterior of the sample carrier 670. The electrical contacts of the thermal module 604 may engage the electrical contacts 680 of the system rack 600. Current received through the electrical contacts may provide the electrical power for activating the thermal module 604 and providing the thermal energy to the reaction chambers.

In other embodiments, the power supply 680 may be a conductive coil that is configured to generate a magnetic field for inducing electrical power in a corresponding coil of the thermal module 604. As such, the thermal modules 604 may be powered through wireless power transfer (WPT)

technology. In such embodiments, the system rack 600 and the sample carriers 670 may not have electrical surfaces that are exposed to the surrounding environment.

Figure 26:
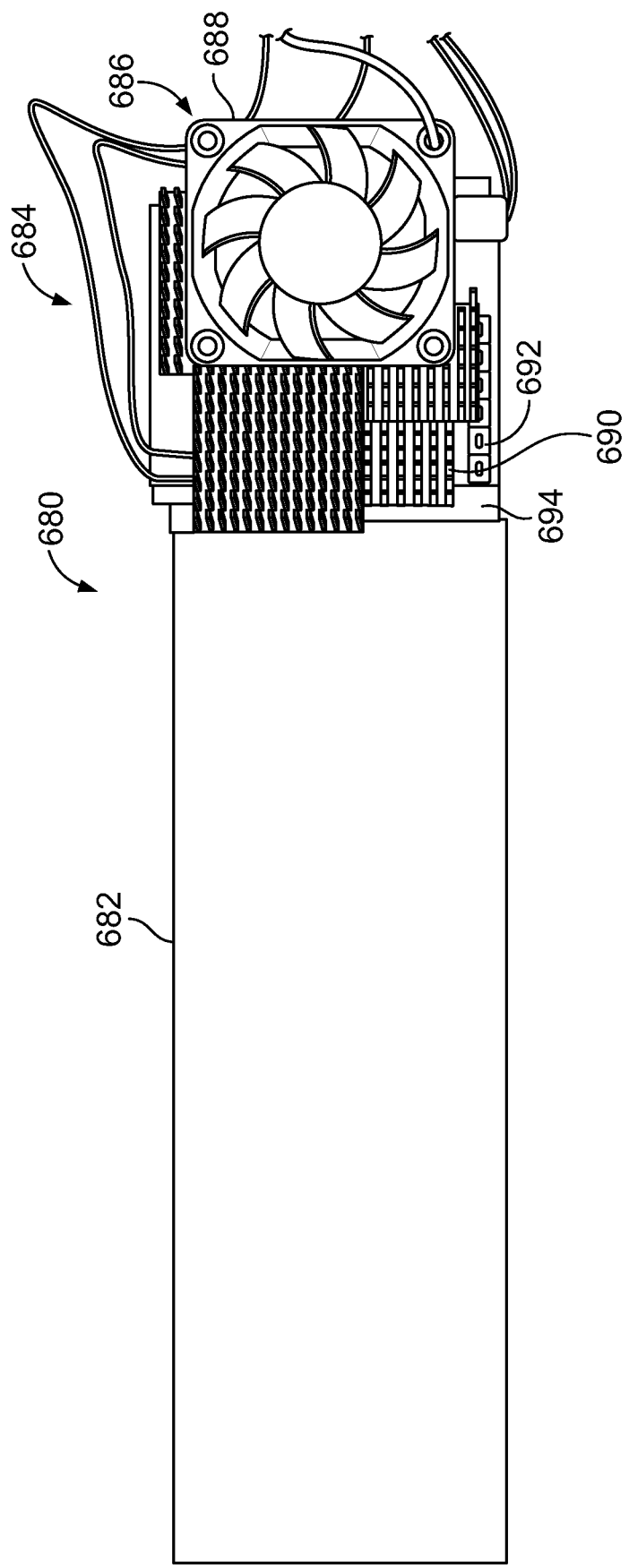
FIG. 26 is an illustration of a carrier sub-assembly having a thermal-control block and a thermal module coupled to the thermal-control block.

FIG. 26 is an illustration of a carrier sub-assembly 680 that includes a thermal-control block 682 and a thermal module 684. As shown, the thermal module 684 includes a cooling apparatus 686 having a cooling fan 688 and a heat sink 690. The heat sink 690 is directly coupled to a planar heater 692 of the thermal module 684 that is, in turn, thermally coupled to the thermal-control block 682. The planar heater 692 may be thermally coupled to the thermal-control block 682 through a heat spreader 694. Alternatively, the planar heater 692 may be directly coupled to the thermal-control block 682 through a conductive adhesive.

Figure 27:
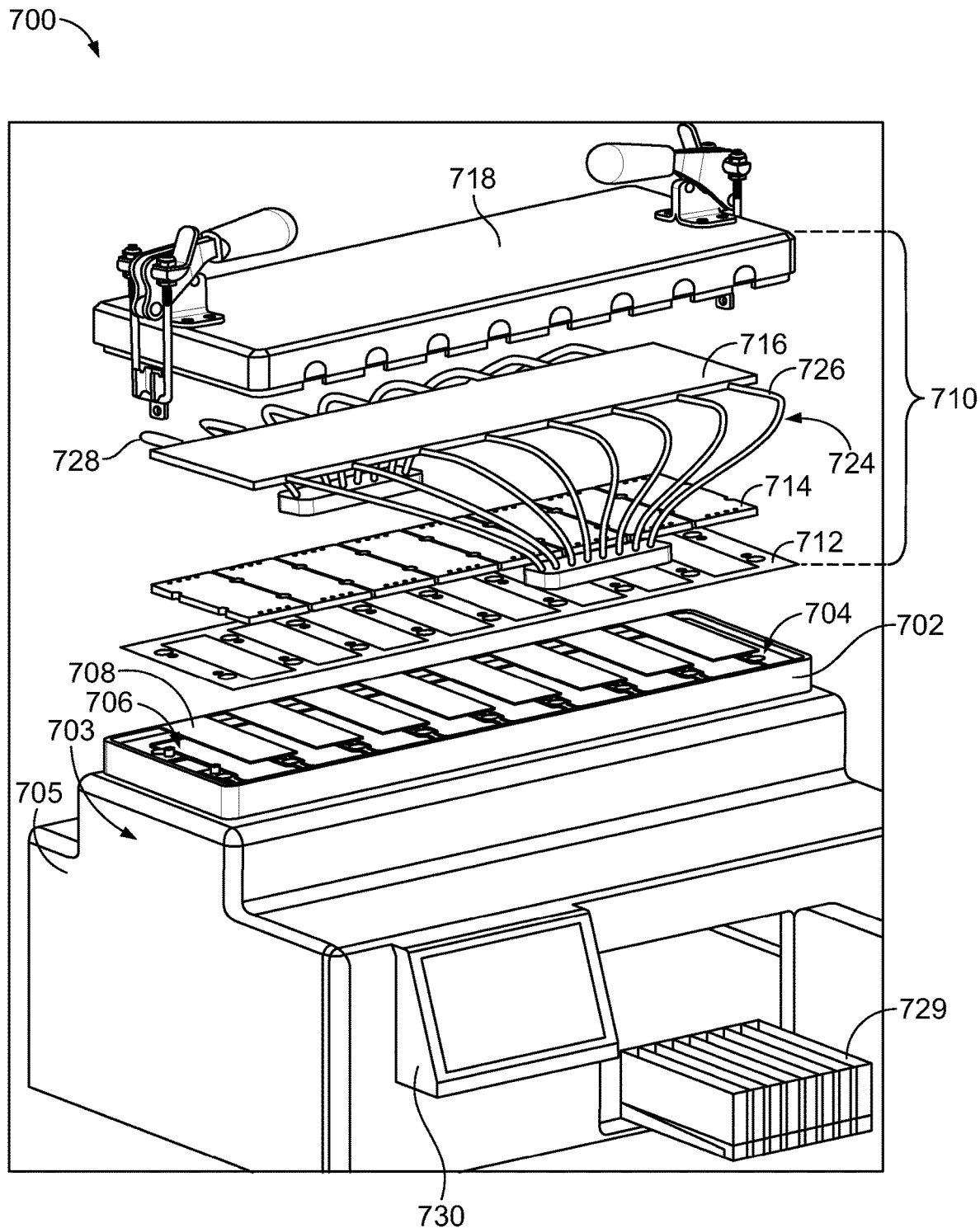
FIG. 27 is an exploded view of an assay system formed in accordance with an embodiment.

FIG. 27 is an exploded view of an assay system 700 formed in accordance with an embodiment. The assay system 700 may include components that are similar to the components of the assay system 100 and/or the sample carriers described herein. For example, the assay system 700 includes a thermal-control block 702 having an active surface 704. The active surface 704 includes a series of mounting areas 706 distributed therealong. Each of the mounting areas 706 is configured to have a corresponding sample substrate 708 positioned thereon. In some embodiments, the mounting areas 706 are determined by physically defined features of the active surface 704 and/or by physical elements that are secured to the thermal-control block 702. In other embodiments, the active surface 704 is a planar surface that is void of physical elements that define the mounting areas 706. The thermal-control block 702 may be positioned on a stage or platform 703 of the assay system 700. In the illustrated embodiment, the stage 703 forms part of a system housing 705 that encloses multiple components (e.g., thermal, electrical, fluidic components) of the assay system 700.

The assay system 700 also includes a system sub-assembly 710 that is configured to be stacked onto the active surface 704 to form reaction chambers (not shown) along the sample substrates 708. For example, in the illustrated embodiment, the system sub-assembly 710 includes a cell spacer 712, a plurality of chamber cells 714, a manifold plate 716, and a removable cover body 718. Alternative embodiments, however, may have a different number and/or arrangement of components. For example, the manifold plate 716 and the removable cover body 718 may be combined into a single component that has the operative features of the manifold plate 716 and the removable cover body 718 described herein. As another example, the cell spacer 712 may not be used in other embodiments.

Each of the chamber cells 714 is configured to be disposed over a respective mounting area 706 of the series of mounting areas 706 with the corresponding sample substrate 708 between the respective mounting area 706 and the respective chamber cell 714. The manifold plate 716 and/or the removable cover body 718 are configured to be coupled to the thermal-control block 702 with the chamber cells 714 therebetween. The thermal-control block 702 and the chamber cells 714 are configured to form the corresponding reaction chambers between the chamber cells 714 and the sample substrates 708. In the illustrated embodiment, the cell spacer 712 may cause a gap between the chamber cell 714 and the respective sample substrate 708. The gap may form a portion of the reaction chamber.

The assay system 700 also includes a fluidic network 724 that includes at least one input line 726 (e.g., flexible tube) and at least one output line 728 that are configured to be in flow communication with the reaction chambers. Each input line 726 is configured to receive a fluid (e.g., liquid or gas) from a source 729 and provide the fluid to the corresponding reaction chamber. Each output line 728 is configured to receive the fluid from the corresponding reaction chamber and provide the fluid to, for example, a waste reservoir. In the illustrated embodiment, the fluidic network 724 includes a plurality of input lines 726 and a plurality of output lines 728. Each input line 726 is configured to be in flow communication with only a single reaction chamber, and each output line 728 is configured to be in flow communication with only a single reaction chamber. It should be understood, however, that two or more input lines 726 may be in flow communication with a single reaction chamber and/or two or more output lines 728 may be in flow communication with a single reaction chamber. In other embodiments, a single input line 726 may be in flow communication with multiple reaction chambers and/or a single output line 728 may be in flow communication with multiple reaction chambers.

The assay system 700 may also include a computing system (generally referred to as 730), which may be similar or identical to the computing system 140 (FIG. 1A). For example, the computing system 730 may have a system controller (not shown), which may be similar or identical to the system controller 142 (FIG. 1A), and may control operation of different components of the assay system 700. In particular, the system controller may control operation of one or more heaters (not shown) that are in thermal communication with the thermal-control block 702 in order to control a temperature experienced within the reaction chambers. The system controller may also control one or more pumps (not shown) for delivering the fluids to the reaction chambers. Exemplary protocols that may be performed by the assay system 700 include ISH, FISH, and IHC.

Figure 28:
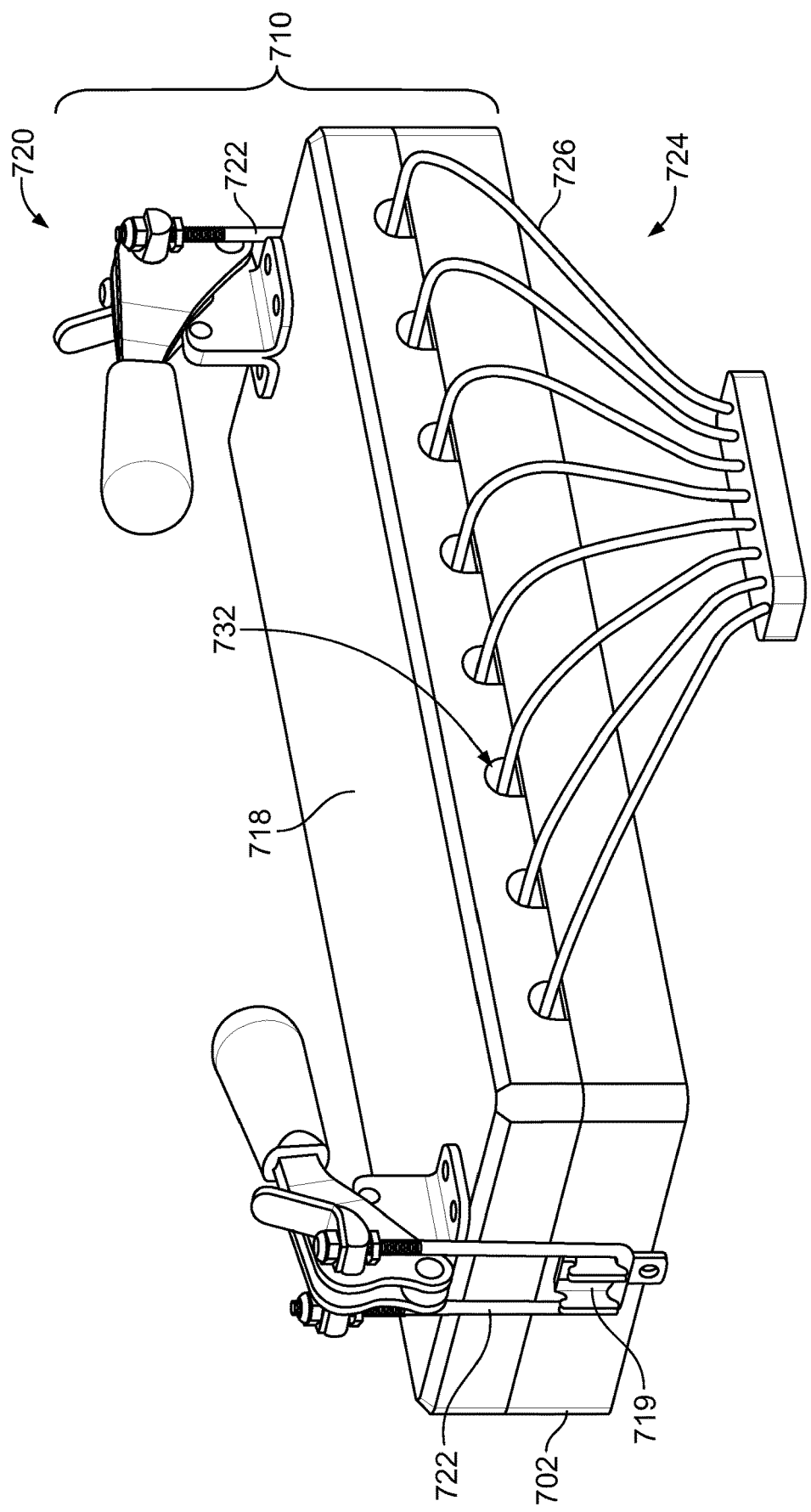
FIG. 28 is a perspective view of a system sub-assembly secured to a thermal-control block for forming sealed reaction chambers.

FIG. 28 is a perspective view of the thermal-control block 702 and the system sub-assembly 710 when the assay system 700 (FIG. 1) is operational. As shown, the assay system 700 may also include a clamp mechanism 720 for securing the system sub-assembly to the thermal-control block 702. In the illustrated embodiment, the clamp mechanism 720 includes a pair of latches 722 that are couple to opposite ends of the removable cover body 718. The latches 722 are configured to engage hooks 719 that are secured to the thermal-control block 702. The latches 722 may grip the hooks 719 to press the system sub-assembly 710 or the removable cover body 718 against the thermal-control block 702 with the chamber cells 714 (FIG. 27) therebetween. As shown, the removable cover body 718 includes passages 732 that receive the input lines 726 of the fluidic network 724.

In the illustrated embodiment, the clamp mechanism 720 moves the removable cover body 718 thereby causing the removable cover body 718 to engage and press the manifold plate 716 (FIG. 27) toward the thermal-control block 702. The manifold plate 716 engages and presses the chamber cells 714 against the thermal-control block 702 and/or the cell spacer 712. As such, the system sub-assembly 710 may effectively seal the reaction chambers and impede leakage from the reaction chambers. The exemplary system sub-assembly 710 shown in FIG. 28, however, is just one embodiment. In alternative embodiments, the removable cover body 218 may be or include the manifold plate 716 such that the clamp mechanism 720 directly engages the manifold plate 716.

Figure 29:
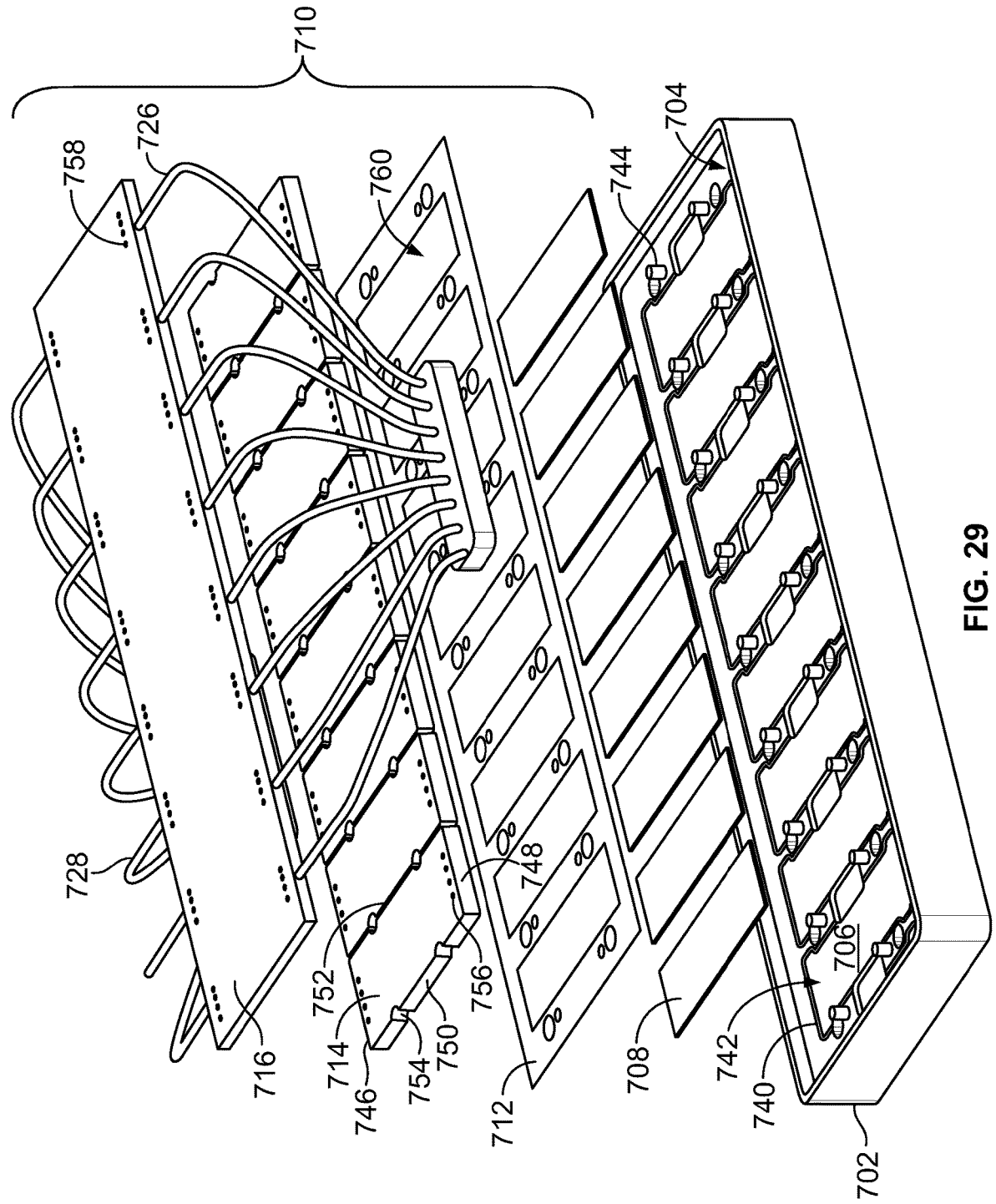
FIG. 29 is an exploded view of at least a portion of the system sub-assembly relative to the thermal-control block.

FIG. 29 is an exploded view of at least a portion of the system sub-assembly 710 relative to the thermal-control block 702. As shown, the active surface 704 of the thermal-control block 702 may be shaped to include alignment features 740. The alignment features 740 may be ridges that form a runway or recess 742 that receives a corresponding sample substrate 708. Each runway 742 may include a corresponding mounting area 706 of the active surface 704. The runway 742 may be shaped relative to the sample substrate 708 to form a snug fit with the sample substrate 708. In addition to the alignment features 740, a plurality of alignment projections 744 (e.g., posts) may be secured to and project from the active surface 704. The alignment projections 744 may facilitate locating the sample substrates 708 at the mounting areas 706. The alignment projections 744 may also facilitate aligning the cell spacer 712, the chamber cells 714 and, optionally, the manifold plate 716 relative to the other components.

As shown in FIG. 29, each of the chamber cells 714 has first and second cell ends 746, 748 and opposite side edges 750, 752. The side edges 750, 752 may form alignment features 754 (e.g., recesses) that are configured to engage the alignment projections 744. Each of the chamber cells 714 may include channels 756 that extend between opposite broad sides of the chamber cell 714. In the illustrated embodiment, a plurality of the channels 756 are located proximate to the first cell end 746 and a plurality of the channels 756 are located proximate to the second cell end 748. The channels 756 are configured to align with channels 758 of the manifold plate 716, which are in flow communication with corresponding input lines 726 or the corresponding output lines 728. When the channels 756 are aligned with corresponding channels 758, the input lines 726 and output lines 728 may have fluidic access to the reaction chambers. Although the channels 758 appear to be on the top side of the manifold plate 716 in FIG. 29, the channels 758 are located along the bottom side, which interfaces with the chamber cells 714.

In order to prepare and/or analyze the sample substrates 708, the sample substrates 708 may be positioned onto the designated mounting areas 706. The cell spacer 712 may then be positioned onto the active surface 704 and the sample substrates 708 such that the sample substrates 708 are aligned with windows 760 of the cell spacer 712. The chamber cells 714 may then be positioned over the mounting areas 706 and the chamber cells 714. Each reaction chamber may be defined by the corresponding sample substrate 708, the cell spacer 712, and the corresponding chamber cell 714. The channels 756 may provide fluidic access to the reaction chambers.

In some embodiments, various components of the assay system 700 may be combined together to form a sample carrier as described above. For example, the thermal-control block 702 may be separable from the system housing 705 and configured to be assembled, with the system sub-assembly 710, to form a sample carrier having a unitary structure. In this example, the sample carrier may be mounted onto the system housing 705 and the input and output lines may be fluidically coupled to the appropriate ports for receiving and disposing of liquids, respectively. In another example, the input and output lines may be separate from the sample carrier. After the sample carrier is mounted to the system housing 705, the input and output lines may be fluidically coupled to ports of the sample carrier.

Embodiments set forth herein include fluidic devices, carrier assemblies, assays systems, and components of the same that are used to conduct designated reactions. Embodiments may also include methods of manufacturing or using the fluidic devices, carrier assemblies, and assay systems. In particular embodiments, the carrier assemblies hold sample substrates having surfaces in which one or more biological or chemical samples are disposed thereon. The carrier assemblies hold the sample substrates as one or more fluids (e.g., liquids or gases) is flowed along the surfaces of the sample substrates. Embodiments may increase a throughput for preparing a sample substrate, may decrease the amount of time that is used to prepare the sample substrate, and/or may be more user-friendly than known apparatuses, systems, and methods.

As used herein, a "reaction chamber" includes a space or void where a sample may be located and fluids may flow therethrough for conducting the designated reactions. Reaction chambers typically include at least two ports. In particular embodiments, the reaction chambers include at least one inlet and at least one outlet. In the illustrated embodiments, each reaction chamber includes a single inlet and a single outlet. In other embodiments, however, the reaction chamber may include a single inlet with multiple outlets. Alternatively, the reaction chamber may include multiple inlets with a single outlet. Yet in alternative embodiments, a reaction chamber may have a single port through which the fluid enters and exits. In some embodiments, the reaction chamber is a simple flow channel having uniform dimensions throughout. For example, a reaction chamber may be defined between two planar surfaces that extend parallel to each other. In other embodiments, the dimensions may vary. For example, the reaction chamber may be defined by one planar surface and another surface that has wells, pits, or grooves.

As used herein, the term "assay protocol" includes a sequence of operations for conducting designated reactions, detecting designated reactions, and/or analyzing designated reactions. The operations of an assay protocol may include fluidic operations, thermal-control operations, detection operations, and/or mechanical operations. A fluidic operation includes controlling the flow of fluid (e.g., liquid or gas) through the carrier assembly or the assay system. For example, a fluidic operation may include controlling a pump to induce flow of the biological sample or a reaction component into a reaction chamber. A thermal-control operation may include controlling a temperature of a designated portion the carrier assembly or assay system. By way of example, a thermal-control operation may include raising or lowering a temperature of the reaction chamber in order to conduct or facilitate certain reactions. A detection operation may include controlling activation of a detector or monitoring activity of the detector to detect predetermined properties, qualities, or characteristics of the sample. As one example, the detection operation may include capturing images of a designated area that includes the biological sample to detect fluorescent emissions from the designated area. The detection operation may include controlling a light source to illuminate the biological sample. A mechanical operation may include controlling a movement or position of a designated component. For example, a mechanical operation may include controlling a motor to move a robotic arm of an assay system. In some cases, a combination of different operations may occur concurrently.

Examples of protocols that may be carried out by embodiments set forth herein include multiplex array-based assays. In some multiplex array-based assay protocols, populations of different probe molecules are immobilized to a substrate surface. The probes may be differentiated based on each probe's address on the substrate surface. For example, each population of probe molecules may have a known location (e.g., coordinates on a grid) on the substrate surface. The probe molecules are exposed to target analytes under controlled conditions such that a detectable change occurs at one or more addresses due to a specific interaction between a target analyte and the probe. The target analytes may include, or be subsequently exposed to, one or more fluorescent labels that selectively bind to the target analytes. The target analytes may then be analyzed by exciting the fluorescent labels and detecting light emissions therefrom. A target analyte that binds to a specific probe can be identified based on recruitment of the fluorescent label to the address of the probe. The addresses on the array can be determined by an assay system to identify which populations reacted with the analytes. By knowing the chemical structure of the probe molecules that reacted with the analytes, properties of the analyte may be determined.

As used herein, the term "sample" includes any substance that is capable of being modified (e.g., through a controlled reaction) or observed in a reaction chamber, such as those described herein. In particular embodiments, samples may include biological or chemical substances of interests. As used herein, the term "biological or chemical sample" or "biological or chemical substances" may include a variety of biological samples or chemical samples that are suitable for being observed (e.g., imaged) or examined. For example, biological or chemical samples include biomolecules, nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, cell lysates, tissues, organs, organisms, bodily fluids. The terms "biological or chemical sample" may include biologically active chemical compound(s), such as analogs or mimetics of aforementioned species. The term "biological sample," as used herein, may include samples such as cell lysates, intact cells, organisms, organs, tissues and bodily fluids. "Bodily fluids" may include, but are not limited to, blood, dried blood, clotted blood, serum, plasma, saliva, cerebral spinal fluid, pleural fluid, tears, lactal duct fluid, lymph, sputum, urine, amniotic fluid, and semen. A sample may include a bodily fluid that is "acellular." An "acellular bodily fluid" includes less than about 1% (w/w) whole cellular material. Plasma or serum are examples of acellular bodily fluids. A sample may include a specimen of natural or synthetic origin (i.e., a cellular sample made to be acellular). In some embodiments, the biological sample can be from a human or from a non-human origin. In some embodiments, the biological sample can be from a human patient. In some embodiments, the biological sample can be from a newborn human.

In particular embodiments, samples can be attached to one or more surfaces of a substrate or support structure. For example, open-face substrates (such as some microarrays and chips) have biological or chemical substances immobilized to an exterior surface of the open-face substrate. The biological or chemical substances may be immobilized to surfaces of the sample substrates disposed within the reaction chambers. Sample substrates may include one or more slides, open-face substrates, planar chips (such as those used in microarrays), or microparticles. In such cases where the optical substrate includes a plurality of microparticles that support the biological or chemical substances, the microparticles may be held by another optical substrate, such as a slide, array of pits, or grooved plate.

In particular embodiments, the sample substrates include a microarray. A microarray may include a population of different probe molecules that are immobilized to a surface of a substrate such that the different probe molecules can be differentiated from each other according to relative location. A microarray can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a BeadChip Array available from Illumina Inc. (San Diego, Calif.) or others including beads in wells such as those described in U.S. Pat. Nos. 6,266,459, 6,355,431, 6,770,441, 6,859,570, and 7,622,294; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

Any of a variety of microarrays known in the art may be used. A typical microarray contains reaction sites, sometimes referred to as features, each having a population of probes. The population of probes at each reaction site is typically homogenous having a single species of probe, but in some embodiments the populations can each be heterogeneous. Reaction sites or features of an array are typically discrete, being separated with spaces between each other. The size of the probe sites and/or spacing between the reaction sites can vary such that arrays can be high density, medium density or lower density. High density arrays are characterized as having reaction sites separated by less than about 15 µm. Medium density arrays have reaction sites separated by about 15 to 30 µm, while low density arrays have reaction sites separated by greater than 30 µm. An array useful in the invention can have reaction sites that are separated by less than 100 µm, 50 µm, 10 µm, 5 µm, 1 µm, or 0.5 µm. An apparatus or method of an embodiment of the invention can be used to image an array at a resolution sufficient to distinguish sites at the above densities or density ranges.

Further examples of commercially available microarrays that can be used include, for example, an Affymetrix® GeneChip® microarray or other microarray synthesized in accordance with techniques sometimes referred to as VLSIPS. (Very Large Scale Immobilized Polymer Synthesis) technologies as described, for example, in U.S. Pat. Nos. 5,324,633; 5,744,305; 5,451,683; 5,482,867; 5,491,074; 5,624,711; 5,795,716; 5,831,070; 5,856,101; 5,858,659; 5,874,219; 5,968,740; 5,974,164; 5,981,185; 5,981,956; 6,025,601; 6,033,860; 6,090,555; 6,136,269; 6,022,963; 6,083,697; 6,291,183; 6,309,831; 6,416,949; 6,428,752 and 6,482,591, each of which is hereby incorporated by reference. A spotted microarray can also be used in a method according to an embodiment of the invention. An exemplary spotted microarray is a CodeLink™ Array available from Amersham Biosciences. Another microarray that is useful is one that is manufactured using inkjet printing methods such as SurePrint™ Technology available from Agilent Technologies. Any one of several assays can be used to identify or characterize targets using a microarray as described, for example, in U.S. Patent Application Publication Nos. 2003/0108867; 2003/0108900; 2003/0170684; 2003/0207295; or 2005/0181394, each of which is hereby incorporated by reference.

In some embodiments, embodiments described herein may be used for sequencing nucleic acids. For example, sequencing-by-synthesis (SBS) protocols are particularly applicable. In SBS, a plurality of fluorescently labeled modified nucleotides are used to sequence dense clusters of amplified DNA (possibly millions of clusters) present on the surface of a substrate (e.g., a surface that at least partially defines a channel). The chamber cells may contain nucleic acid samples for sequencing where the chamber cells are placed within the appropriate chamber cell holders. The samples for sequencing can take the form of single nucleic acid molecules that are separated from each other so as to be individually resolvable, amplified populations of nucleic acid molecules in the form of clusters or other features, or beads that are attached to one or more molecules of nucleic acid. The nucleic acids can be prepared such that they comprise an oligonucleotide primer adjacent to an unknown target sequence. To initiate the first SBS sequencing cycle, one or more differently labeled nucleotides, and DNA polymerase, etc., can be flowed into/through the chamber cell by a fluid flow subsystem (not shown). Either a single type of nucleotide can be added at a time, or the nucleotides used in the sequencing procedure can be specially designed to possess a reversible termination property, thus allowing each cycle of the sequencing reaction to occur simultaneously in the presence of several types of labeled nucleotides (e.g. A, C, T, G). The nucleotides can include detectable label moieties such as fluorophores. Where the four nucleotides are mixed together, the polymerase is able to select the correct base to incorporate and each sequence is extended by a single base. Nonincorporated nucleotides can be washed away by flowing a wash solution through the chamber cell. One or more lasers may excite the nucleic acids and induce fluorescence. The fluorescence emitted from the nucleic acids is based upon the fluorophores of the incorporated base, and different fluorophores may emit different wavelengths of emission light. A deblocking reagent can be added to the chamber cell to remove reversible terminator groups from the DNA strands that were extended and detected. The deblocking reagent can then be washed away by flowing a wash solution through the chamber cell. The chamber cell is then ready for a further cycle of sequencing starting with introduction of a labeled nucleotide as set forth above. The fluidic and detection steps can be repeated several times to complete a sequencing run. Exemplary sequencing methods are described, for example, in Bentley et al., Nature 456: 53-59 (2008), WO 04/018497; U.S. Pat. No. 7,057,026; WO 91/06678; WO 07/123,744; U.S. Pat. Nos. 7,329,492; 7,211, 414; 7,315,019; 7,405,281, and US 2008/0108082, each of which is incorporated herein by reference.

In some embodiments, nucleic acids can be attached to a surface and amplified prior to or during sequencing. For example, amplification can be carried out using bridge amplification. Useful bridge amplification methods are described, for example, in U.S. Pat. No. 5,641,658; U.S. Patent Publ. No. 2002/0055100; U.S. Pat. No. 7,115,400; U.S. Patent Publ. No. 2004/0096853; U.S. Patent Publ. No. 2004/0002090; U.S. Patent Publ. No. 2007/0128624; and U.S. Patent Publ. No. 2008/0009420. Another useful method for amplifying nucleic acids on a surface is rolling circle amplification (RCA), for example, as described in Lizardi et al., Nat. Genet. 19:225-232 (1998) and US 2007/0099208 A1, each of which is incorporated herein by reference. Emulsion PCR on beads can also be used, for example as described in Dressman et al., Proc. Natl. Acad. Sci. USA 100:8817-8822 (2003), which is incorporated herein by reference.

As used herein, phrases such as "a plurality of [elements]" and "an array of [elements]" and the like, when used in the detailed description and claims, do not necessarily include each and every element that a component may have. The component may have other elements that are similar to the plurality of elements. For example, the phrase "a plurality of reaction chambers [being/having a recited feature]" does not necessarily mean that each and every reaction chamber of the component has the recited feature. Other reaction chambers may not include the recited feature. Accordingly, unless explicitly stated otherwise (e.g., "each and every reaction chamber [being/having a recited feature]"), embodiments may include similar elements that do not have the recited features.

Figure 30:
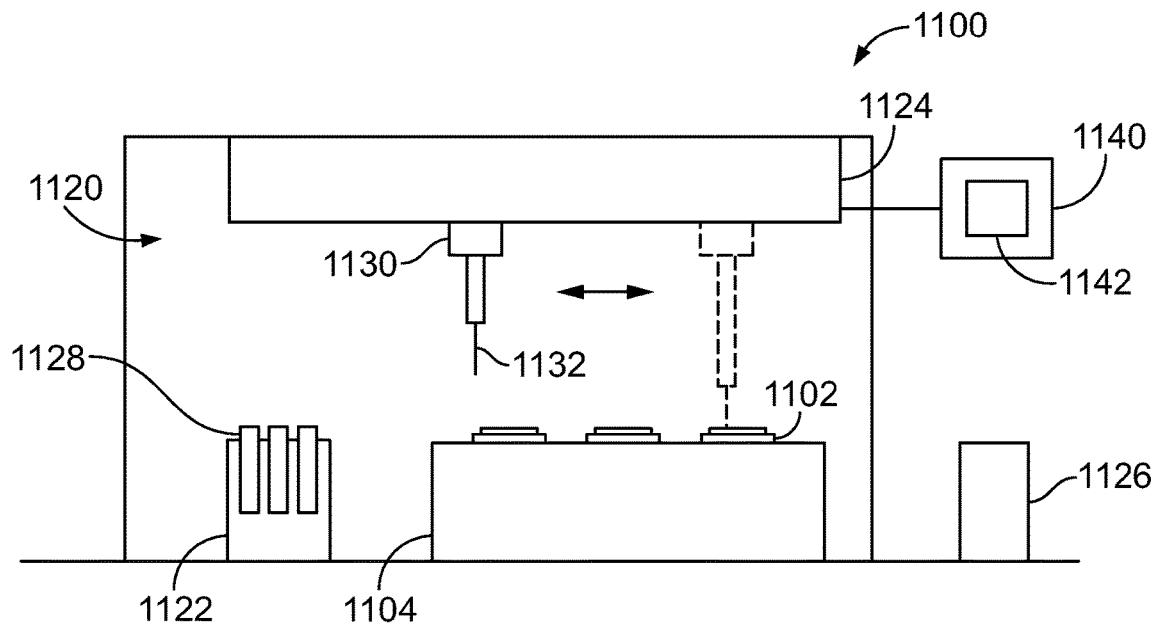
FIG. 30 is a schematic diagram of an assay system formed in accordance with an embodiment.

FIG. 30 is schematic illustration of an assay system 1100 in accordance with an embodiment. The assay system 1100 includes a system stage 1104 that is configured to hold a plurality of carrier assemblies 1102 during an assay protocol. During the assay protocol, biological or chemical samples disposed along sample substrates (not shown) may be prepared and/or analyzed by flowing one or more fluids (e.g., liquid or gas) through reaction chambers and along the biological or chemical sample. By way of example, the assay protocol may include one or more steps to conduct in-situ hybridization (ISH), fluorescent ISH (FISH), or immuno-histochemistry (IHC). It should be understood, however, that various assay protocols may be performed by the assay system 1100. In some embodiments, liquids are forced (e.g., pumped) through flow channels to the sample substrates. In other embodiments, however, the liquids may be permitted to flow onto the sample substrates through capillary action.

The assay system 1100 may also include a fluidic-control system 1120 that is capable of providing fluids to the carrier assemblies 1102. The fluidic-control system 1120 may have a storage assembly 1122, and a delivery sub-system 1124, and an optional waste reservoir 1126. The storage assembly 1122 may include one or more sources 1128 of reagents, wash solutions, buffers, and the like that are necessary for carrying out the designated assay protocol. In the illustrated embodiment, the delivery sub-system 1124 includes a robotic arm 1130 having one or more pneumatically-controlled conduits 1132 (e.g., syringes). The conduits 1132 are capable of drawing fluids from the sources 1128. The robotic arm 1130 is configured to move the drawn fluids from the storage assembly 1122 to the carrier assemblies 1102, wherein the fluids are provided to ports or passages of the carrier assembly 1102.

Operation of the different components of the assay system 1100 may be controlled by a computing system 1140 having a system controller 1142. The system controller 1142 may be a processor based system having one or more processing units. As used herein, a "processing unit" includes processing circuitry configured to perform one or more tasks, functions, or steps, such as those described herein. For instance, the processing unit may be a logic-based device that performs operations based on instructions stored on a tangible and non-transitory computer readable medium, such as memory. It may be noted that "processing unit," as used herein, is not intended to necessarily be limited to a single processor or single logic-based device. For example, the processing unit may include a single processor (e.g., having one or more cores), multiple discrete processors, one or more application specific integrated circuits (ASICs), and/or one or more field programmable gate arrays (FPGAs). In some embodiments, the processing unit is an off-the-shelf device that is appropriately programmed or instructed to perform operations, such as the algorithms described herein.

The processing unit may also be a hard-wired device (e.g., electronic circuitry) that performs the operations based on hard-wired logic that is configured to perform the algorithms described herein. Accordingly, the processing unit may include one or more ASICs and/or FPGAs. Alternatively or in addition to the above, the processing unit may include or may be associated with a tangible and non-transitory memory having stored thereon instructions configured to direct the processing unit to perform the algorithms described herein. The instructions or algorithms may be executed within a commercially reasonable time period. In the exemplary embodiment, the system controller 1142 executes a set of instructions that are stored in one or more storage elements, memories, or modules in order to at least one of obtain and analyze detection data. Storage elements may be in the form of information sources or physical memory elements within the assay system 1100. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The system controller 1142 may be connected to the other components or sub-systems of the assay system 1100 via communication links (indicated by dashed lines). The system controller 1142 may also be communicatively connected to off-site systems or servers. The communication links may be hardwired or wireless. The system controller 1142 may receive user inputs or commands, from a user interface of the computing system 1140. Such user input devices may include a keyboard, mouse, a touch-screen panel, and/or a voice recognition system, and the like.

Figure 31:
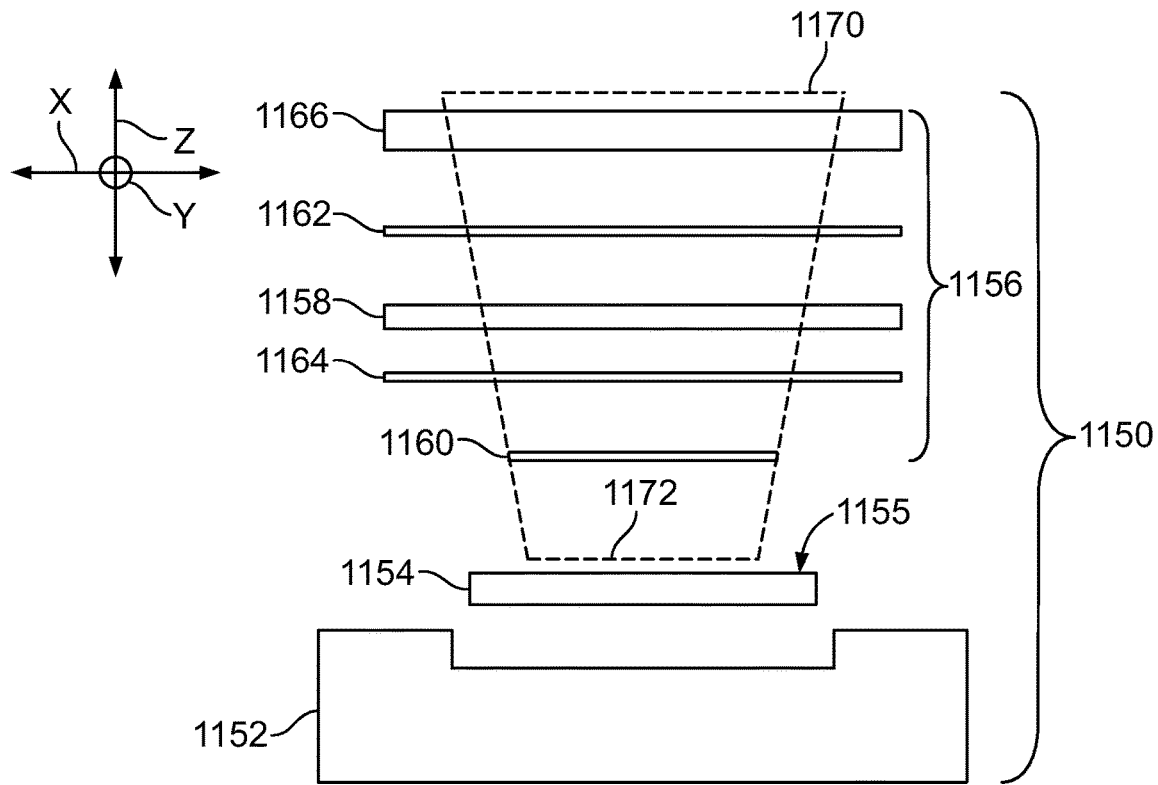
FIG. 31 is an exploded side view of a carrier assembly formed in accordance with an embodiment that may be used with the assay system of FIG. 30.

FIG. 31 is an exploded view of a carrier assembly 1150 formed in accordance with an embodiment. The carrier assembly 1150 includes a plurality of discrete sections or layers. For example, the carrier assembly 1150 includes a carrier base 1152 that is configured to hold a sample substrate 1154 during an assay protocol. The assay protocol may be used in conjunction with the embodiments described and illustrated in FIGS. 1-29. The sample substrate 1154 may have one or more biological samples disposed along a substrate surface 1155.

The carrier assembly 1150 also includes a fluidic device 1156. The fluidic device 1156 includes a plurality of channels that are configured to converge fluid from a fluid-input region 1170 (indicated by dashed line) to a denser reaction region 1172 (indicated by a dashed line) alongside the substrate surface 1155. To this end, the fluidic device 1156 may include an input layer 1158 and a chamber layer 1160. The union layer 1158 may be, for example, silicone. Optionally, the fluidic device 1156 may include a cover layer 1162 and/or a union layer 1164. The union layer 1164 is configured to be positioned between the chamber layer 1160 and the input layer 1158. The cover layer 1162 is configured to be positioned along a top side of the input layer 1158. In some embodiments, the cover layer 1162 and the union layer 1164 are configured to enclose open-sided channels of the fluidic device 1156 and provide thru-holes or access points for the fluid to flow through. However, it should be understood that the cover layer 1162 and the union layer 1164 are optional. For example, in other embodiments, the input layer 1158 has enclosed channels such that the cover layer 1162 and/or the union layer 1164 are not required.

Optionally, the fluidic device 1156 includes a guide layer 1166 that is positioned onto the input layer 1158 or the optional cover layer 1162. The guide layer 1166 may include a plurality of guide passages (not shown) that direct tips of the syringes into receiving ports (not shown) of the input layer 1158. In other embodiments, however, the fluidic device 1156 does not include the guide layer 1166. In such embodiments, the input layer 1158 may be shaped to include the guide passages. Alternatively, it may not be necessary to direct the tips during a loading operation.

The components of the fluidic device 1156 are stacked along a Z-axis. To facilitate securing the components to one another, adhesive may be disposed along the interfaces of adjacent sections or layers. When fully constructed, the fluidic device 1156 provides flow channels (not shown) having three-dimensional flow paths that converge the fluid onto the substrate surface 1155. More specifically, the flow channels may extend a depth along the Z-axis and may extend lateral distance along the X-axis and/or the Y-axis.

In some embodiments, the flow channels include downstream (or venting) segments. As the fluid is flowed toward and into reaction chambers along the substrate surface 1155, gases may be displaced through the output segments, which may also be referred to as downstream channels. In some embodiments, liquid is also permitted to flow into the downstream channels to ensure that the liquid has completely filled the reaction chambers. In some embodiments, fluid may be actively drawn through the downstream channels to remove the fluid from the reaction chambers.

FIG. 31 illustrates a fluidic device 1156 having separate layers or sections. In other embodiments, however, a single layer or section may include the features of the input layer 1158, the chamber layer 1160, the cover layer 1162, the union layer 1164, and/or the guide layer 1166. For example, the single layer or section may be injection molded or 3D-printed to include the channels and open-sided recesses described herein.

The channels may have relatively small cross-sectional dimensions. For example, the channels (e.g., upstream channels) may have a cross-sectional area that is less than 1 mm$^2$ for at least a majority of a length of the channel or less than 0.5 mm$^2$ for a majority of a length of the channel. A width of the channels may be about 1000 μm or less and a height of the channels may be about 1000 μm or less. In some embodiments, the width and/or height may be less than or equal to 750 μm or, more specifically, less than or equal to 500 μm. Yet in more particular embodiments, the width and/or height may be less than or equal to 350 μm or, more specifically, less than or equal to 250 μm. In some embodiments, a total volume of the channel is less than or equal to 50 μL, 40 μL, or 30 μL. In more particular embodiments, the total volume of the channel may be less than or equal to 25 μL, 20 μL, or 15 μL. However, it should be understood that embodiments may include channel dimensions that are larger than those described above.

Figure 32A:
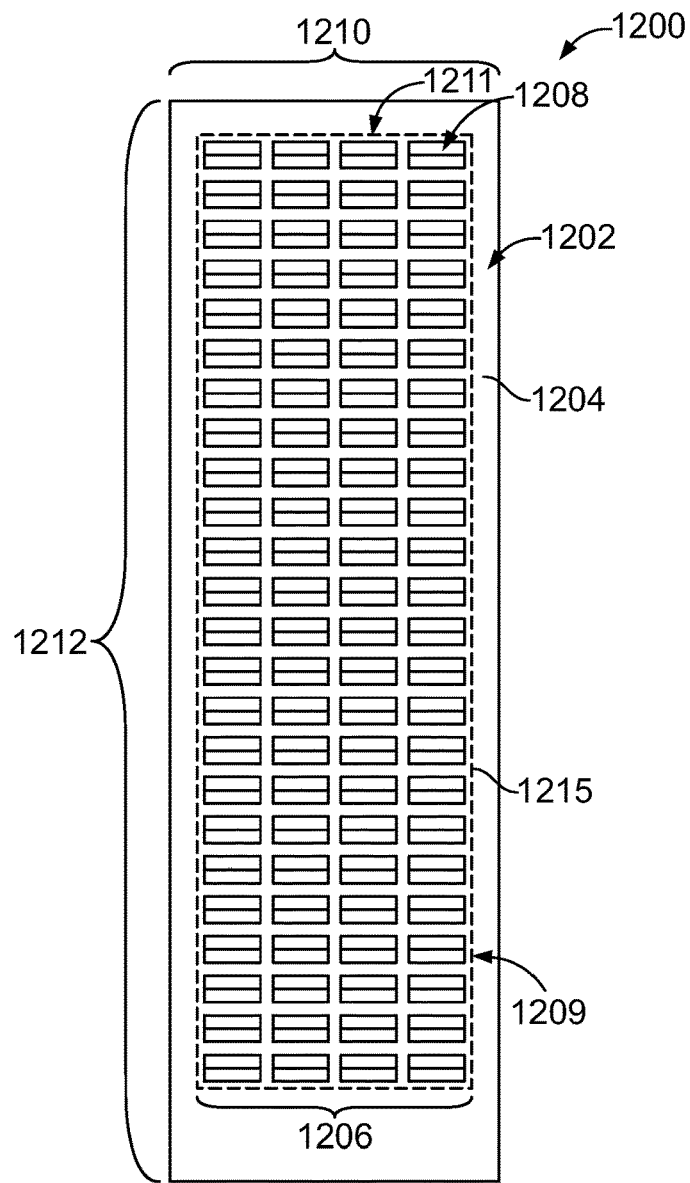
FIG. 32A is a plan view of a sample substrate having an array of reaction sites in accordance with an embodiment.
Figure 32B:
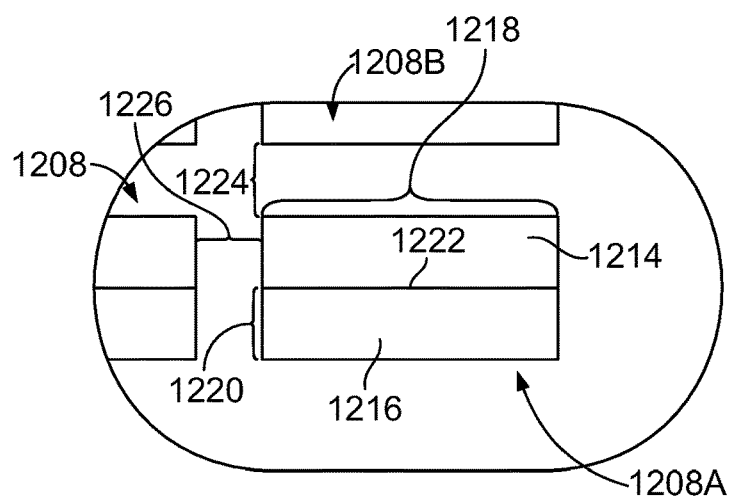
FIG. 32B is an enlarged view of the sample substrate of FIG. 32A.

FIG. 32A is a plan view of an exemplary sample substrate 1200 that may be used with one or more embodiments. FIG. 32B illustrates an enlarged portion of the sample substrate 1200. Biological or chemical samples may be immobilized to a surface of the sample substrate. The sample may include a single biological or chemical sample (e.g., tissue) or a plurality of biological or chemical samples (e.g., nucleic acids). In an exemplary embodiment, the sample substrates include microarrays, such as those found on a BeadChip Array available from Illumina Inc.

Although the following describes one particular sample substrate in greater detail, it should be understood that embodiments may be used to prepare and/or analyze a variety of sample substrates. For example, sample substrates may include one or more slides, open-face substrates, planar chips (such as those used in microarrays), or microparticles. The sample substrate 1200 is characterized as an open-face substrate because the surface have one or more biological or chemical moieties exposed for allowing fluids to flow therealong. It is contemplated, however, that other types of substrates may be used. For example, in such cases where the sample substrate includes a plurality of microparticles that support the biological or chemical substances, the microparticles may be held by another optical substrate, such as a slide, array of pits, or grooved plate.

As shown in FIG. 32A, the sample substrate 1200 has an active side 1202 that includes a substrate surface 1204. In the illustrated embodiment, the sample substrate 1200 includes a site array 1206 of reaction sites 1208 that are positioned along the substrate surface 1204. Each reaction site 1208 may include, for example, one or more microarrays having an ordered arrangement of features, such as beads. Each feature has a designated address (among the features in the microarray) and a designated chemical substance (e.g., nucleic acid). A table or database may correlate each address to a corresponding chemical substance. As shown, the reaction sites 1208 are arranged in rows 1209 and columns 1211. In particular, the array includes four (4) columns 1211 and twenty-four (24) rows 1209. It should be understood however that the site array 1206 may have any predetermined or designated arrangement. As indicated by a dashed line, the site array 1206 defines a mounting area 1215 that extends around a perimeter of the site array 1206.

The sample substrate 1200 has a width 1210 and a length 1212. In the illustrated embodiment, the sample substrate 1200 is rectangular. However, the sample substrate 1200 may have other shapes. For example, the sample substrate 1200 (or sections thereof) may be circular, semi-circular, square-shaped, pentagonal, hexagonal, etc. The shape may be convex or concave and may include linear or curved edges. The shape may be determined by the application. In some embodiments, the sample substrate 1200 has a planar body such that the sample substrate 1200 as a substantially uniform thickness. In other embodiments, however, the sample substrate 1200 may have one or more projections or platforms.

FIG. 32B illustrates one exemplary reaction site 1208 in greater detail. The reaction site 1208 includes first and second micro arrays 1214, 1216. In the illustrated embodiment, each of the first and second micro arrays 1214, 1216 has a length 1218 and a width 1220. As shown, the length 1218 is about 4.25 mm and the width is about 1.0 mm. It should be understood, however, that each reaction site 1208 and/or microarrays 1214, 1216 may be smaller or larger. The first and second micro arrays 1214, 1216 are positioned side-by-side such that the first and second micro arrays 1214, 1216 share a common edge or border 1222. In some embodiments, the border 1222 represents a small or nominal space that separates the first and second microarrays 1214, 1216. For example, a distance separating the first and second microarrays 1214, 1216 may be about 0.03 mm. In some embodiments, the first and second microarrays 1214, 1216 are configured to be simultaneously exposed to a fluid (e.g., solution containing a reagent or sample).

As shown, each reaction site 1208 is positioned adjacent to other reaction sites 1208. For example, the reaction site 1208A is located a separation distance 1224 away from a reaction site 1208B and a separation distance 1226 away from a reaction site 1208C. The portions of the substrate surface 1204 that extend between reaction sites 1208 may be configured to interface with a manifold body. In some embodiments, the separation distances 1224, 1226 are equal. For example, the separation distances may be about 1.0 mm. In other embodiments, however, the separation distances 1224, 1226 are not equal and/or are less than or greater than 1.0 mm. Yet in other embodiments, discrete reaction sites 1208 do not have any separation distance between one another.

Figure 33:
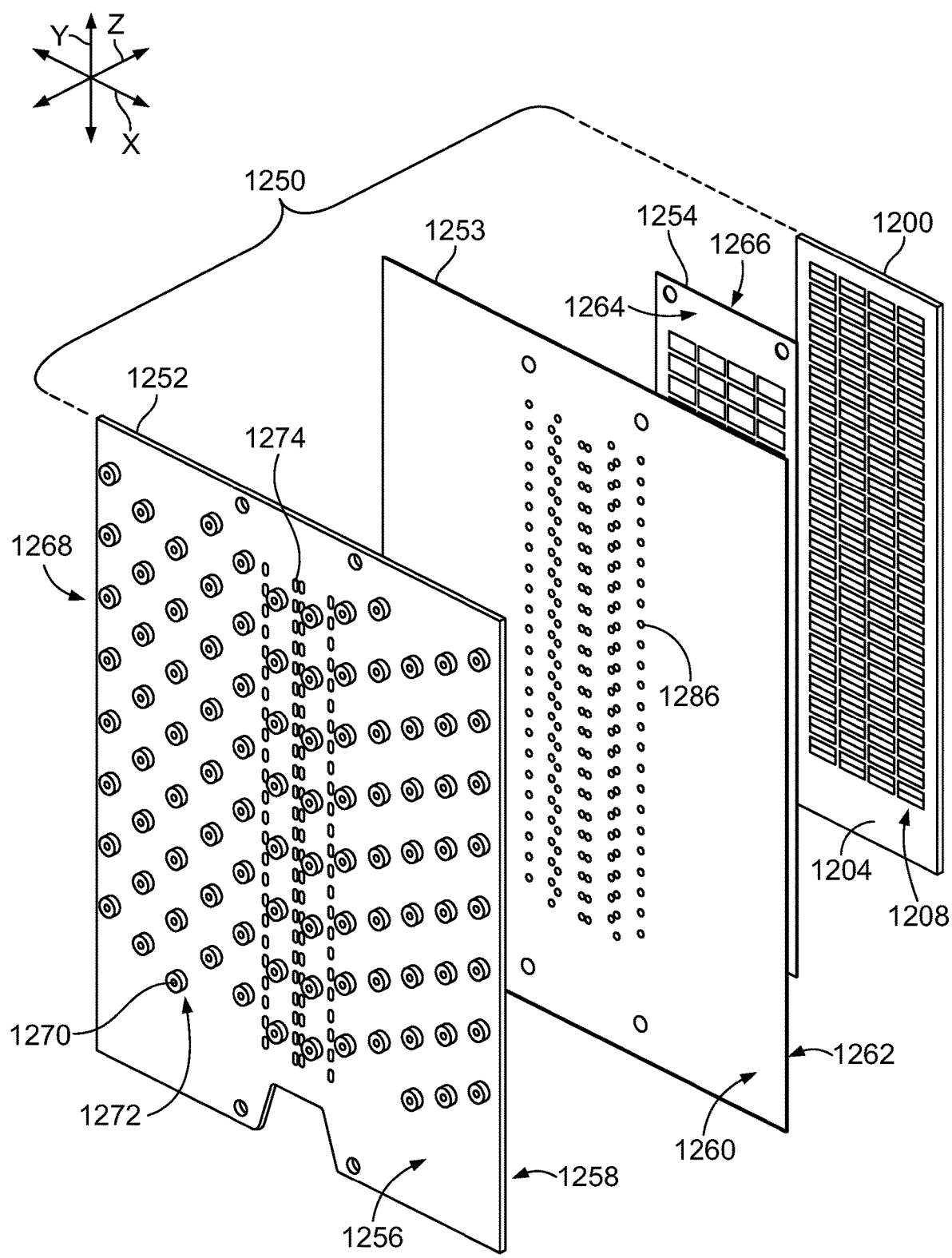
FIG. 33 is an exploded view of a manifold body formed in accordance with an embodiment.
Figure 34:
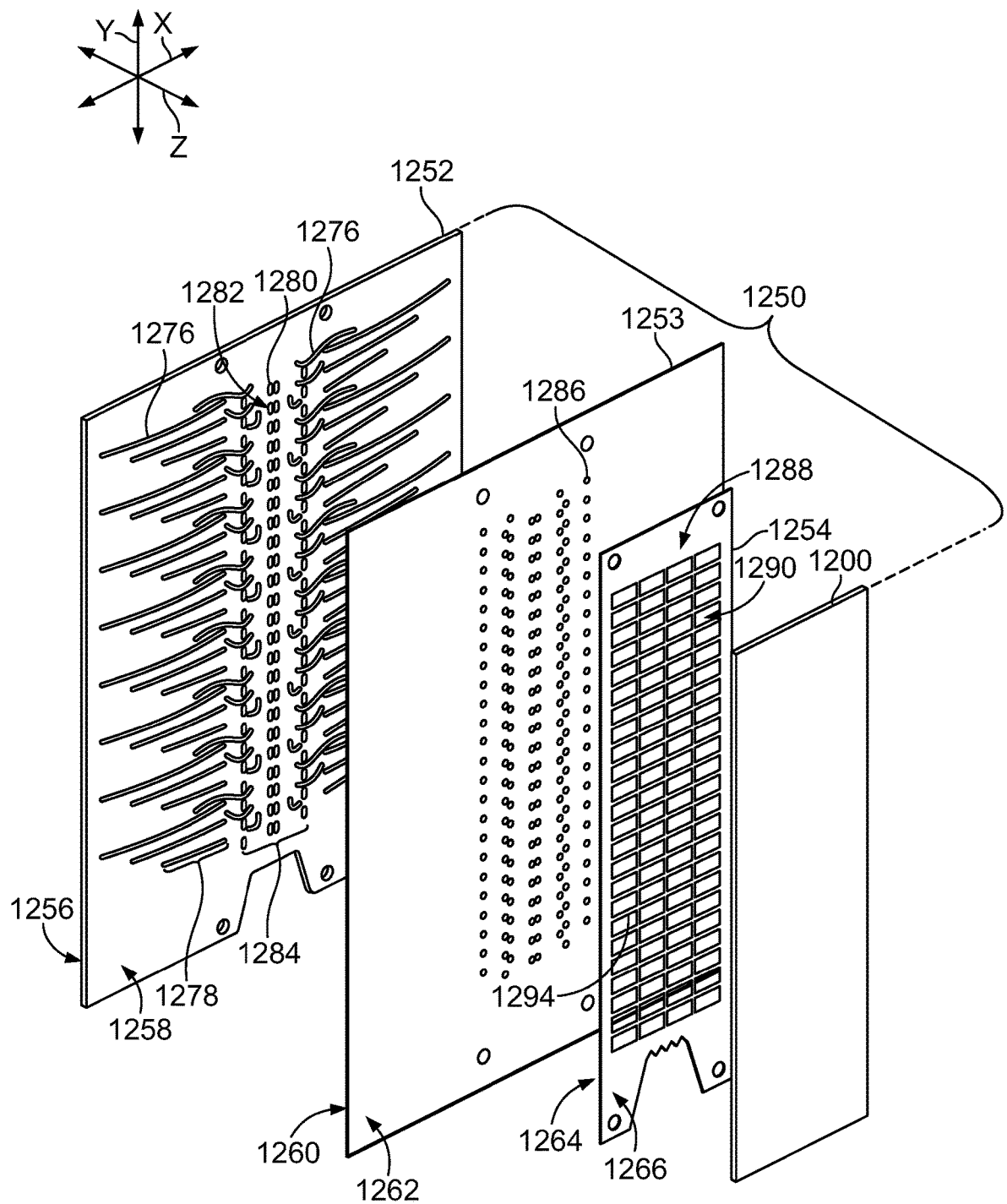
FIG. 34 is another exploded view of the manifold body of FIG. 33.

FIG. 33 is a top exploded view of a fluidic device 1250 relative to the sample substrate 1200, and FIG. 34 is a bottom perspective view of the fluidic device 1250 relative to the sample substrate 1200. In some embodiments, the fluidic device 1250 may also be referred to as a manifold body or a manifold assembly. For reference, the fluidic device 1250 is oriented with respect to mutually perpendicular X, Y, and Z axes. In some embodiments, the Z axis may extend substantially parallel to gravity. In other embodiments, however, the fluidic device 1250 may have any orientation relative to gravity.

In the illustrated embodiment, the fluidic device 1250 includes a stack of discrete body layers 1252, 1253, and 1254, including an input layer 1252, a union or intervening layer 1253, and a chamber layer 1254. Each of the body layers 1252-1254 includes an outer side and an inner side. The outer sides face away from the sample substrate 1200 or the carrier base 1372 (shown in FIG. 44), and the inner sides face toward the sample substrate 1200 or the carrier base. More specifically, the input layer 1252 includes outer and inner sides 1256, 1258, the union layer 1253 includes outer and inner sides 1260, 1262, and the chamber layer 1254 includes outer and inner sides 1264, 1266. The outer side 1256 may also be referred to as the first or outer body side of the fluidic device 1250, and the inner side 1266 may be referred to as the second or inner body side of the fluidic device 1250.

Each of the body layers 1252-1254 includes openings or passages for directing fluid. As discussed above, although the following describes specific layers as having designated functions, it should be understood that these functions, in other embodiments, may be performed by other layers and/or two or more of the layers may be combined such that the corresponding functions are performed by a single layer.

As shown in FIG. 33, the input layer 1252 includes a port array 1268 of receiving ports 1270 that are disposed along the outer side 1256. The receiving ports 1270 are openings that open to the outer side 1256. In some embodiments, the receiving ports 1270 are formed within projections or platforms 1272. The projections 1272 may be sized and shaped to interface with or engage a guide layer 1400 (shown in FIG. 46). For example, the projections 1272 may form a frictional engagement with surfaces of the guide layer 1400. It should be understood that, in other embodiments, the input layer 1252 does not include projections. For example, the receiving ports 1270 may be flush or even with surrounding areas of the outer side 1256 or may be formed within recesses of the outer side 1256.

Also shown in FIG. 33, the input layer 1252 includes vent openings 1274. When the fluidic device 1250 is fully constructed, each of the vent openings 1274 is in flow communication with a receiving port 1270. As shown, the vent openings 1274 are flush or even with the outer side 1256, but it should be understood that the vent openings 1274 may open to corresponding projections (similar to the projections 1272) or corresponding recesses in the input layer 1252. In an exemplary embodiment, the vent openings 1274 and the receiving ports 1270 have a one-to-one relationship such that each vent opening 1274 is in flow communication with a single receiving port 1270 and each receiving port 1270 is in flow communication with a single vent opening 1274. It is contemplated, however, that the receiving ports 1270 and the vent openings 1274 may be in flow communication with more than one corresponding opening or port in other embodiments.

Turning to FIG. 34, the input layer 1252 includes a plurality of channel segments 1276 that are disposed along the inner side 1258. The channel segments 1276 are in flow communication with respective receiving ports 1270 (FIG. 33). In the illustrated embodiment, the channel segments 1276 are open-sided channels such that the channels are open for a length of the channels along the inner side 1258. The channel segments 1276 are configured to be covered by the outer side 1260 (FIG. 33) when the fluidic device 1250 is constructed. In other embodiments, however, the channel segments 1276 may not be open-sided. Instead, the channel segments 1276 may extend partially or entirely within a thickness of the input layer 1252.

Each of the channel segments 1276 has a corresponding length 1278. The length 1278 may be based on the location of the corresponding receiving port 1270 that the channel segment 1276 is in flow communication with. Also shown in FIG. 34, the input layer 1252 includes vent ports 1280 disposed along the inner side 1258. The vent ports 1280 are in flow communication with corresponding vent openings 1274 (FIG. 33). In the illustrated embodiment, the vent ports 1280 and the corresponding vent openings 1274 form thru-holes 1282 of the input layer 1252. Each thru-hole 1282 extends directly through the thickness of the input layer 1252 substantially parallel to the Z-axis. As shown, the vent ports 1280 are generally located along a central region 1284 that extends parallel to the Y-axis.

As shown in FIGS. 33 and 34, the union layer 1253 includes thru-holes 1286 that extend directly through the union layer 1253 between the outer and inner sides 1260, 1262. As described herein, each of the thru-holes 1286 is configured to align with a corresponding channel segment 1276 or a vent port 1280. If the thru-hole 1286 aligns with vent port 1280, then the thru-holes 1282, 1286 collectively form a venting channel (or a downstream channel). The chamber layer 1254 includes reaction passages 1290 that extend through the entire thickness of the chamber layer 1254. As described above, the reaction passages 1290 form reaction chambers 1360 (shown in FIG. 41) when the chamber layer 1254 is sandwiched between the union layer 1253 and the sample substrate 1200. The reaction passages 1290 are formed by a web 1292 that has a plurality of interconnected linkages 1294, 1295. Each of the reaction passages 1290 is configured to align with two of the thru-holes 1286 when the fluidic device 1250 is fully constructed. When constructed, each of the reaction passages 1290 forms a reaction chamber 1360 that is defined by corresponding linkages 1294, 1295, the inner side 1262 of the union layer 1253, and the substrate surface 1204 (FIG. 33) of the sample substrate 1200. Each of the reaction passages 1290 is configured to align with a designated reaction site 1208 (FIG. 33) of the sample substrate 1200.

FIG. 35 is a plan view of the outer side 1256 of the input layer 1252 and illustrates the port array 1268 in greater detail. As shown, the port array 1268 defines a reaction region 1302. The reaction region 1302 is designated by the outer most receiving ports 1270. In FIG. 35, the reaction region 1302 is designated by a dashed line that extends through each of the receiving ports 1270 that define a perimeter of the port array 1268. As shown, the perimeter is linear along the Y axis, but wave-like along the X axis. In other embodiments, however, the port array 1268 may have another perimeter. For example, the perimeter may be rectangular or any other polygonal shape. The perimeter may also be circular or have portions that are curved.

In the illustrated embodiment, the port array 1268 includes a series of twelve (12) port columns 1304. Each port column 1304 includes eight (8) receiving ports 1270 that are distributed along the Y axis. The receiving ports 1270 are positioned within each column to receive a corresponding pipette tip (not shown), such as the pipette tips 1426 (shown in FIG. 48). More specifically, a variety of multi-pipetting systems have designated arrangements of pipette tips. In some cases, the standard may be established by convention or by one or more industries. Typically, the pipette tips are evenly distributed along a line. For example, in the illustrated embodiment, a separation distance 1306 between adjacent receiving ports 1270 in each column 1304 is about 9.0 mm. It should be understood, however, that the separation distance 1306 may be different in other embodiments. In some embodiments, the receiving ports 1270 are not evenly distributed such that one or more receiving ports 1270 is closer to other receiving ports in the same column.

In the illustrated embodiment, each column 1304 has the same column length 1308 such that the same multi-pipetting system may load fluid into each of the columns 1304. However, as shown, the columns 1304 have different locations along the Y axis. For example, the column 1304A is closer to an edge 1310 of the input layer 1352 that either of columns 1304B, 1304C. However, after column 1304C, the columns 1304 repeat the positions such that each column 1304 has one of three different positions along the Y axis.

As described above with respect to FIG. 32A, the sample substrate 1200 has a site array 1206 that includes twenty-four rows 1209 and four columns 1211 for a total of ninety-six (96) reaction sites 1208. The port array 1268 also includes 96 receiving ports 1270. However, the port array 1268 has a different configuration than the site array 1206 such that a plurality of columns 1304 correspond to a single column 1211. For example, in the illustrated embodiment, the columns 1304A, 1304B, 1304C correspond to a single column 1211 of the site array 1206. Due to the different configurations of the port array 1268 and the site array 1270, the fluidic device 1250 forms a plurality of channels for delivering fluids from the pipette tips to the reaction sites 1208 (FIG. 32A). In particular embodiments, a plurality of channels also permit venting gas (e.g., air) and/or the fluids delivered from the pipette tips.

FIG. 36 illustrates a cross-section of the input layer 1252 that shows a single receiving port 1270 and corresponding projection 1272. The receiving port 1270 is defined between first and second openings 1318, 1320. The projection 1272 has a circular shape. As such, FIG. 36 illustrates an outer diameter 1312 of the projection 1272. The outer diameter 1312 may be, for example, about 2.5 mm to about 3.0 mm. It should be understood, however, that the projection 1272 may have a different shape. The projection 1272 also has an inner diameter 1314. The inner diameter 1314 is defined by the input layer 1252 between the first and second openings 1318, 1320. In some embodiments, the inner diameter 1314 at the first opening 1318 is different for different receiving ports 1270. For example, the inner diameter 1314 may be 0.80 mm at the first openings 1318 for the receiving ports 1270 that form column 1304A (FIG. 35), 0.70 mm at the first openings 1318 for the receiving ports 1270 that form the column 1304B (FIG. 35), and 0.60 mm at the first openings 1318 for the receiving ports 1270 that form the column 1304C (FIG. 35). In other embodiments, however, the inner diameters 1314 at the first openings 1318 are substantially equal. Also shown, the projection 1272 has a height 1316 from a base portion of the outer side 1256. The height 1316 may be, for example, about 0.75 mm to about 1.25 mm.

Figure 37:
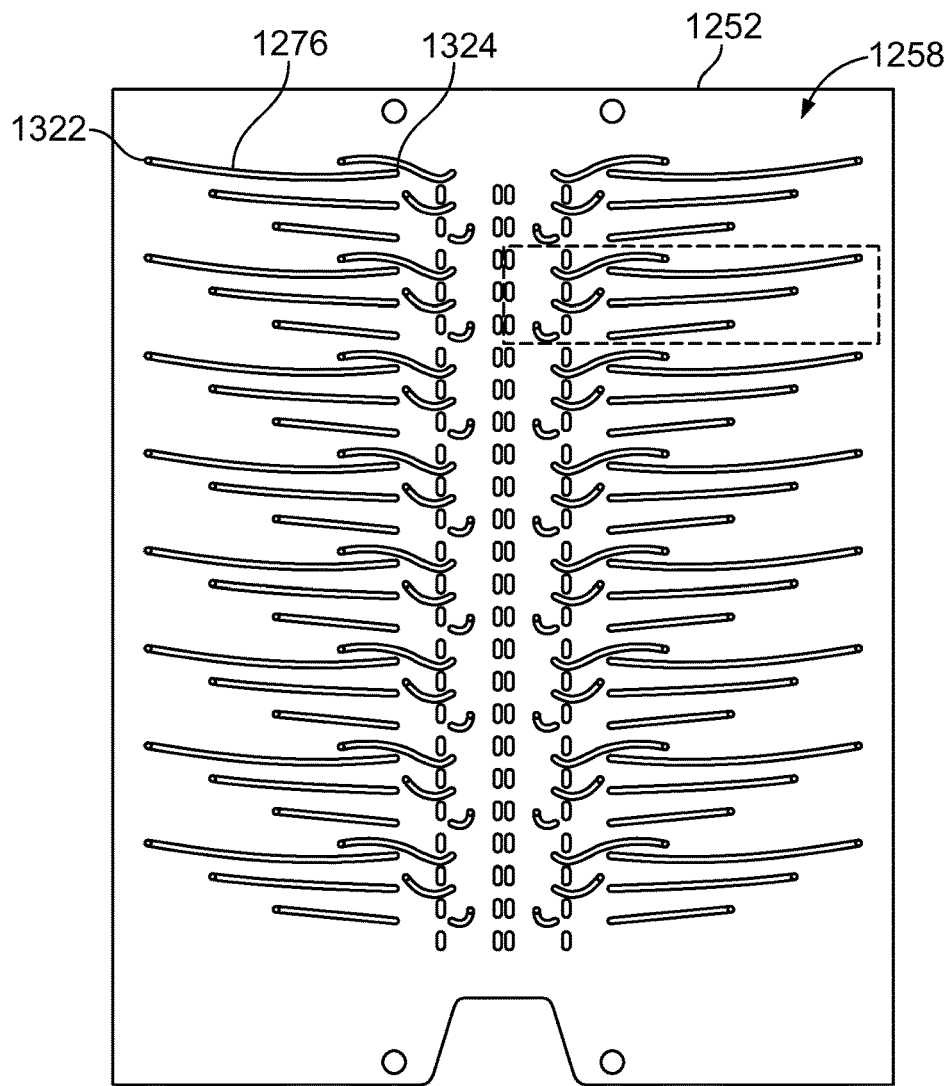
FIG. 37 is a plan view of an inner side of the input layer of FIG. 35.

FIG. 37 is a plan view of the inner side 1258 of the input layer 1252. As shown, each of the channel segments 1276 has a path length that extends from a channel end 1322 to an opposite channel end 1324. The channel end 1322 may be referred to as the input end and corresponds to the second opening 1320 (FIG. 36) of a respective receiving port 1270 (FIG. 33). The channel end 1324 may be referred to as the output end and is configured to be positioned over one of the thru-holes 1286 (FIG. 34) of the union layer 1253.

Figure 38:
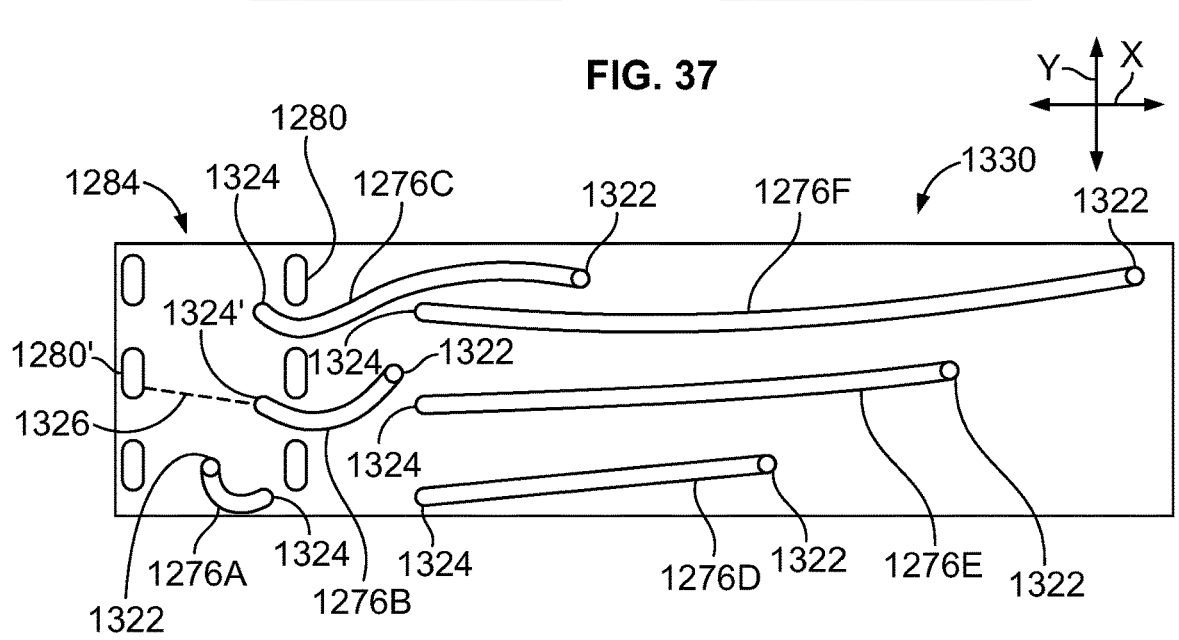
FIG. 38 is an enlarged view of a portion of the inner side of the input layer of FIG. 35.

FIG. 38 illustrates a set 1330 of channel segments 1276A-1276F that are surrounded by the dashed line in FIG. 37. The set 1330 (or a symmetrical set) may be repeated alongside the inner side 1248. Each of the channel ends 1322 and channel ends 1324 is indicated in FIG. 38. As shown, each of the channel segments 1276B-1276F in the set 1330 has a corresponding channel end 1322 that is outside of the central region 1284 and extend toward the central region 1284. The central region 1284 extends between the two outer columns of the vent ports 1280. Only one of the outer columns of the vent ports 1280 is shown in FIG. 38. The channel segments 1276B extends into the central region 1284, and the channel segment 1276A is entirely disposed within the central region 1284.

The channel segments 1276 are configured to position the respective channel ends 1324 at designated locations so that the channel segments 1276 align with and are fluidly coupled to corresponding thru-holes 1286 (FIG. 33). As shown, a majority of each of the path lengths of the channel segments 1276A-1276F extends laterally along the X axis. However, the channel segments 1276A-1276F extends partially along the Y axis. The channel segment 1276D is essentially linear, but the channel segments 1276A, 1276B, and 1276D-1276F are non-linear along the path length. Although FIGS. 37 and 38 illustrate channel segments with particular configurations, it should be understood that other configurations may be used. In some embodiments, the channel segments 1276 do not form repeating sets, but have predetermined configurations based on the application of the input layer 1252.

As shown, each of the channel ends 1324 of the channel segments 1276A-1276C has a relative position with respect to an associated vent port 1280. By way of example, the channel end 1324' has a designated position (indicated by the dashed line 1326) relative to an associated vent port 1280'. Each vent port 1280 has the same designated position 1326 relative to another associated channel end 1324. As described below, the positions of the associated channel ends 1324 and vent ports 1280 are configured to provide a desired flow through a corresponding reaction chamber 1360 (FIG. 41) that fluidly couples the associated channel ends 1324 and vent ports 1280.

Figure 39:
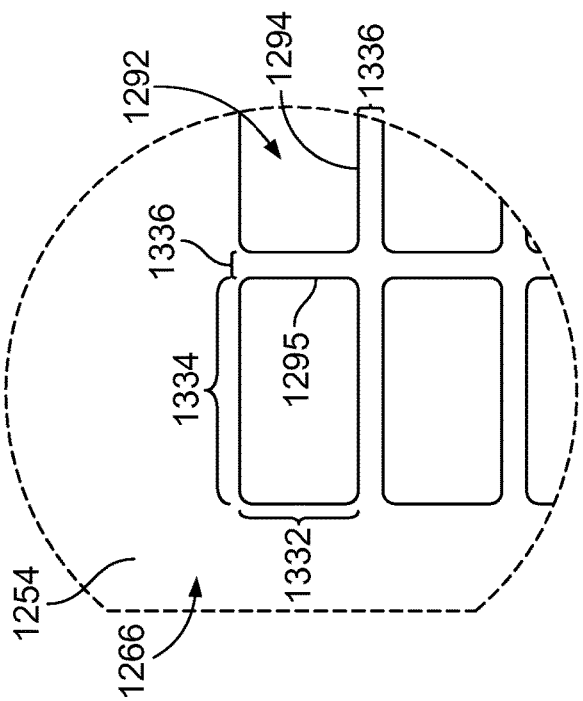
FIG. 39 is an enlarged view of a portion of a chamber layer of the manifold body of FIG. 33.

FIG. 39 is an enlarged plan view of a portion of the chamber layer 1254. In some embodiments, the inner side 1266 of the chamber layer 1254 has an adhesive applied thereto. For example, the chamber layer 1254 may be shaped from a film, such as a polyester film (e.g., biaxially-oriented polyethylene terephthalate (boPET))). The film may be stamped to provide the reaction passages 1290. The film may have an adhesive applied to one or both sides prior to stamping. As such, the linkages 1294, 1295 of the web 1292 may have an adhesive thereon.

In the illustrated embodiment, the reaction passages 1290 have a first dimension 1332 and a second dimension 1334. The first dimension 1332 may be between, for example, 2.50 mm to 3.00 mm, and the second dimension 1334 may be between, for example, 4.25 mm and 5.25 mm. Adjacent reaction passages 1290 are separated by corresponding linkages 1294, 1295. In the illustrated embodiment, each of the linkages 1294, 1295 has the same width such that the adjacent reaction passages 1290 are separated by a common distance 1336. In an exemplary embodiment, the reaction passages 1290 have identical sizes. In other embodiments, however, the reaction passages 1290 may have any size depending upon the application.

Figure 40:
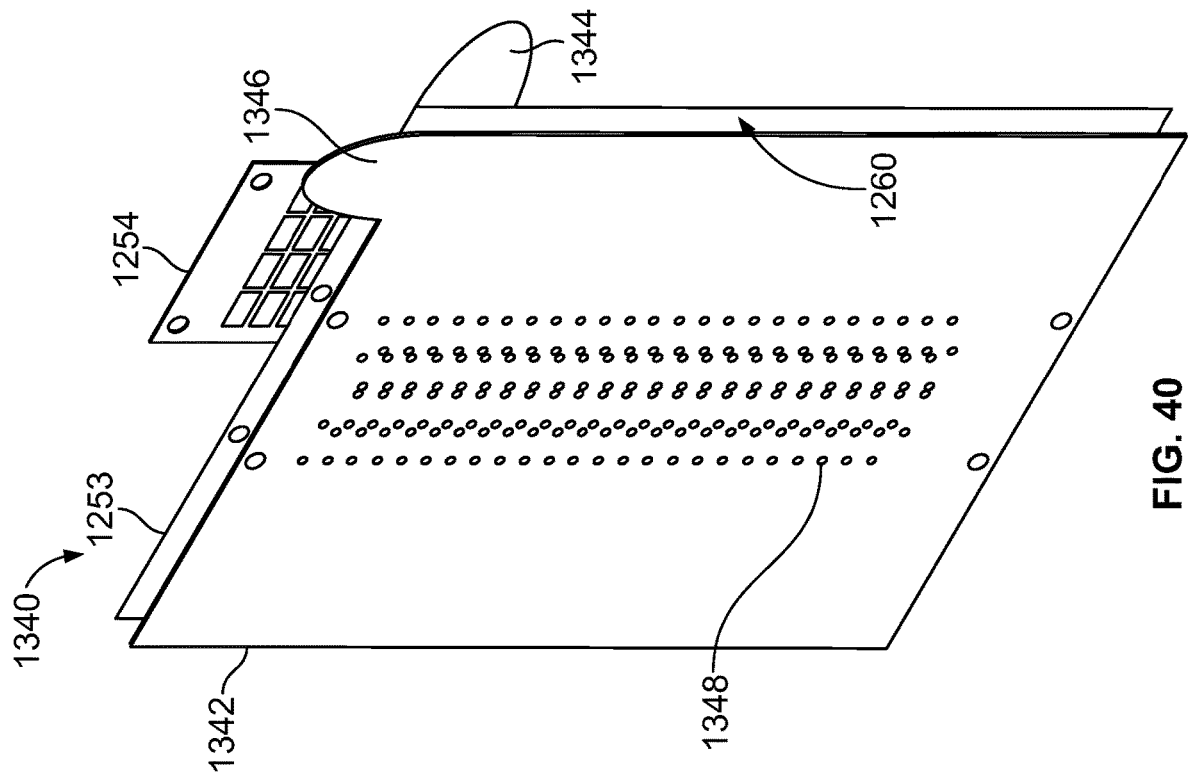
FIG. 40 is an exploded view of a pre-formed assembly that includes a portion of the manifold body of FIG. 33.

FIG. 40 is an exploded view of a preformed assembly 1340 that includes the union layer 1253, the chamber layer 1254, and a backing layer 1342. In some embodiments, the backing layer 1342 is not used with the fluidic device 1250 (FIG. 33). Instead, the backing layer 1342 may be used for the manufacture and shipment of the union layer 1253 and the chamber layer 1254. For instance, the union layer 1253 may include an adhesive along the outer side 1260 for engaging the input layer 1252. The backing layer 1342 may be used to maintain the quality and effectiveness of this adhesive along the outer side 1260. When the union layer 1253 is stamped to provide the thru-holes 1286 (FIG. 34), the backing layer 1342 may be secured to the outer side 1260 such that thru-holes 1348 are formed therethrough. As shown, the union layer 1253 and the backing layer 1342 may have respective tabs 1344, 1346. The tabs 1344, 1346 may facilitate gripping the union and backing layers 1253, 1342 so that the two layers may be separated from each other.

Figure 41:
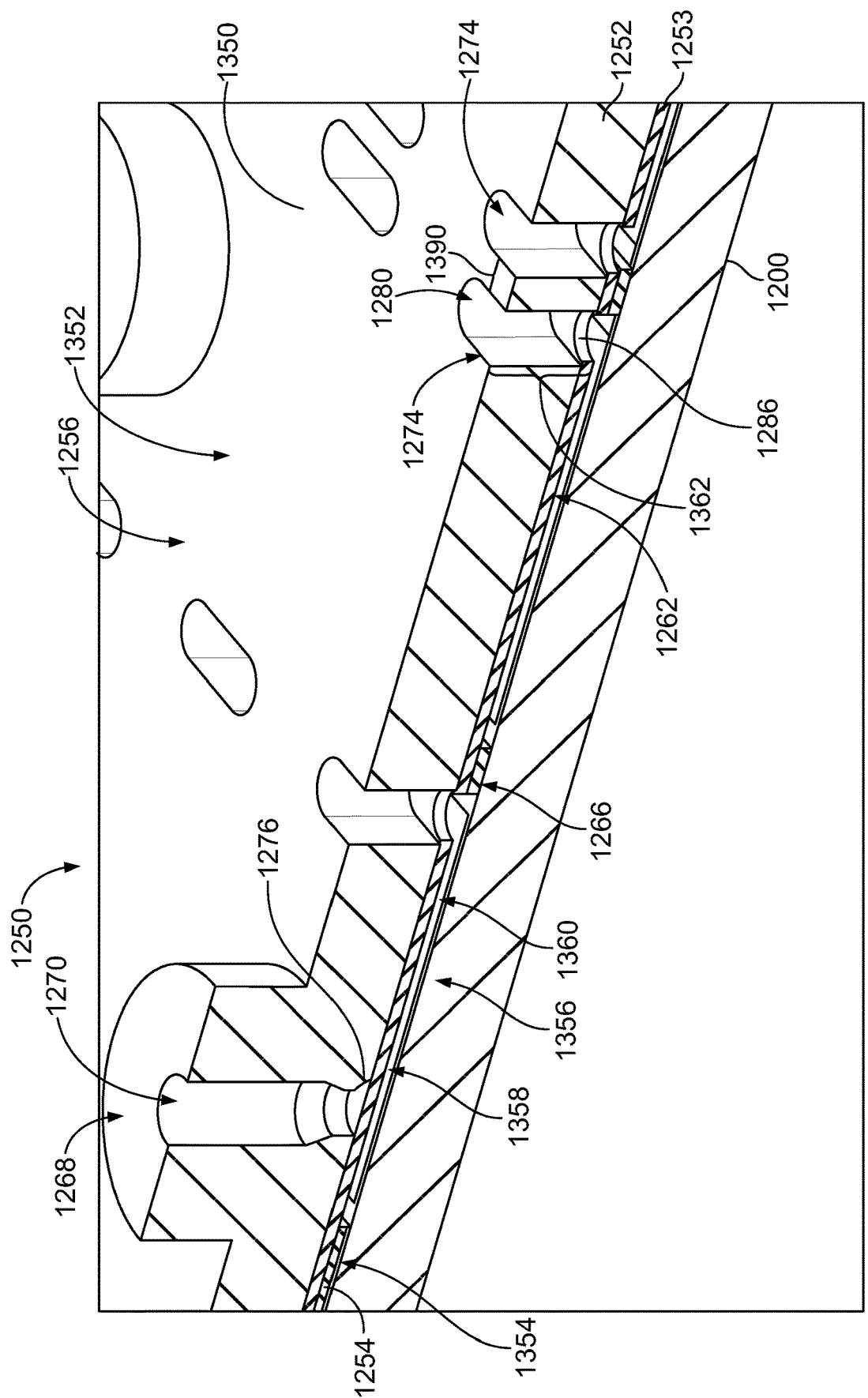
FIG. 41 is a cross-section of the manifold body of FIG. 33 mounted onto the sample substrate of FIG. 32A.

FIG. 41 is a cross-section of the fluidic device 1250 when the body layers 1252-1254 are stacked with respect to the sample substrate 1200. When stacked together, the body layers 1252-1254 form a manifold body 1350 having first and second body sides 1352, 1354 that face in opposite directions. The first body side 1352 corresponds to the outer side 1256 of the input layer 1252 and the second body side 1354 corresponds to the inner side 1266 of the chamber layer 1254. The second body side 1354 may also include portions of the inner side 1262 of the union layer 1253.

The first body side 1352 includes the port array 1268 of the receiving ports 1270. The second body side 1354 has a chamber array 1356 of open-sided recesses 1358. The open-sided recesses 1358 are defined by corresponding linkages 1294, 1295 and the inner side 1262 of the union layer 1253. The open-sided recesses 1358 are enclosed to form reaction chambers 1360 when the fluidic device 1250 is fully constructed and mounted over the sample substrate 1200 as shown in FIG. 41. Each open-sided recess 1358 (or reaction chamber 1360) is positioned to align with one corresponding reaction site 1208 such that the reaction site 1208 is exposed to the reaction chamber 1360.

The channel segments 1276 extend through the manifold body 1350 or, more specifically, the input layer 1252. Due to the position of the cross-section in FIG. 41, only a small portion of one channel segment 1276 is shown. Each of the channel segments 1276 fluidly couples a corresponding receiving port 1270 to a corresponding open-sided recess 1358 (or reaction chamber 1360).

As shown, the thru-holes 1286 of the union layer 1253 may align with corresponding vent ports 1280 that extend through the input layer 1252 to form corresponding venting channels 1362. The venting channels 1362 extend through the manifold body 1350. Each of the venting channels 1362 fluidly couples a corresponding open-sided recess 1358 (or reaction chamber 1360) to a corresponding vent opening 1274 or, more specifically, to an exterior of the manifold body 1350.

Accordingly the manifold body 1350 includes channel segments 1276 that allow for loading fluids into the corresponding reaction chambers 1360 and venting channels 1362 that allow gas to be displaced from the reaction chambers 1360. In some instances, the fluids that fill the reaction chambers 1360 may at least partially fill the venting channels 1362.

Figures 42, 43:
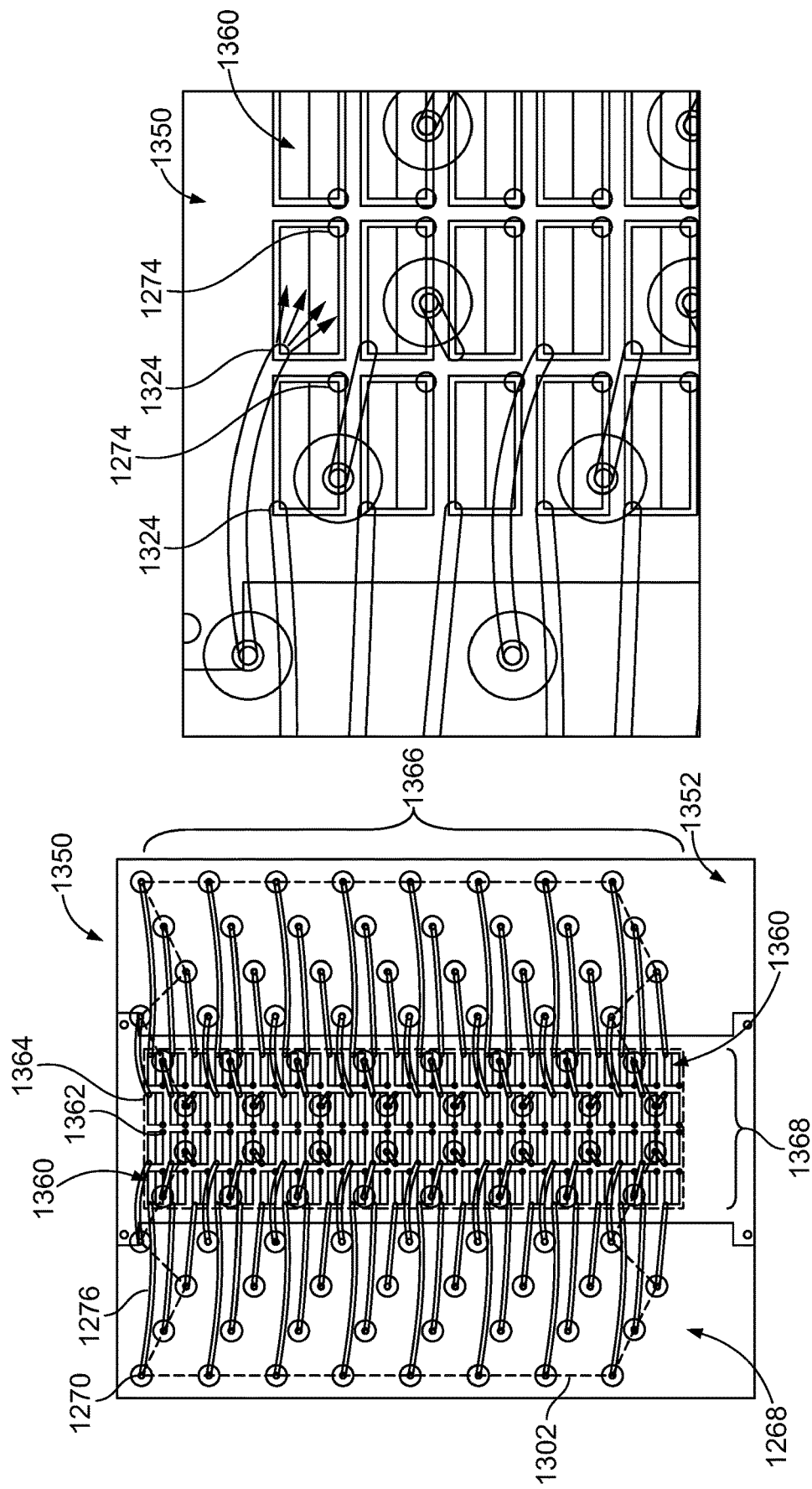
FIG. 42 illustrates a configuration of channels relative to the input layer of FIG. 6 and the sample substrate of FIG. 32A.
FIG. 43 illustrates an enlarged portion of FIG. 42.

FIG. 42 illustrates the receiving ports 1270, the channel segments 1276, the reaction chambers 1360, and the venting channels 1362 of the manifold body 1350 (or fluidic device 1250). As described above, the port array 1268 forms a reaction region 1302 along the first body side 1352. The reaction chambers 1360 form a fluid-delivery region 1364. The fluid-delivery region 1364 is defined by a dashed line that extends along a perimeter of the outer reaction chambers 1360. The fluid-delivery region 1364 has a length 1366 and a width 1368 and may be substantially equal to the mounting area 1215 (FIG. 32A). As illustrated in FIG. 42, the reaction region 1302 is greater than the fluid-delivery region 1364. In some embodiments, the fluid-delivery region 1364 is less than or equal to 75% of the reaction region 1302. In certain embodiments, the fluid-delivery region 1364 is less than or equal to 60% of the reaction region 1302. In particular embodiments, the fluid-delivery region 1364 is less than or equal to 50% of the reaction region 1302 or is less than or equal to 45% of the reaction region 1302. In particular embodiments, the fluid-delivery region 1364 is less than or equal to 40% of the reaction region 1302 or is less than or equal to 35% of the reaction region 1302.

FIG. 43 is an enlarged plan view of a portion of the manifold body 1350 (or fluidic device 1250). As shown, each of the reaction chambers 1360 is aligned with a corresponding channel end 1324 (or a corresponding thru-hole 1286 (FIG. 34) of the union layer 1253 (FIG. 34)) and a vent opening 1274 (or a corresponding thru-hole 1286 of the union layer 1253). The channel end 1324 and the vent opening 1274 that are associated with each reaction chamber 1360 are positioned such that the flow of liquid is generally diagonally across the reaction site 1208. More specifically, as indicated by the arrows, fluid is configured to enter at one corner of the reaction chamber 1360 and flow across the reaction site 1208 to an opposite corner in which the fluid may exit the reaction chamber 1360. Such embodiments may provide a more uniform exposure of the fluid across the reaction site 1208. The positions of the channel end 1324 and the vent opening 1274, however, may be based on the shape of the reaction chamber 1360. Accordingly, the channel end 1324 and the vent opening 1274 may have different locations in other embodiments.

Figure 44:
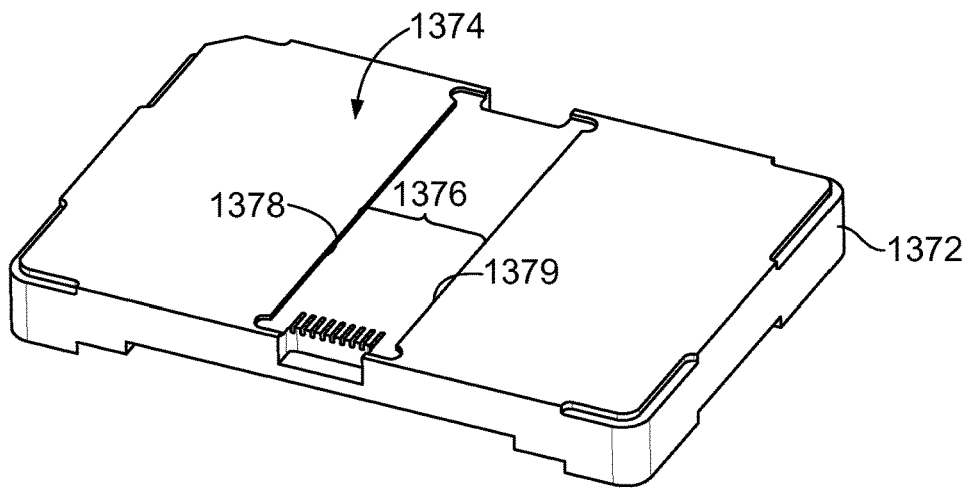
FIG. 44 is a perspective view of a carrier base that may be used to support the manifold body of FIG. 33.
Figure 45:
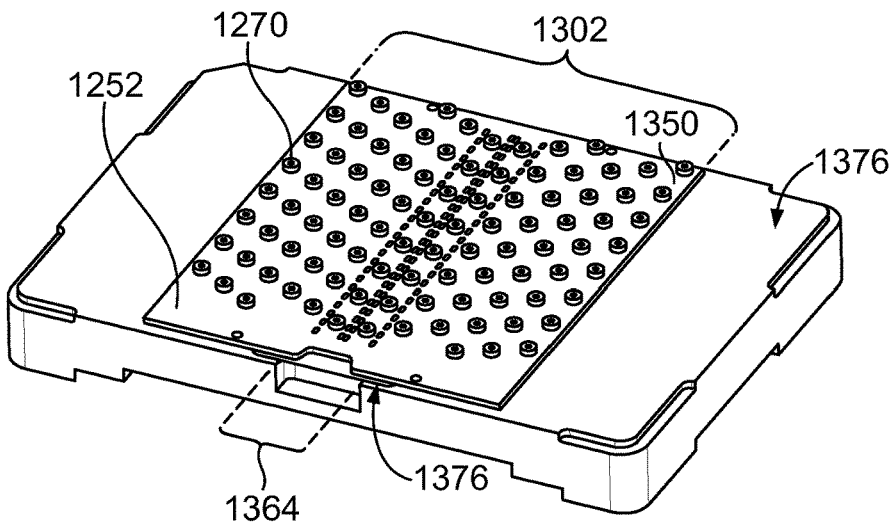
FIG. 45 is a perspective view of the carrier base of FIG. 44 having the manifold body and sample substrate mounted thereto.
Figure 46:
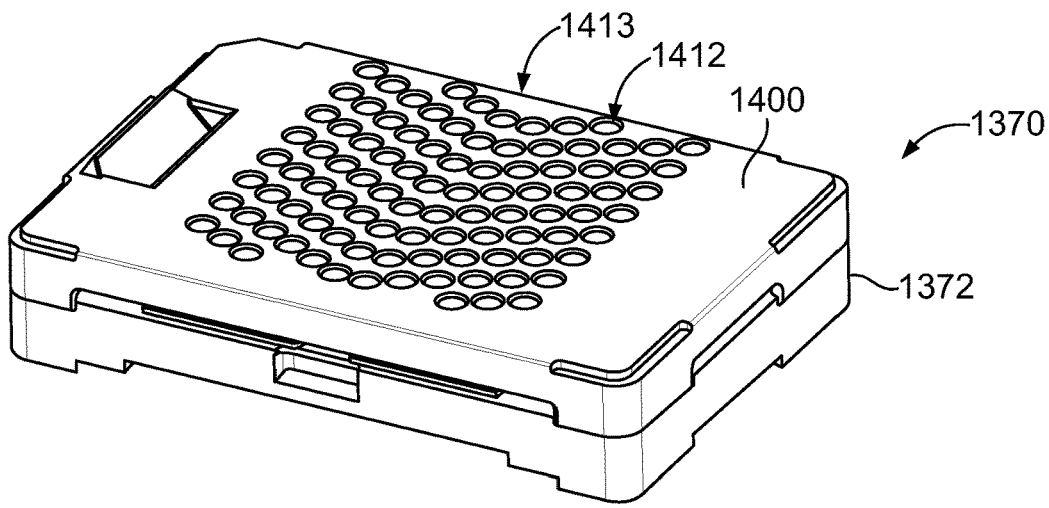
FIG. 46 is a perspective view of a carrier assembly formed in accordance with an embodiment.

FIGS. 44-46 illustrate different stages for constructing a carrier assembly 1370 (FIG. 46). FIG. 44 is a perspective view of a carrier base 1372 of the carrier assembly 1370. The carrier base 1372 is configured to support a manifold body 1350 (FIG. 45) during an assay protocol. For example, the carrier base 1372 may be positioned relative to an assay system, such as the assay system 1100 (FIG. 30). The carrier base 1372 includes a support surface 1374 that defines a nest region 1376. The nest region 1376 is configured to receive the sample substrate 1200 (FIG. 32A). The nest region 1376 is defined by opposing base edges 1378, 1379 that are configured to align the sample substrate 1200.

FIG. 45 illustrates the manifold body 1350 mounted onto the support surface 1376. The sample substrate 1200 is positioned within the nest region 1376 and portions of the input layer 1252 and the union layer 1253 (FIG. 33) clear the nest region 1376 and extend onto outer areas of the support surface 1374. FIG. 45 also provides a good illustration as to how much the manifold body 1350 is able to converge fluids from the large reaction region 1302 to the smaller fluid-delivery region 1364 within a relatively small thickness or height.

FIG. 46 is a perspective view of the fully assembled carrier assembly 1370. As shown, the carrier base 1372 is also configured to support a guide layer 1400. The guide layer 1400 includes a plurality of guide passages 1412 that align with corresponding receiving ports 1270 (FIG. 45) of the manifold body 1350. The guide passages 1412 form a passage array 1413 that has a similar pattern or arrangement as the port array 1268 (FIG. 45).

FIG. 47 is an enlarged cross-sectional view of the guide layer 1400 mounted onto the manifold body 1350. The guide layer 1400 is configured to direct a tip of a fluidic device (not shown) into a corresponding receiving port 1270. The tip may be, for example, part of a pipetting system. The guide layer 1400 includes a guide body 1402 having an outer side 1404, an opposite inner side 1406, and a plurality of the guide passages 1412 that extend through the guide body 1402 between the outer and inner sides 1404, 1406. As shown, the inner side 1406 is shaped to include a plurality of alignment cavities 1408. Each alignment cavity 1408 is defined by an interior surface of a boss 1410 along the inner side 1406. The alignment cavity 1408 is sized and shaped to receive a corresponding projection 1272 of the input layer 1252. The alignment cavity 1408 is also aligned with a corresponding guide passage 1412.

The guide passage 1412 is defined by a corresponding passage surface 1414 that is shaped such that the guide passages 1412 are conical or funnel-like. For example, the guide passage 1412 shown in FIG. 47 has an exterior opening 1416 that has a first diameter 1418 and an interior aperture 1420 that has a second diameter 1422. The second diameter 1422 is substantially smaller than the first diameter 1418. The guide passage 1412 maintains the second diameter 1422 for a depth 1424. The guide passage 1412 is aligned with the receiving port 1270.

If a tip is misaligned as the tip approaches the receiving port 1270, the passage surface 1414 is configured to deflect the tip toward the interior aperture 1420. As the tip enters the aperture 1420, the tip may be substantially aligned with the receiving port 1270. As such, the receiving port 1270 may receive the tip.

FIG. 48 is a cross-section of the guide layer 1400 mounted onto the manifold body 1350. Each of the guide passages 1412 shown in FIG. 48 has received a tip 1426 of a corresponding syringe 1427 that extends through the aperture 1420 and into the corresponding receiving port 1270. The receiving ports 1270 are defined by corresponding interior surfaces 1428. As shown, each of the tips 1426 is sealingly engaged to the corresponding interior surface 1428 such that fluid is prevented or impeded from exiting between the tip and interior surface 1428. As such, the syringes 1427 may actively control the flow of fluid into the receiving port 1427 and corresponding flow channel. More specifically, the syringes 1427 may pump fluid into the flow channel and/or draw fluid from the flow channel.

Figure 50:
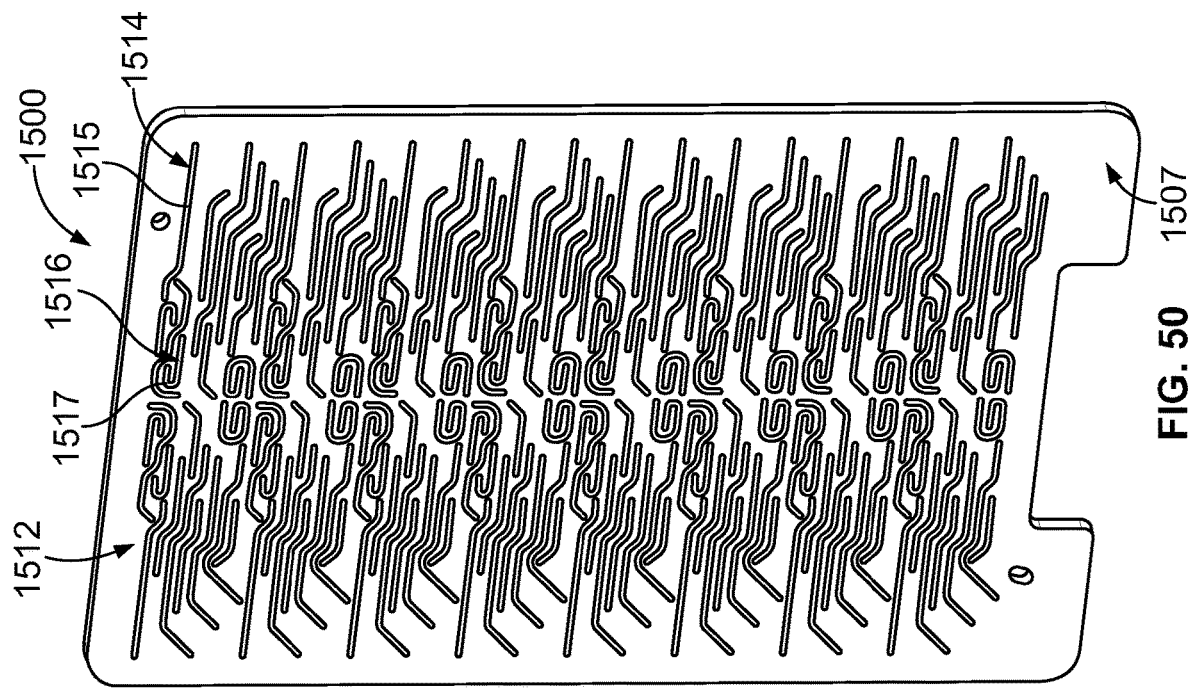
FIG. 50 is a bottom perspective view of the input layer of FIG. 49.
Figure 49:
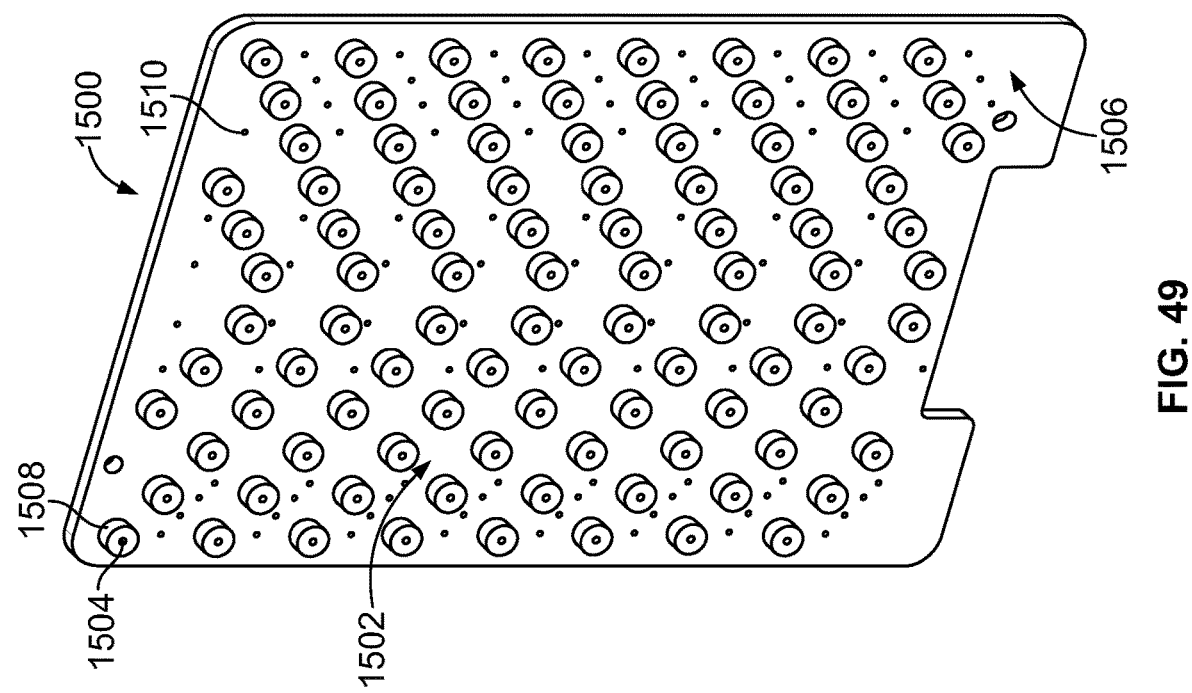
FIG. 49 is a top perspective view of an input layer formed in accordance with an embodiment.
Figure 52:
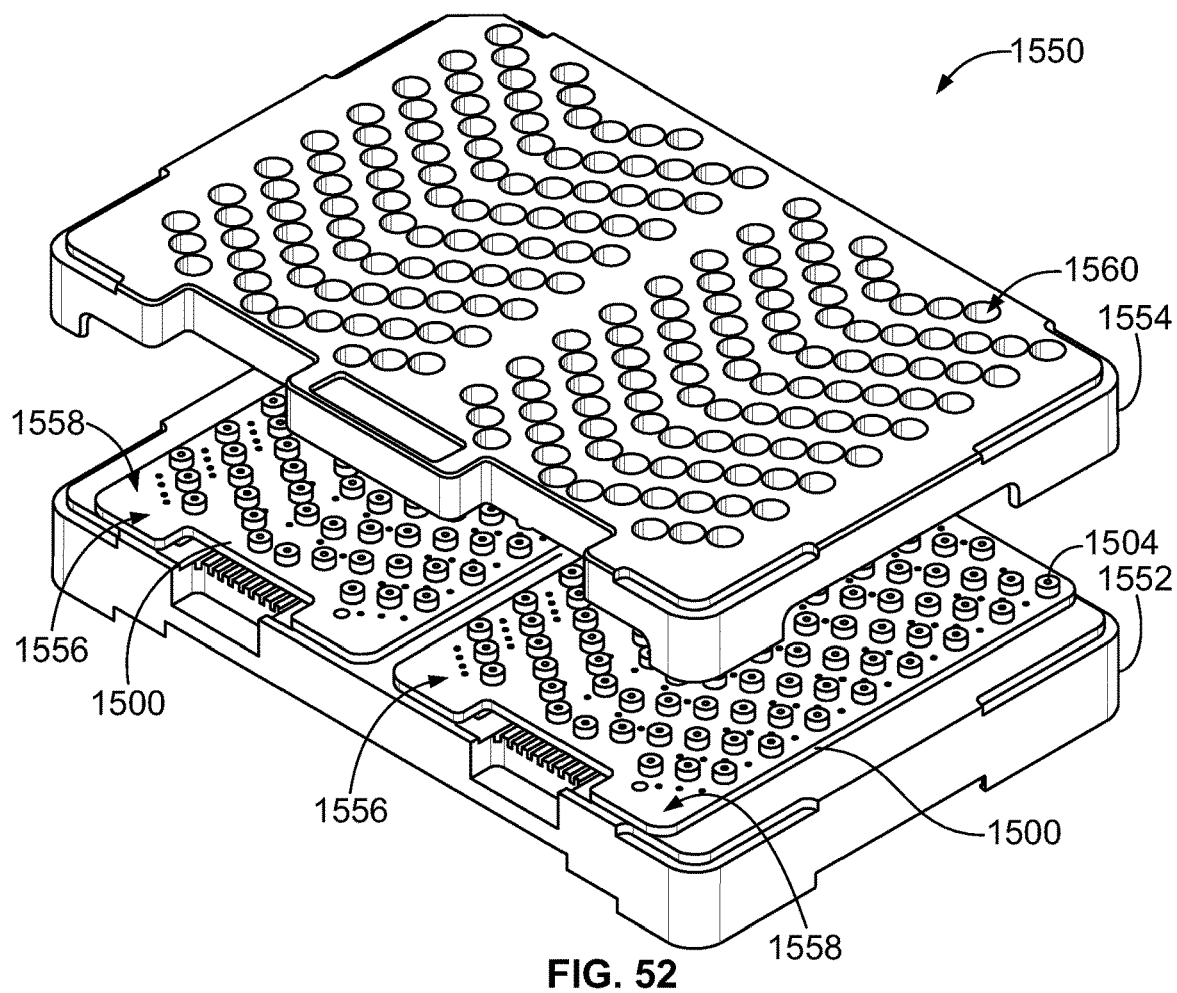
FIG. 52 is an exploded view of a carrier assembly formed in accordance with an embodiment.

FIG. 49 is a top perspective view of an input layer 1500 formed in accordance with an embodiment, and FIG. 50 is a bottom perspective view of the input layer 1500. The input layer 1500 may be similar to the input layer 1252 (FIG. 33) and may be configured to be part of a fluidic device 1556 (FIG. 52). For example, as shown in FIG. 49, the input layer 1500 includes a port array 1502 of receiving ports 1504 that are disposed along an outer side 1506 of the input layer 1500. The receiving ports 1504 are openings that open to the outer side 1506. The receiving ports 1504 are formed within projections or platforms 1508, although it is contemplated that the receiving ports 1504 may be flush or even with surrounding areas of the outer side 1506 in other embodiments.

The input layer 1500 also includes vent openings 1510. When the fluidic device 1556 (FIG. 52) is fully constructed, each of the vent openings 1510 is in flow communication with a receiving port 1504. As shown, the vent openings 1510 are flush or even with the outer side 1506, but it should be understood that the vent openings 1510 may open to corresponding projections or corresponding recesses in the input layer 1500. Compared to the vent openings 1274 (FIG. 33), the vent openings 1510 are more dispersed along the outer side 1506.

With respect to FIG. 50, the input layer 1500 includes a plurality of channel segments 1512 that are disposed along an inner side 1507. In the illustrated embodiment, the channel segments 1512 are open-sided channels such that the channels are open for a length of the channels along the inner side 1507. In some embodiments, the channel segments 1512 are configured to be covered by an outer side (not shown) of a union layer (not shown).

The channel segments 1512 include upstream segments 1514, which may also be referred to as input segments, and venting segments 1516, which also be referred to as output segments. The upstream segments 1514 are configured to fluidly couple the receiving ports 1504 (FIG. 49) to reaction chambers 1520 (shown in FIG. 51). The venting segments 1516 are configured to fluidly couple the reaction chambers 1520 to the vent openings 1510 (FIG. 49). Each of the upstream segments 1514 has a corresponding length 1515 that extends between opposite channel ends, and each of the venting segments 1516 has a corresponding length 1517 that extends between opposite channel ends. As shown, the lengths 1515 may vary depending upon the location of the upstream segment 1514, and the lengths 1517 may vary depending upon the location of the venting segment 1516.

Figure 51:
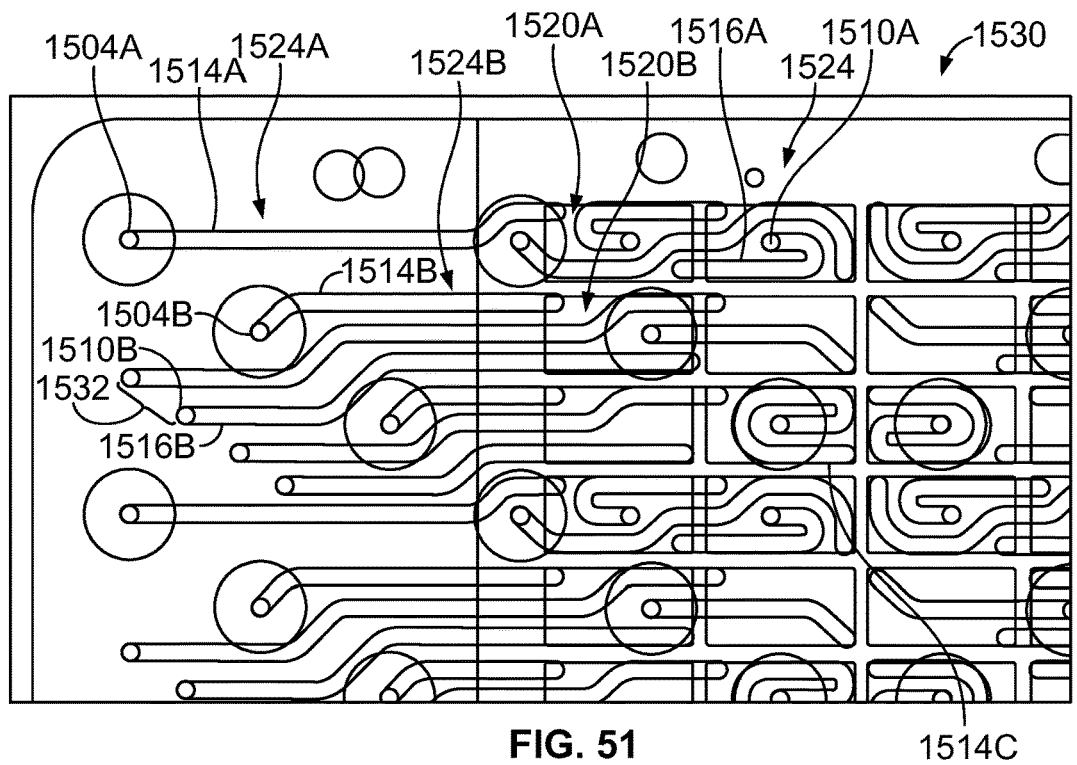
FIG. 51 is a plan view of a portion of a fluidic device illustrating flow channels in greater detail.

FIG. 51 is a plan view of a portion of a manifold body 1530 and illustrates flow channels 1524 of a manifold body 1526 that includes the input layer 1500 and a chamber layer 1528. The union layer of the manifold body 1526 is not shown, but it may be similar to the union layer 1253 (FIG. 33). Each flow channel 1524 includes a respective receiving port 1504, a respective upstream segment 1514, a respective reaction chamber 1520, a respective venting segment 1516, and a respective vent port 1510 that are in flow communication with one another. By way of example, a flow channel 1524A is shown and includes a respective receiving port 1504A, a respective upstream segment 1514A, a respective reaction chamber 1520A, a respective venting segment 1516A, and a respective vent port 1510A that are in flow communication with one another. As another example, a flow channel 1524B is shown and includes a respective receiving port 1504B, a respective upstream segment 1514B, a respective reaction chamber 1520B, a respective venting segment 1516B, and a respective vent port 1510B that are in flow communication with one another.

As shown in FIG. 51, the upstream segments 1514A, 1514B have different lengths and the venting segments 1516A, 1516B have different lengths. In an exemplary embodiment, the flow channels 1524 are configured such that each flow channel 1524 has a total volume (e.g., space capable of receiving a fluid) that is substantially common with other total volumes. As used herein, a "substantially common volume" includes the different volumes of the flow channels 1524 being within 20% of a designated volume. For example, the flow channels may be configured to have a total volume of 20 µL (+/−20%). As such, one or more of the flow channels 1524 may have a total volume of 16 µL, one or more of the may have a total volume of 24 µL, and other flow channels 1524 may have a total volume between 16 µL and 24 µL. In such embodiments, the flow channels 1524 have a substantially common volume. In certain embodiments, the total volumes of the flow channels 1524 may be within 15% of a designated volume or within 10% of a designated volume. In certain embodiments, the total volume may be less than or equal 100 µL, less than or equal 80 µL, less than or equal 60 µL, or less than or equal 50 µL. In more particular embodiments, the total volume may be less than or equal 40 µL, less than or equal 30 µL, less than or equal 20 µL, less than or equal 15 µL, or less than or equal 10 µL.

The total volumes may be substantially equal by directing the upstream and/or venting segments 1514, 1516 along predetermined paths. For example, many of the upstream and/or venting segments 1514, 1516 have non-linear paths. Many of the upstream and/or venting segments 1514, 1516 have paths that are wrap about themselves. For example, the upstream segment 1514C wraps about itself.

FIG. 52 is an exploded view of a carrier assembly 1550 that includes a carrier base 1552 and a guide layer 1554. The carrier base 1552 may be similar to the carrier base 1372 (FIG. 44), and the guide layer 1554 may be similar to the guide layer 1400 (FIG. 46). However, the carrier base 1552 and the guide layer 1554 are configured to interface with two fluidic devices 1556. Each fluidic device 1556 includes a manifold body 1558 having the input layer 1500. As shown, the guide layer 1554 includes two arrays of guide passages 1560 for aligning with the receiving ports 1504 of the input layer 1500.

Alternatively or in addition to having a substantially common volume, the flow channels 1524 may be configured to disperse the vent openings 1510. Embodiments having dispersed vent openings 1510 may reduce the likelihood of cross-contamination from liquids that form a bolus along the outer side 1506. As shown in FIG. 51, adjacent vent openings 1510 may be separated by a separation distance 1532. The separation distance 1532 may be configured to reduce the likelihood of cross-contamination from liquids that form a bolus at the corresponding vent openings 1510. Compare the separation distance 1532 to a separation distance 1390 in FIG. 41 that separates the vent openings 1274. The separation distance 1510 between adjacent vent openings 1510 may be, for example, at least 3.0 mm, at least 4.0 mm, or at least 4.5 mm. The separation distance 1390 may be about 1.0 mm.

Figure 53:
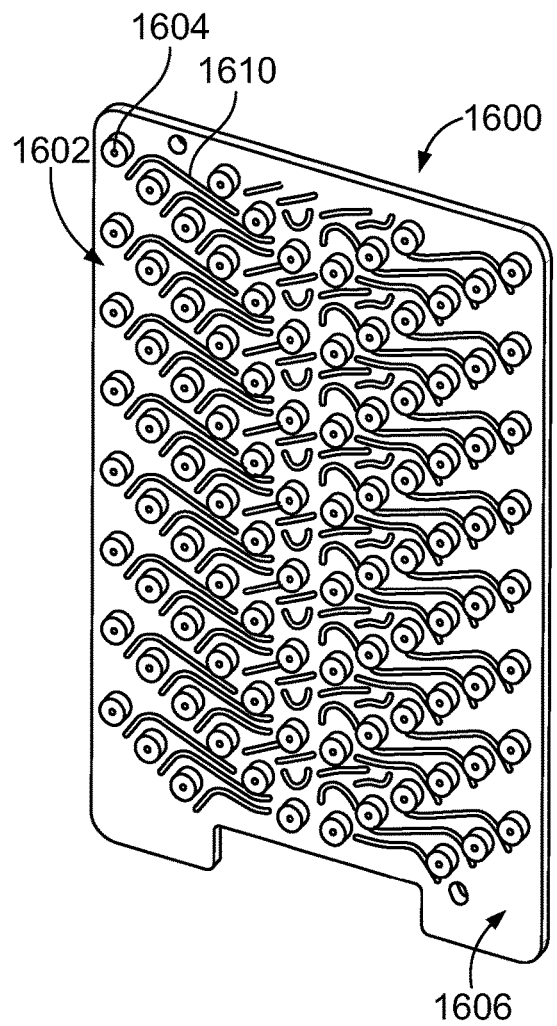
FIG. 53 is a top perspective view of an input layer formed in accordance with an embodiment.
Figure 54:
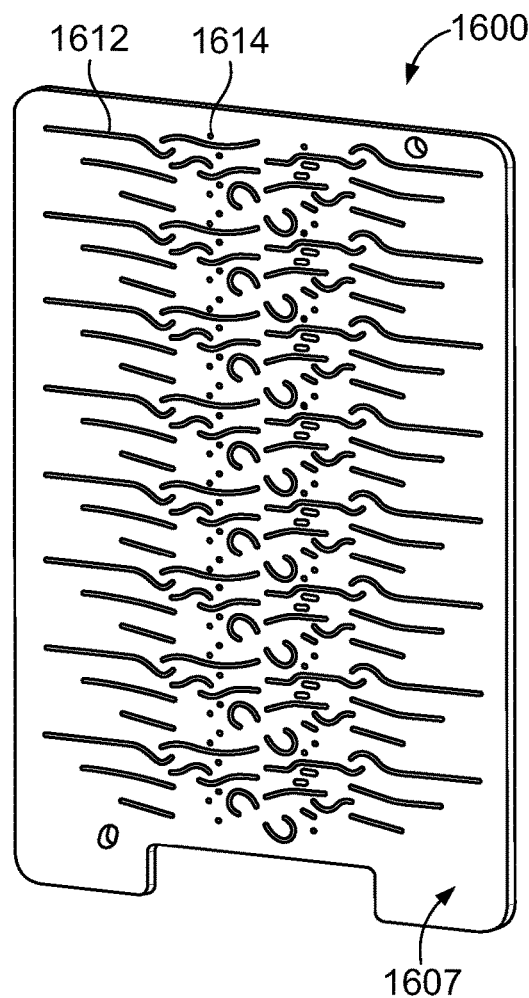
FIG. 54 is a bottom perspective view of the input layer of FIG. 53.
Figure 55:
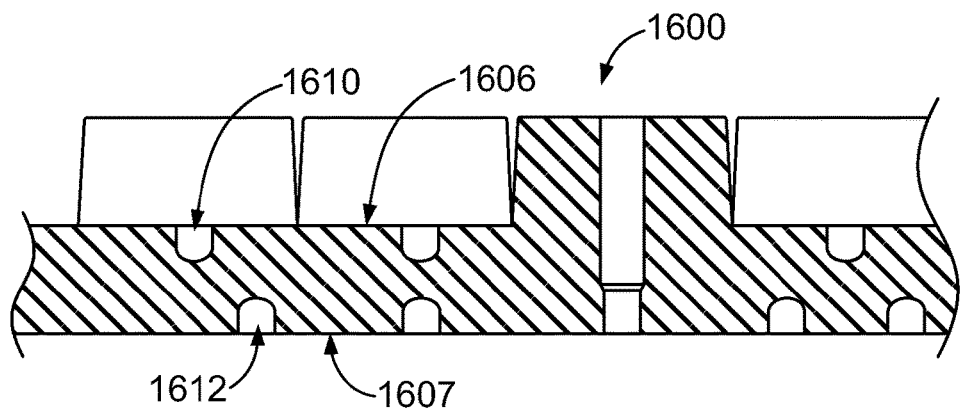
FIG. 55 is a cross-section of a portion of the input layer of FIG. 53.

FIGS. 53-55 illustrate different view of an input layer 1600 formed in accordance with an embodiment. FIG. 53 is a top perspective view of the input layer 1600, FIG. 54 is a bottom perspective view of the input layer 1600, and FIG. 55 is a cross-sectional view of a portion of the input layer 1600. The input layer 1600 may be similar to the other input layers described herein and may be configured to be part of a fluidic device (not shown). For example, as shown in FIG. 53, the input layer 1600 includes a port array 1602 of receiving ports 1604 that are disposed along an outer side 1606 of the input layer 1600. Unlike other input layers, however, the outer side 1606 also includes a plurality of open-sided venting segments 1610. Each venting segments 1610 extend between opposite channel ends.

As shown in FIG. 54, an inner side 1607 of the input layer 1600 may include upstream segments 1612 and vent ports 1614. Each upstream segment 1612 extends between opposite channel ends. As described herein, the upstream segments 1612 may be covered by a union layer (not shown) to enclose the channel segments. The union layer may include thru-holes that align with channel ends of the upstream segments 1612 and align with the vent ports 1614.

FIG. 55 illustrates the upstream segments 1612 and the venting segments 1610 along the inner and outer sides 1607, 1606, respectively. The outer side 1606 of the input layer 1600 may be covered with a cover layer (not shown), such as the cover layer 1162 (FIG. 30). The cover layer 1162 may include thru-holes that align with channel ends of the venting segments 1610. The thru-holes of the cover layer 1162 may constitute vent ports of the fluidic device (not shown).

Figure 56:
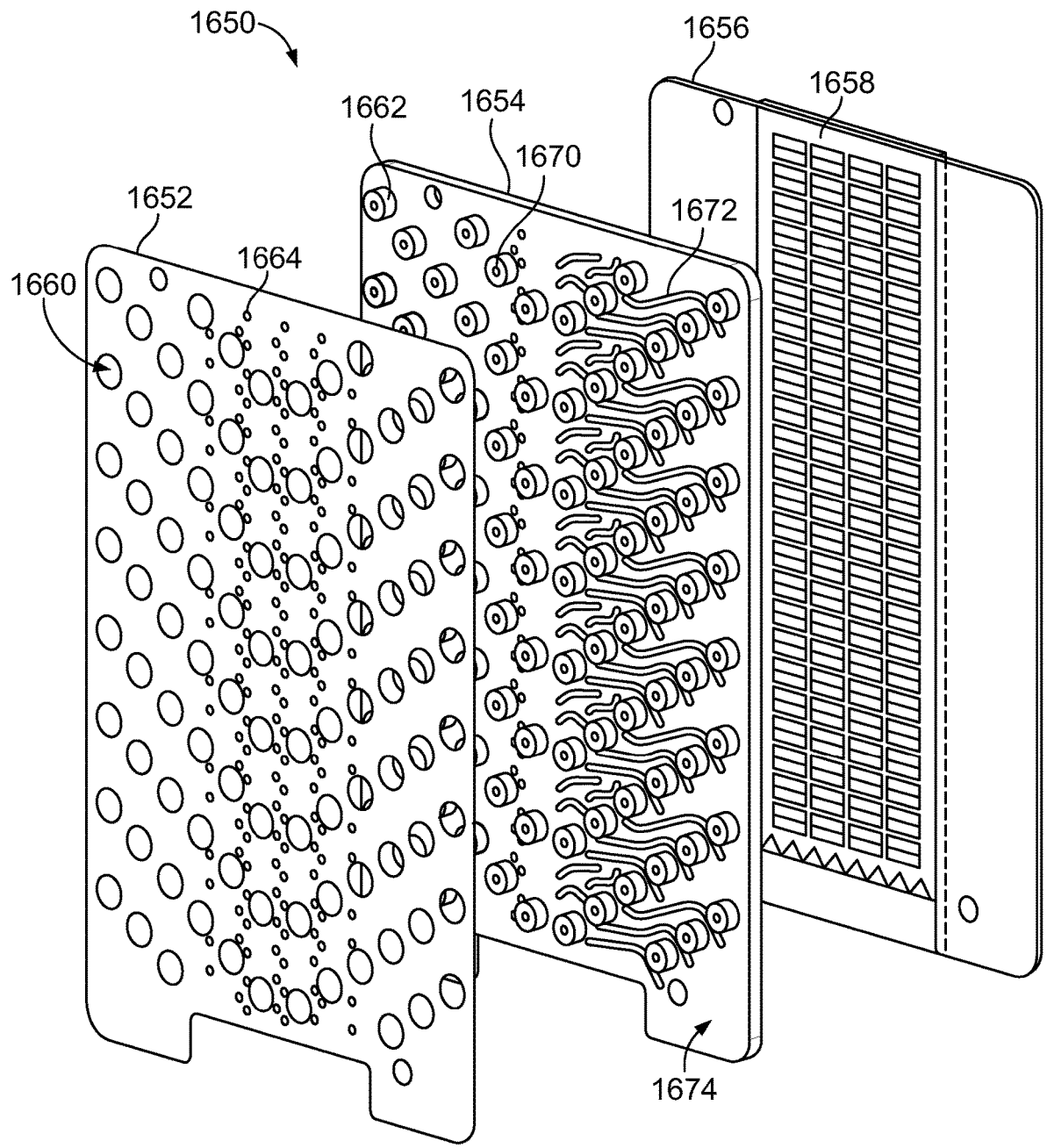
FIG. 56 is an exploded view of a fluidic device formed in accordance with an embodiment.
Figure 58:
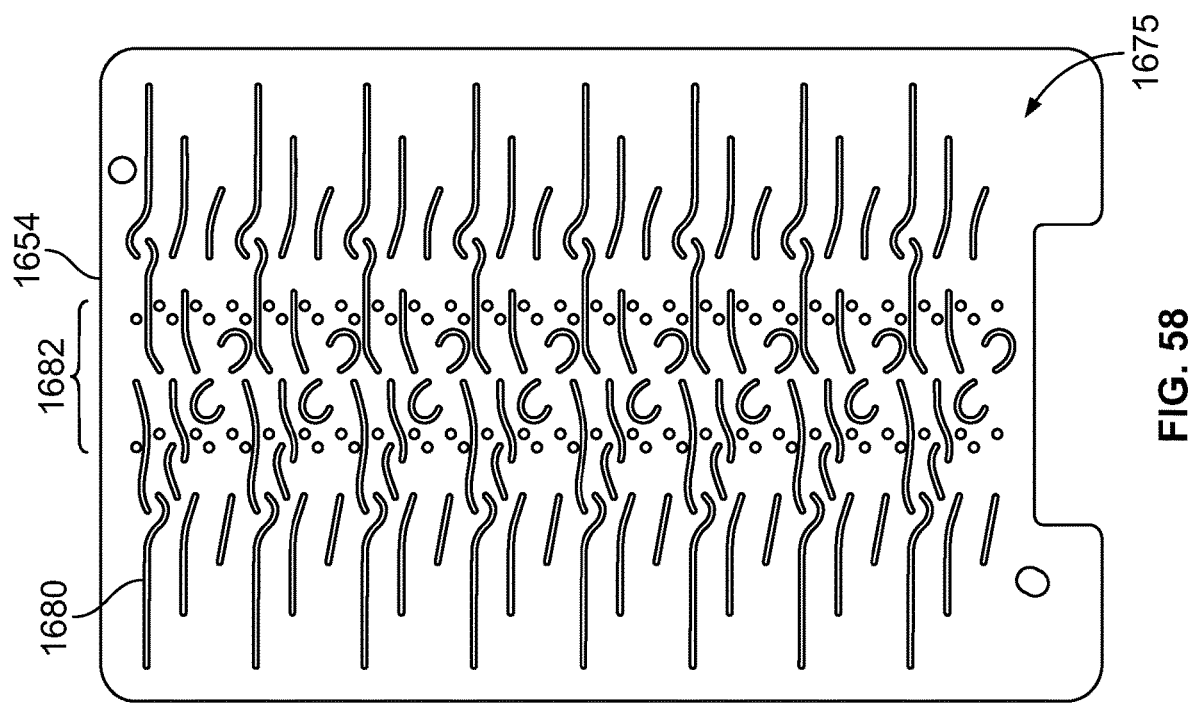
FIG. 58 is a plan view of an inner side of the input layer of FIG. 57.
Figure 57:
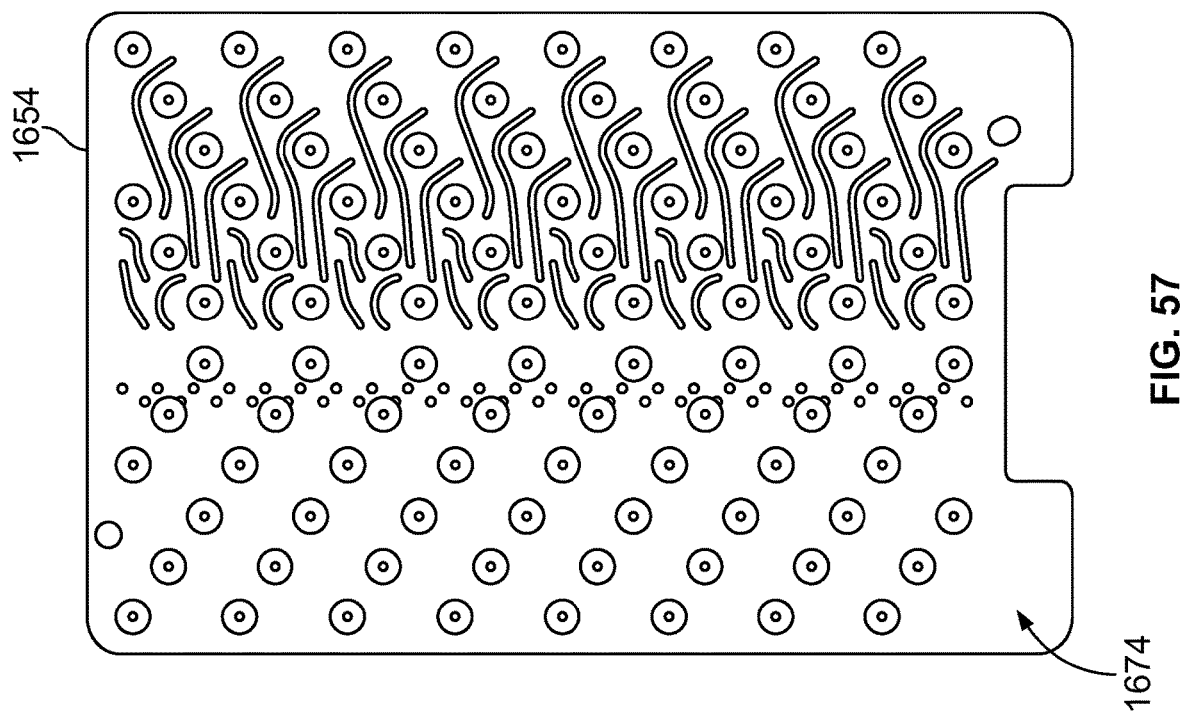
FIG. 57 is a plan view of an input layer of the fluidic device of FIG. 56.

FIG. 56 is an exploded view of a fluidic device 1650 formed in accordance with an embodiment. The fluidic device 1650 includes a cover layer 1652, an input layer 1654, a union layer 1656, and a chamber layer 1658. The cover layer 1652 includes projection openings 1660 that are configured to receive projections 1662 of the input layer 1654. The cover layer 1652 also includes thru-holes 1664 that operate as vent ports when the fluidic device is fully constructed. As shown, the input layer 1652 includes receiving ports 1670 that are disposed within the projections 1662. The input layer 1652 also includes open-sided venting segments 1672 along an outer side 1674 of the input layer 1654. The cover layer 1652 is configured to enclose the venting segments 1672 when the cover layer 1652 is mounted onto the outer side 1674. FIGS. 57 and 58 are plan views of the outer side 1674 and an inner side 1675, respectively, of the input layer 1654. As shown, the input layer 1654 includes upstream segments 1680 along the inner side 1675 that converge toward a central region 1682 of the input layer 1654.

Figure 60:
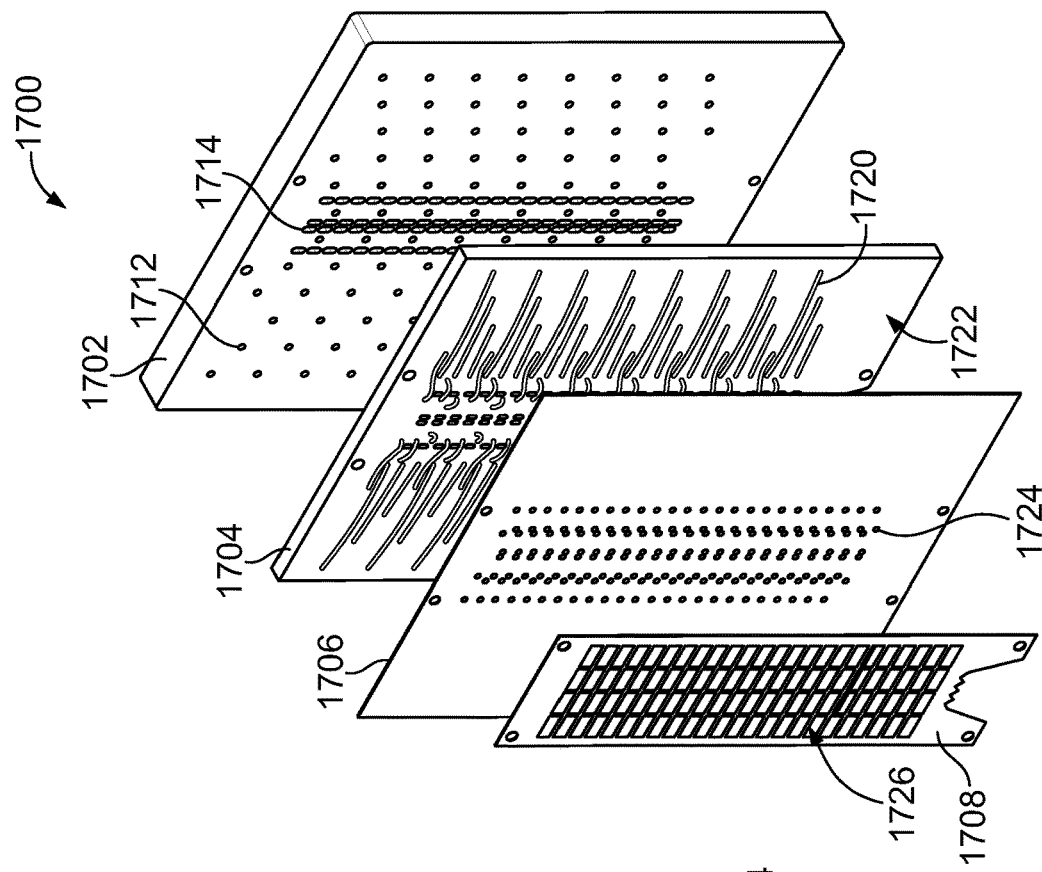
FIG. 60 is another exploded view of a fluidic device formed in accordance with an embodiment.
Figure 59:
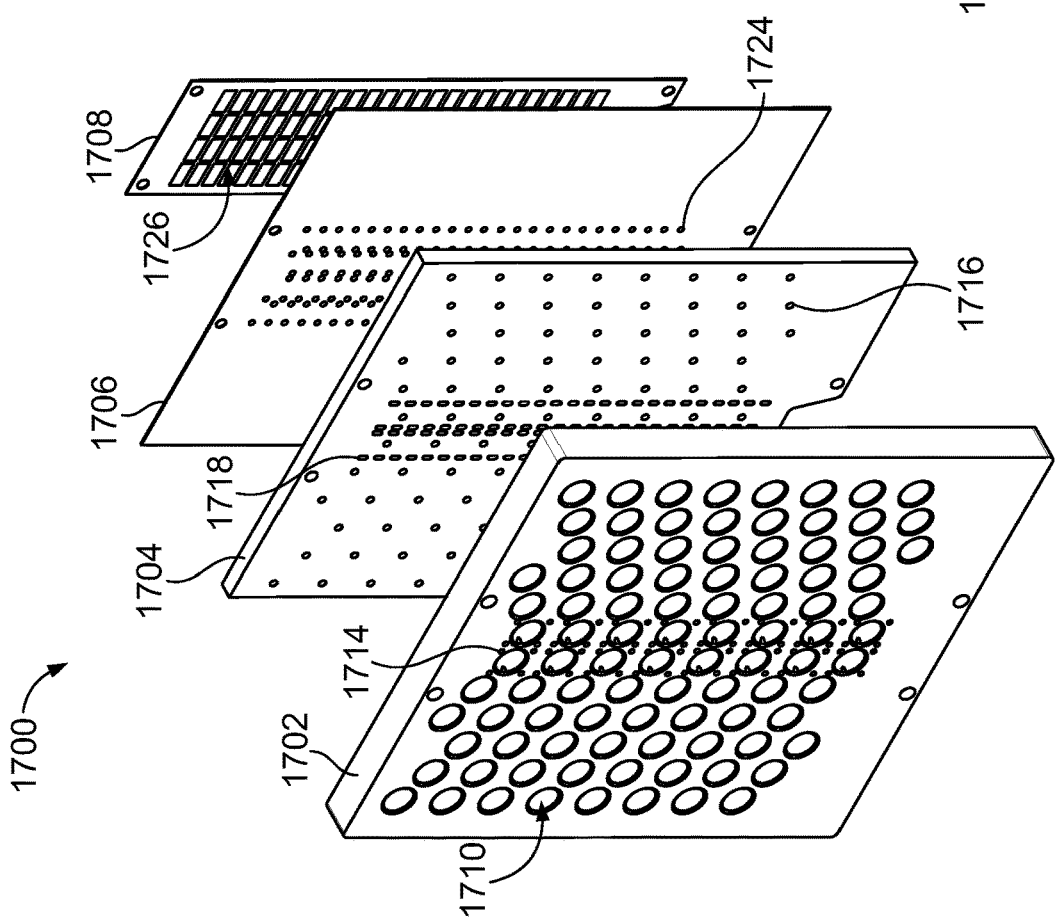
FIG. 59 is an exploded view of a fluidic device formed in accordance with an embodiment.

FIGS. 59 and 60 illustrate a top exploded view and a bottom exploded view, respectively, of a fluidic device 1700. The fluidic device 1700 may be similar to the other fluidic devices described herein. The fluidic device 1700 includes a guide layer 1702, an input layer 1704, a union layer 1706, and a chamber layer 1708. In the illustrated embodiment, the guide layer 1702 includes guide passages 1710, receiving ports 1712 that are disposed within the guide passages 1710, and vent ports 1714. The input layer 1704 includes receiving passages 1716 that align with the receiving ports 1712 and thru-holes 1718 that align with the vent ports 1714. The input layer 1704 also includes upstream segments 1720 that extend along an inner side 1722 of the input layer 1704. The union layer 1706 includes thru-holes 1724 that align with corresponding reaction passages 1726 of the chamber layer 1708. Similar to the other fluidic devices, the fluidic device 1700 is configured to converge fluids toward a sample substrate (not shown).

Figure 62:
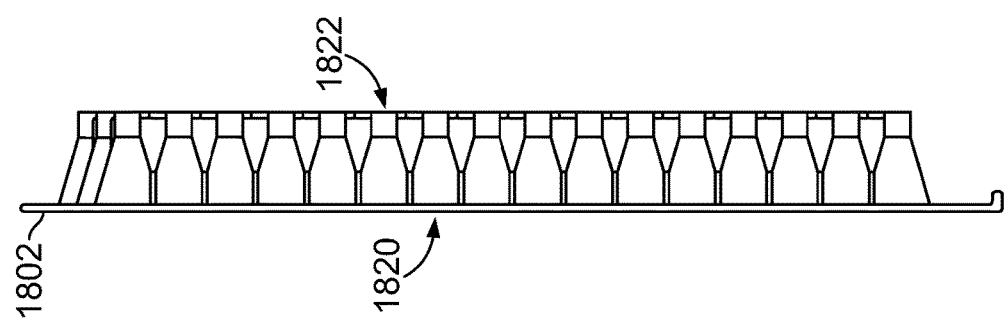
FIG. 62 is a side view of a guide layer of the fluidic device of FIG. 61.
Figure 61:
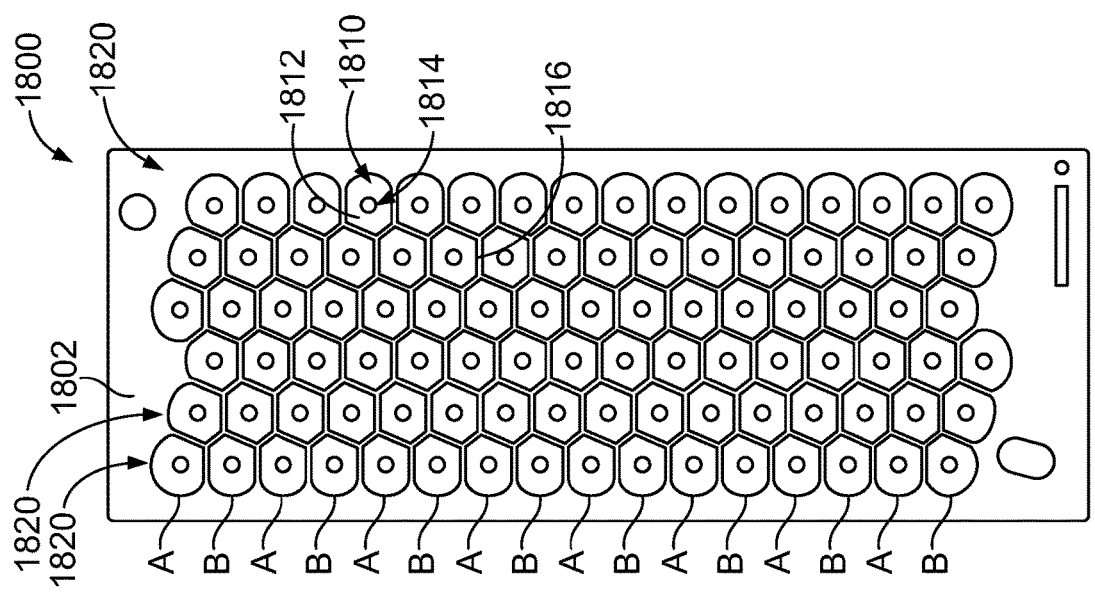
FIG. 61 is a plan view of a fluidic device formed in accordance with an embodiment.

FIGS. 61-64 illustrate different views of a fluidic device 1800 in accordance with an embodiment. The fluidic device 1800 includes a guide layer 1802, a seal layer 1804 (FIG. 63), and a channel layer 1806 (FIG. 64) that are stacked with respect to each other to form a fluidic device. FIG. 61 illustrates a plan view of the fluidic device 1800 and, in particular, the guide layer 1802. FIG. 62 illustrates a side view of the guide layer 1802. The guide layer 1802 includes an outer side 1820 and an opposite inner side 1822.

As shown, the guide layer 1802 includes guide passages 1810 that extend between the outer and inner sides 1820, 1822. The guide passages 1810 are similar to the guide passages 1412 (FIG. 46). For example, the guide passages 1810 are defined by passage surfaces 1812 that are configured to deflect tips toward an interior aperture 1814. However, the passage surfaces 1812 are shaped such that the guide passages 1810 form a lattice or array in which at least some of the guide passages 1810 have substantially hexagonal openings 1816. The hexagonal openings 1816 permit the guide passages 1810 to have a greater density.

As shown, the guide passages 1810 form six passage columns 1820. Each passage column 1820 includes sixteen guide passages 1810. In an exemplar embodiment, a multi-pipetting system is configured to advance tips into every other guide passage 1810 (indicated by A), load fluid into the guide passages 1810 (or corresponding flow channels), and then advance tips into the remaining guide passages 1810 (indicated by B) of the passage column 1820.

Figure 63:
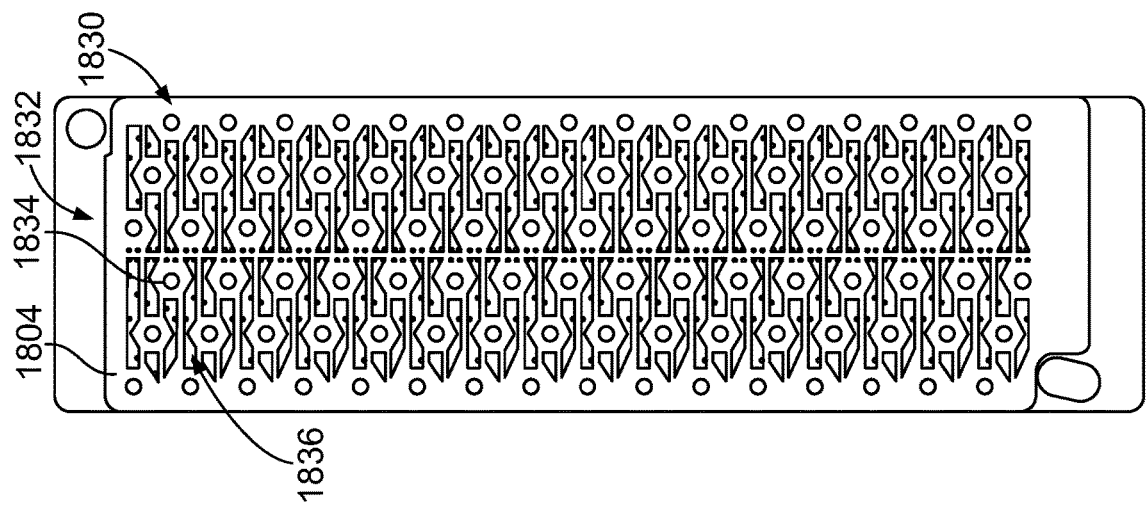
FIG. 63 is a plan view of a seal layer of the fluidic device of FIG. 61.
Figure 64:
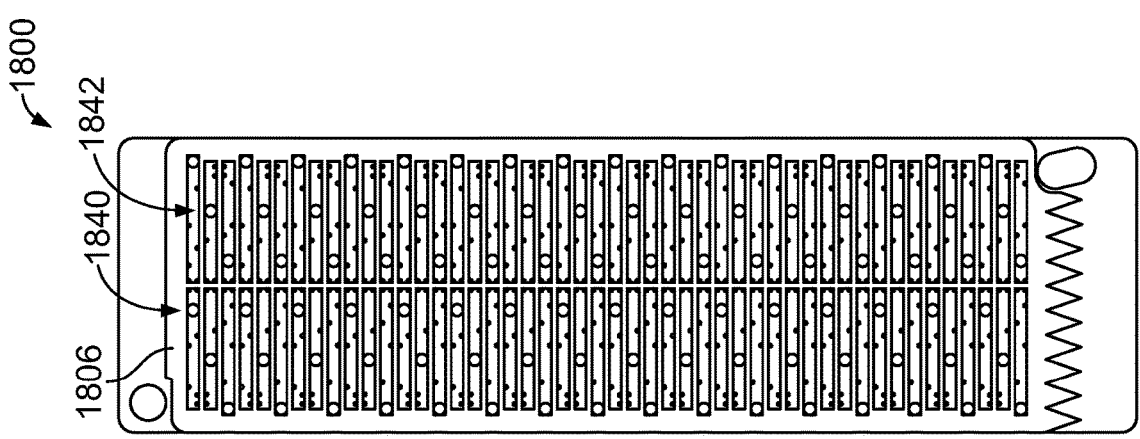
FIG. 64 is a plan view of a channel layer of the fluidic device of FIG. 61.

FIG. 63 is a plan view of an outer side 1830 of the seal layer 1804. The seal layer 1804 is configured to bond the guide layer 1802 (FIG. 61) to the channel layer 1806 (FIG. 64). The seal layer 1804 includes a port array 1832 of receiving ports 1834. The receiving ports 1834 are configured to align with the apertures 1814 (FIG. 61) of the guide layer 1802. The seal layer 1804 also includes slots 1836. The slots 1836 permit gas to exit reaction chambers as described below.

FIG. 64 is a plan view of the fluidic device 1800 and, in particular, an inner side 1840 of the channel layer 1806. The inner side 1840 is configured to interface with a sample substrate (not shown). The channel layer 1806 includes reaction channels 1842 that align with the receiving ports 1834. The reaction channels 1842 are configured to receive fluid through the receiving ports 1834 and confine the fluid to a designated reaction site (not shown) along the sample substrate. As such, the channel layer 1806 defines reaction chambers (not shown) within the reaction channels 1842 along the reaction sites.

Figure 65:
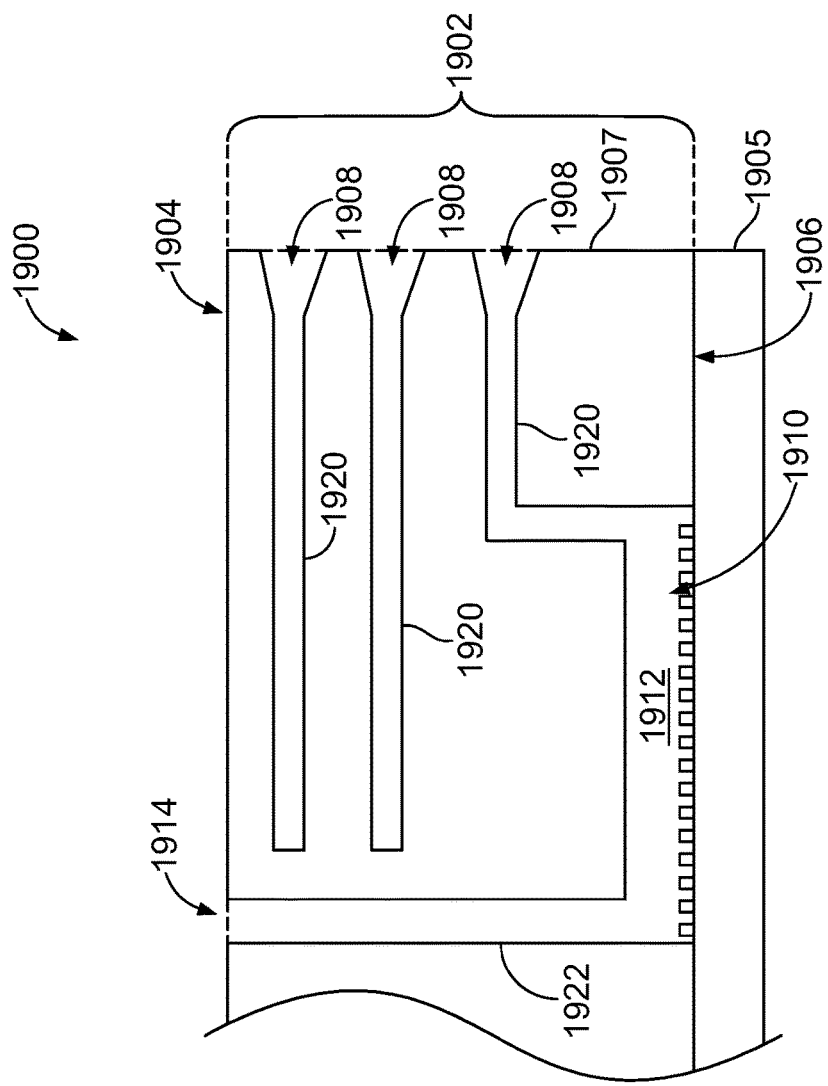
FIG. 65 illustrates a side cross-section of a fluidic device formed in accordance with an embodiment.

FIG. 65 illustrates a side cross-section of a portion of a fluidic device 1900 formed in accordance with an embodiment. The fluidic device 1900 may include similar or identical features/elements of the fluidic devices described herein. For example, the fluidic device 1900 includes a manifold body 1902 having first and second body sides 1904, 1906 that face in opposite directions. The second body side 1906 is mounted to a sample substrate 1905, which may be similar or identical to the other sample substrates described herein. The manifold body 1902 also includes a body edge 1907 that extends between and joins the first and second body sides 1904, 1906. The body edge 1907 may also be referred to as a vertical body side and the first and second body sides 1904, 1906 may be referred to as horizontal body sides. Although not shown, the manifold body 1902 may include other body edges that join the first and second body sides 1904, 1906.

The body edge 1907 has receiving ports 1908. Although FIG. 65 illustrates only three receiving ports, it should be understood that the fluidic device 1900 may include more receiving ports 1908. The receiving ports 1908 may form a port array. In some embodiments, the port array may extend only along the body edge 1907. In other embodiments, however, the port array may extend along other body edges (not shown), the first body side 1904, and/or the second body side 1906. In order for the second body side 1906 to include receiving ports 1908, at least a portion of the second body side 1906 may clear the sample substrate 1905 and be exposed for receiving fluid.

The second body side 1906 may have an open-sided recess 1910 that forms a reaction chamber 1912 when the fluidic device 1900 is mounted onto the sample substrate 1905. Similar to other embodiments, the fluidic device 1900 may have a plurality of open-sided recesses 1910 that form a plurality of reaction chambers 1912. The reaction chambers 1912 may form a chamber array. The chamber array may have an area or perimeter that is less than an area or perimeter of the port array. Also shown, the manifold body 1902 may include vent openings 1914 that open to an exterior of the manifold body 1902. The vent openings 1914 may be along the first body side 1904 and/or along the body edge 1907.

The manifold body 1902 also includes upstream channels 1920 and venting channels 1922 that each extend through the manifold body 1902. Each of the upstream channels 1920 fluidly couples a corresponding receiving port 1908 to a corresponding reaction chamber 1912. In FIG. 65, two of the upstream channels 1920 turn into or out of the page. Each of the venting channels 1922 fluidly couples a corresponding reaction chamber 1912 to a corresponding vent opening 1914.

It is to be understood that the above description is intended to be illustrative, and not restrictive. Moreover, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The following claims recite aspects of certain embodiments of the inventive subject matter and are considered to be part of the above disclosure. Moreover, these aspects may be combined with one another.

What is claimed is:

1. A fluidic device comprising:
  a manifold body having first and second body sides that face in opposite directions, the first body side having receiving ports that form a port array, the port array defining a reaction region along the first body side, the second body side having open-sided recesses that form a chamber array that defines a fluid-delivery region, the manifold body configured to be removably coupled to a sample substrate, the open-sided recesses and the sample substrate forming reaction chambers when the manifold body is removably coupled to the sample substrate, the manifold body also including vent openings that open to an exterior of the manifold body;
  upstream channels extending through the manifold body, each of the upstream channels fluidly coupling a corresponding receiving port of the port array to a corresponding open-sided recess of the chamber array; and
  venting channels extending through the manifold body, each of the venting channels fluidly coupling a corresponding open-sided recess of the chamber array to a corresponding vent opening;
  wherein the upstream channels converge as the upstream channels extend from the port array to the chamber array.

2. The fluidic device of claim 1, wherein the upstream channels converge such that the chamber array has an area that is less than or equal to 50% of an area of the port array.

3. The fluidic device of claim 1, wherein each of the fluid-delivery region and the reaction region has a respective length and each of the fluid-delivery region and the reaction region has a respective width, the upstream channels converging such that at least one of:
  the width of the fluid-delivery region is less than or equal to 50% of the width of the reaction region; or
  the length of the fluid-delivery region is less than or equal to 50% of the length of the reaction region.

4. The fluidic device of claim 1, wherein the manifold body includes body layers stacked side-by-side, the upstream channels extending through at least two body layers.

5. The fluidic device of claim 4, wherein the venting channels extend through the at least two body layers.

6. The fluidic device of claim 1, wherein the manifold body includes a plurality of flow channels, each flow channel being defined by one of the upstream channels, one of the reaction chambers, and one of the venting channels, wherein the flow channels have a substantially equal volume.

7. The fluidic device of claim 1, wherein the manifold body includes an input layer that has the receiving ports and a union layer, the input and union layers being stacked side-by-side, the upstream channels and the venting channels extending through each of the input and union layers.

8. The fluidic device of claim 7, wherein the input layer includes channel segments and the union layer includes thru-holes that fluidly couple to corresponding channel segments, each of the upstream channels including a corresponding channel segment and a corresponding thru-hole.

9. The fluidic device of claim 8, wherein the channel segments are open-sided along an inner surface of the input layer, the channel segments being enclosed by the union layer.

10. The fluidic device of claim 1, wherein the manifold body includes an input layer that includes channel segments of the upstream channels, at least some of the channel segments having non-linear paths.

11. The fluidic device of claim 6, wherein the volume of each flow channel is less than or equal to 20 uL.

12. The fluidic device of claim 1, further comprising a guide layer that is configured to be mounted onto the manifold body, the guide layer including guide passages that align with corresponding receiving ports of the port array, each of the guide passages configured to direct a corresponding tip into the corresponding receiving port.

13. The fluidic device of claim 1, wherein the manifold body includes a cover layer that includes the first body side of the manifold body and an input layer, the input layer having an outer side and an inner side, the inner side including channel segments of the upstream channels, the outer side including channel segments of the venting channels, the cover layer including the vent openings.

14. A fluidic device comprising:
    an input layer having an outer side and an opposite inner side and a port array of receiving ports disposed along the outer side, the input layer including channel segments that extend along the inner side, the input layer also including vent ports along the outer side;
    a union layer have thru-holes therethrough; and
    a chamber layer having reaction passages;
    wherein the input layer, the union layer, and the chamber layer are stacked side-by-side to form a manifold body, the union layer being positioned between the input and chamber layers, the reaction passages forming open-sided recesses of the manifold body that define a chamber array, the open-sided recesses and a sample substrate forming reaction chambers when the manifold body is removably coupled to the sample substrate; and
    wherein the manifold body includes a plurality of flow channels, each of the flow channels including one of the receiving ports, one of the channel segments, one of the open-sided recesses, one of the thru-holes, and one of the vent ports that are in flow communication with one another, the flow channels converging as the flow channels extend from the port array to the chamber array.

15. An assembly comprising the fluidic device of claim 1 and the sample substrate, the sample substrate including reaction sites, the reaction sites aligning with corresponding open-sided recesses of the chamber array when the fluidic device is mounted onto the sample substrate.

16. The fluidic device of claim 1, wherein the chamber array has a density of open-sided recesses and the port array has a density of receiving ports, the density of the chamber array being greater than the density of the port array.

\* \* \* \* \*